US012029153B2

(12) United States Patent
Garner et al.

(10) Patent No.: US 12,029,153 B2
(45) Date of Patent: Jul. 9, 2024

(54) SEED METER DISK AND METHODS OF USING THE SAME

(71) Applicant: DEERE & COMPANY, Moline, IL (US)

(72) Inventors: Elijah B. Garner, Bettendorf, IA (US); Dnyanesh Dhobale, Parbhani (IN); Beth A. Wolfs, Tiffin, IA (US); Cary S. Hubner, Geneseo, IL (US); Tyler G. Groves, Bettendorf, IA (US); Justin L Montenguise, Bettendorf, IA (US)

(73) Assignee: DEERE & COMPANY, Moline, IL (US)

( * ) Notice: Subject to any disclaimer, the term of this patent is extended or adjusted under 35 U.S.C. 154(b) by 758 days.

(21) Appl. No.: 17/212,858

(22) Filed: Mar. 25, 2021

(65) Prior Publication Data

US 2021/0298226 A1    Sep. 30, 2021

Related U.S. Application Data

(60) Provisional application No. 63/002,359, filed on Mar. 31, 2020, provisional application No. 63/001,499, filed on Mar. 30, 2020.

(51) Int. Cl.
*A01C 7/12* (2006.01)
*A01C 7/04* (2006.01)
*A01C 7/08* (2006.01)

(52) U.S. Cl.
CPC .............. *A01C 7/125* (2013.01); *A01C 7/046* (2013.01); *A01C 7/084* (2013.01)

(58) Field of Classification Search
CPC .......... A01C 7/125; A01C 7/046; A01C 7/084
See application file for complete search history.

(56) References Cited

U.S. PATENT DOCUMENTS

| 11,602,096 B2 * | 3/2023 | Schoeny et al. ........ G01L 21/00 |
| 11,730,079 B2 * | 8/2023 | Wilhelmi et al. .... A01C 7/0445 |
| | | 111/171 |

(Continued)

FOREIGN PATENT DOCUMENTS

| EP | 3017673 A1 | 5/2016 |
| EP | 3050419 A1 | 8/2016 |

(Continued)

OTHER PUBLICATIONS

Extended European Search Report and Written Opinion issued in European Patent Application No. 21165638.4, dated Oct. 1, 2021, in 08 pages.

*Primary Examiner* — Tara Mayo

(57) ABSTRACT

A seed meter disk includes a body defining a plane of rotation, a seed-side, and a lower-pressure-side. A circumferential array of seed openings are provided on the seed-side of the seed meter disk for seed adherence. A circumferential array of kick-out pockets are provided on the lower-pressure-side of the seed meter disk. A circumferential array of recessed seed agitator pockets may be provided for seed mixing and agitation. A circumferential array of raised agitator pegs or features may be provided for seed mixing and agitation. A kick-out wheel assembly includes a kick-out wheel rotatably held by a kick-out wheel arm. The kick-out wheel has at least one protrusion portion including a plurality of kick-out protrusions each of which is configured to mate with and enter one of the kick-out pockets to facilitate dislodgement of a seed or other particle from within a seed opening.

16 Claims, 39 Drawing Sheets

(56) References Cited

U.S. PATENT DOCUMENTS

2019/0343037 A1\* 11/2019 Werner et al. ....... A01C 21/005
2020/0000011 A1\* 1/2020 Hubner et al. ......... A01C 7/102

FOREIGN PATENT DOCUMENTS

WO     WO2012129442 A2    9/2012
WO     WO2021000035 A1    1/2021

\* cited by examiner

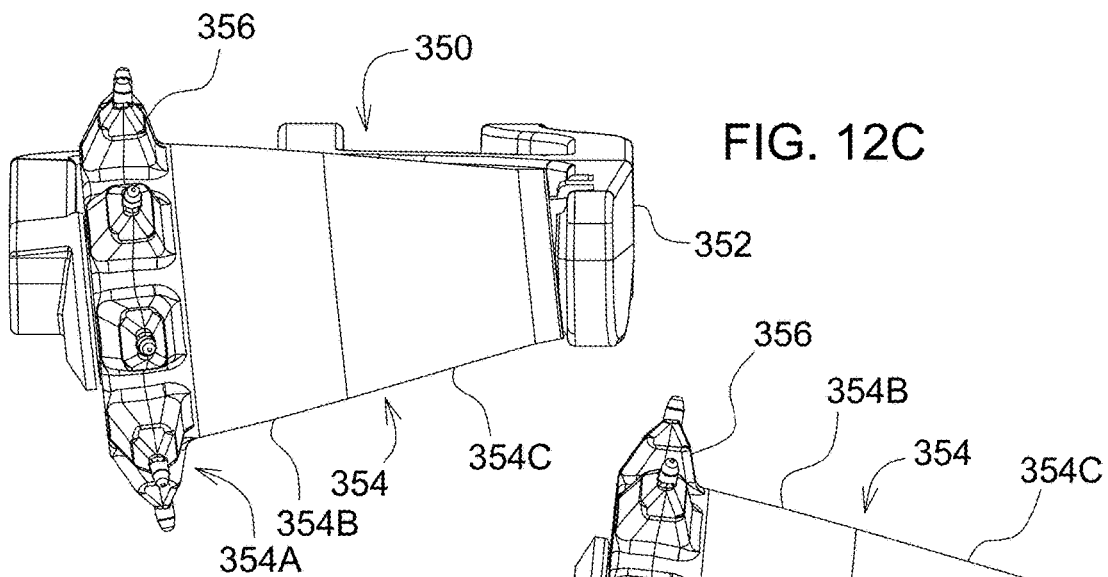
FIG. 12C
FIG. 12D
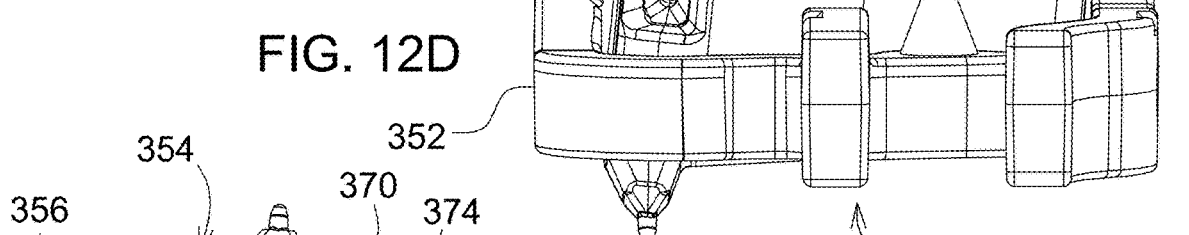
FIG. 12E
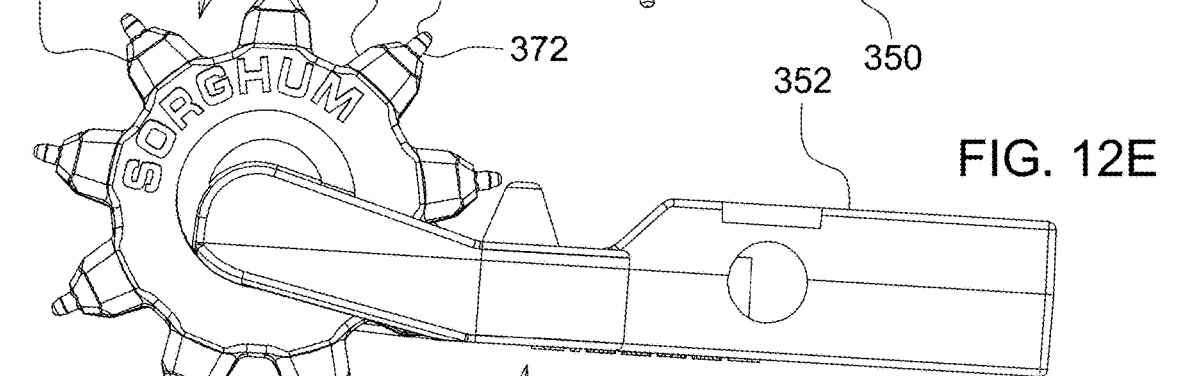
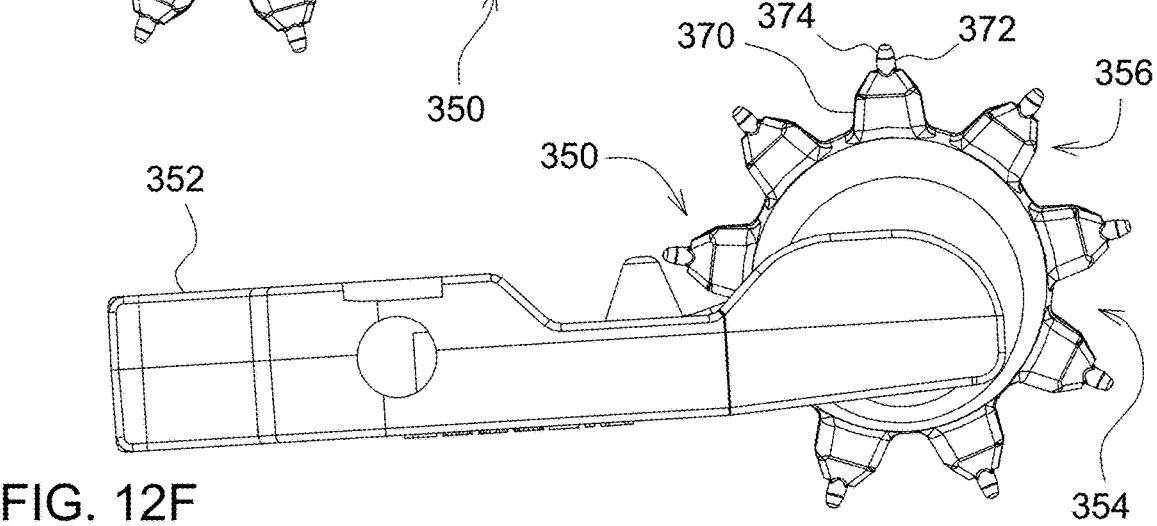
FIG. 12F

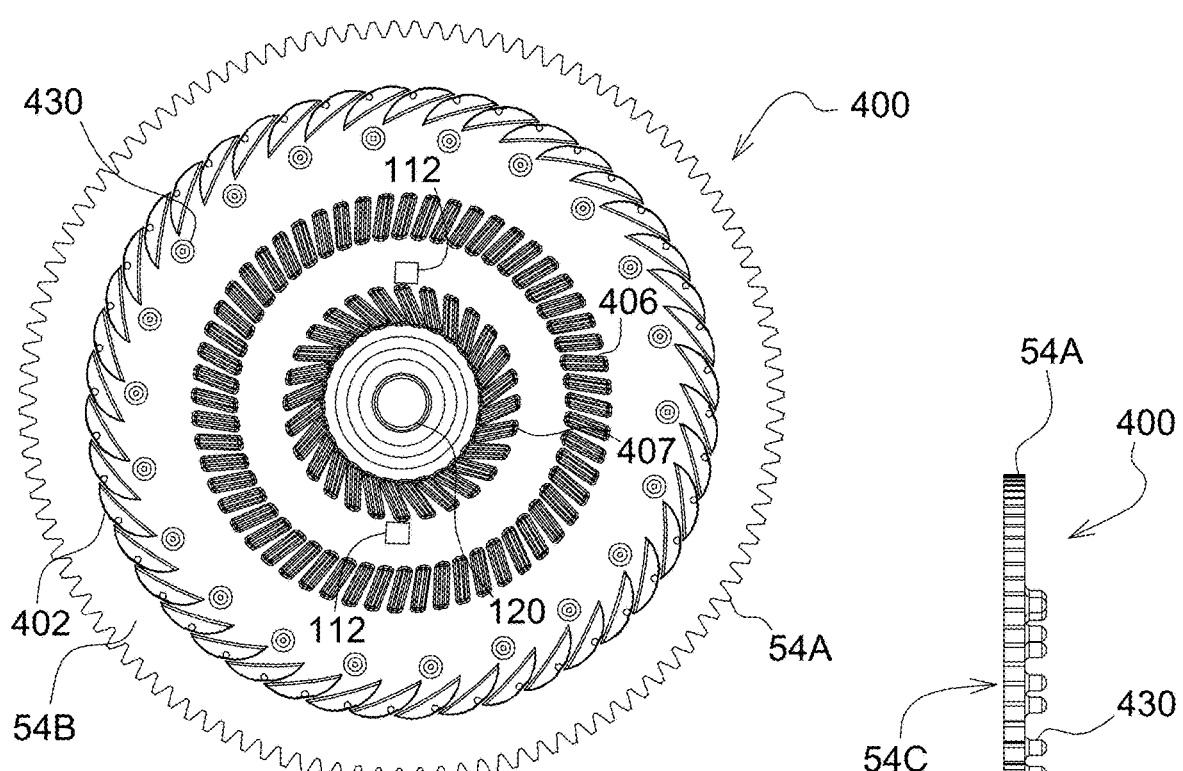
FIG. 14A
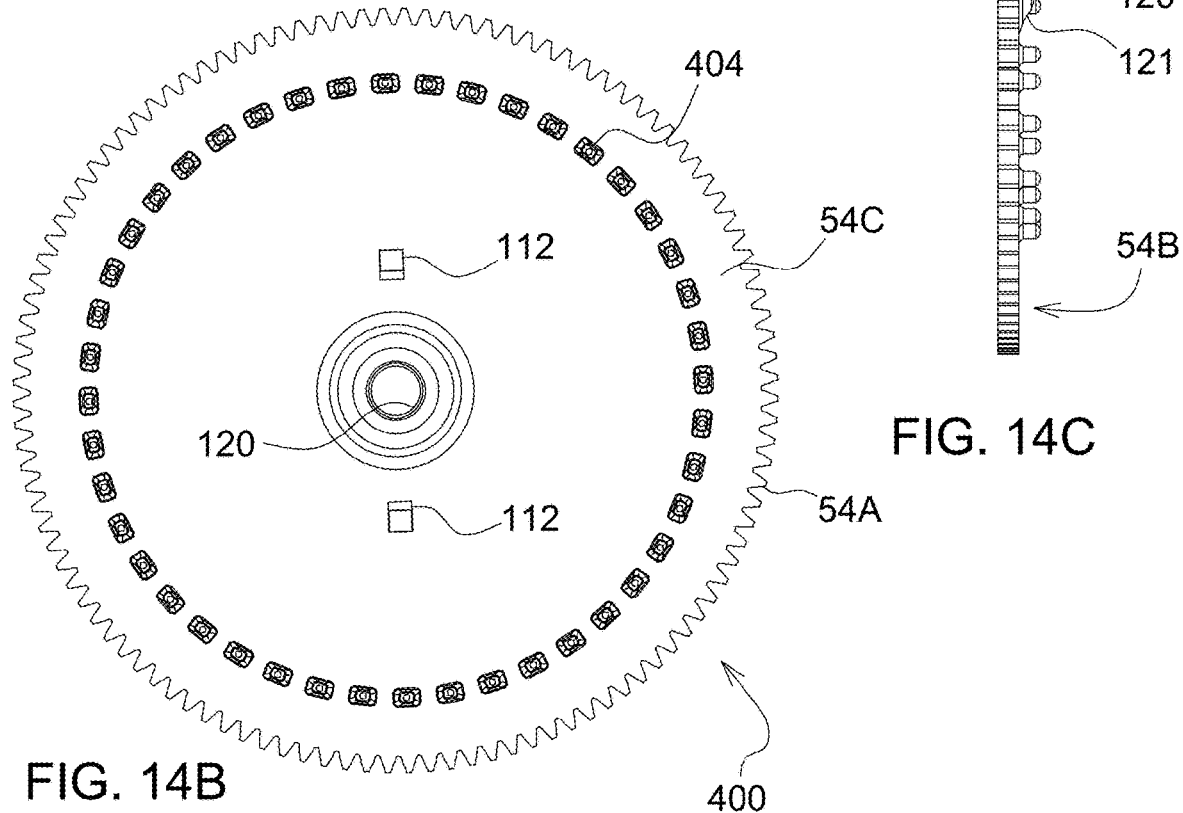
FIG. 14B
FIG. 14C

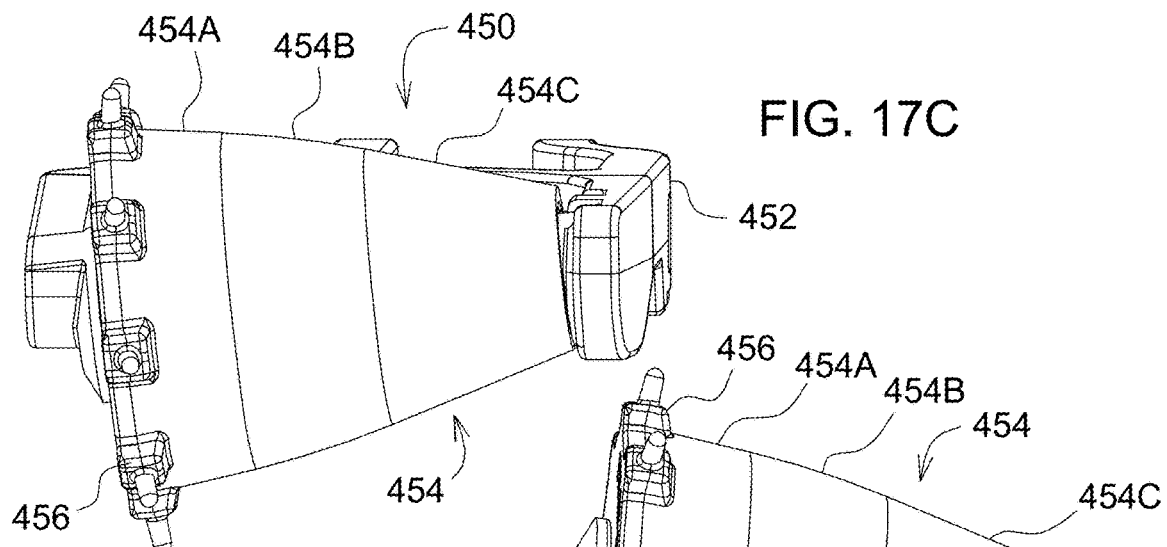
FIG. 17C
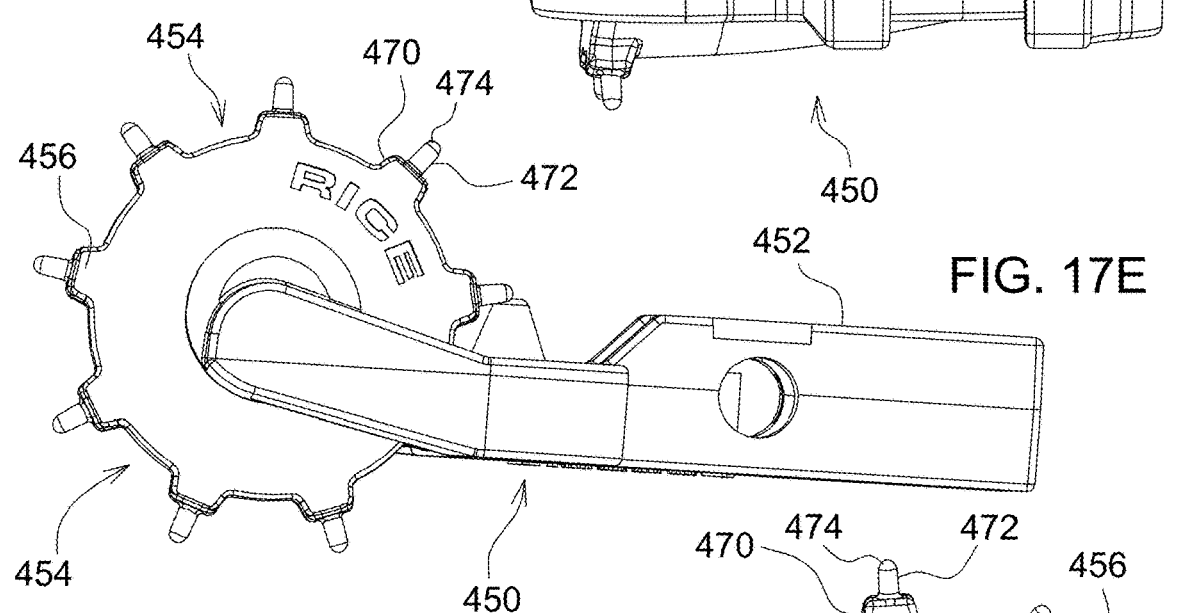
FIG. 17D
FIG. 17E
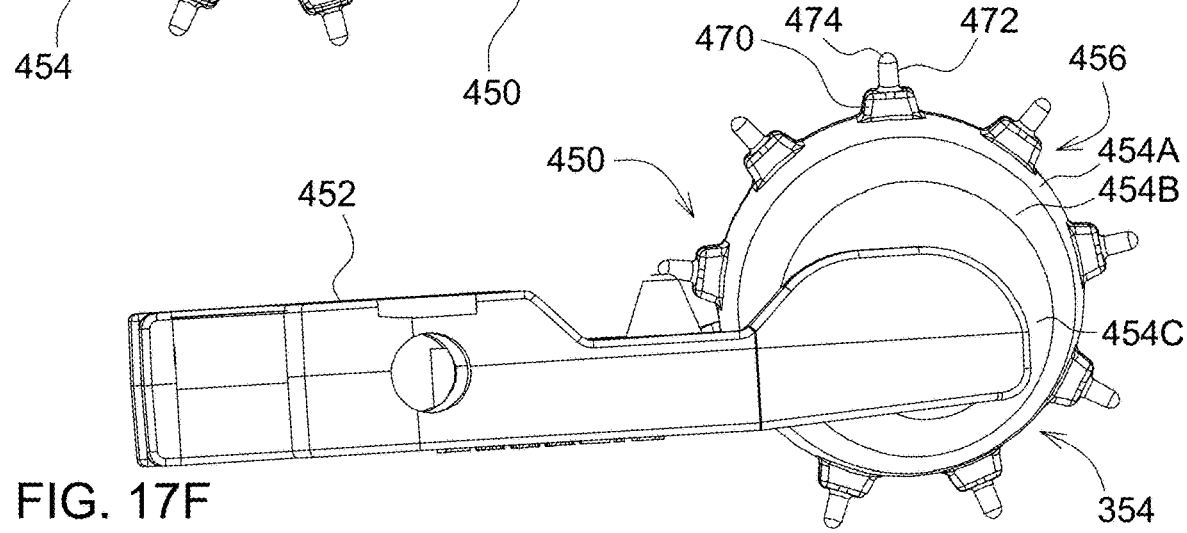
FIG. 17F

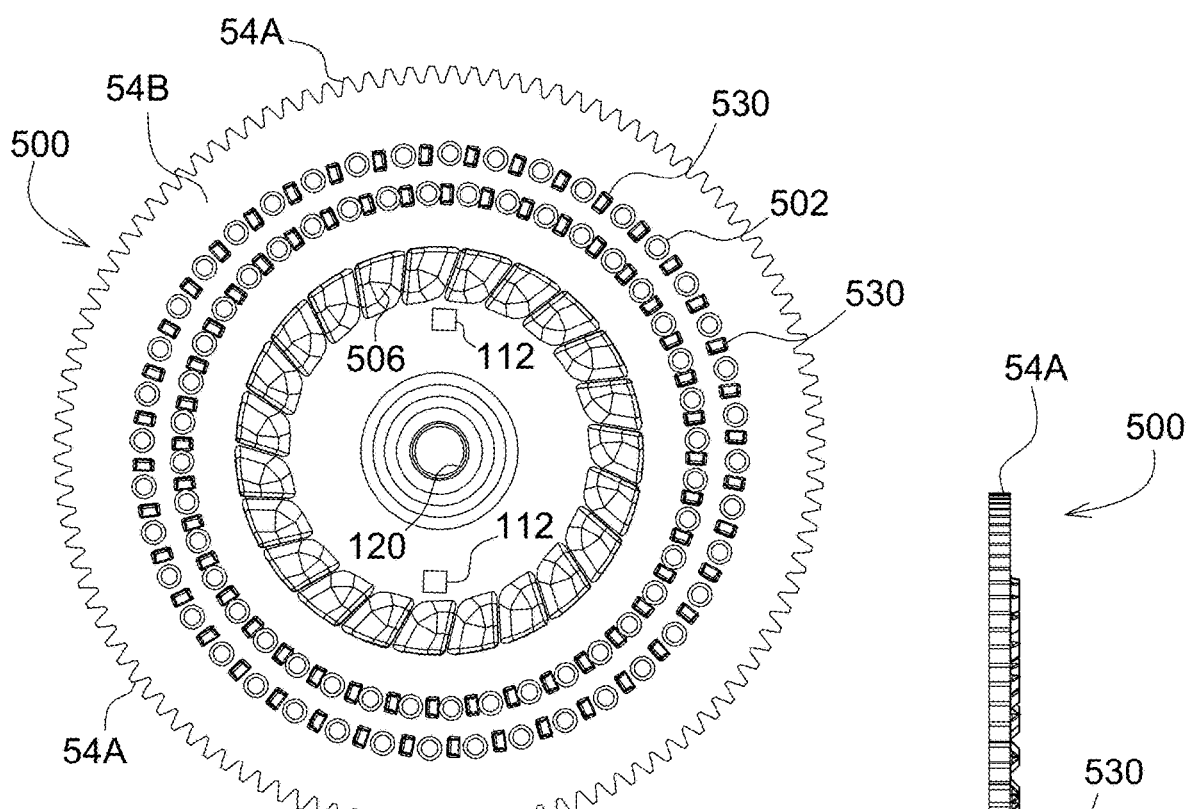
FIG. 19A
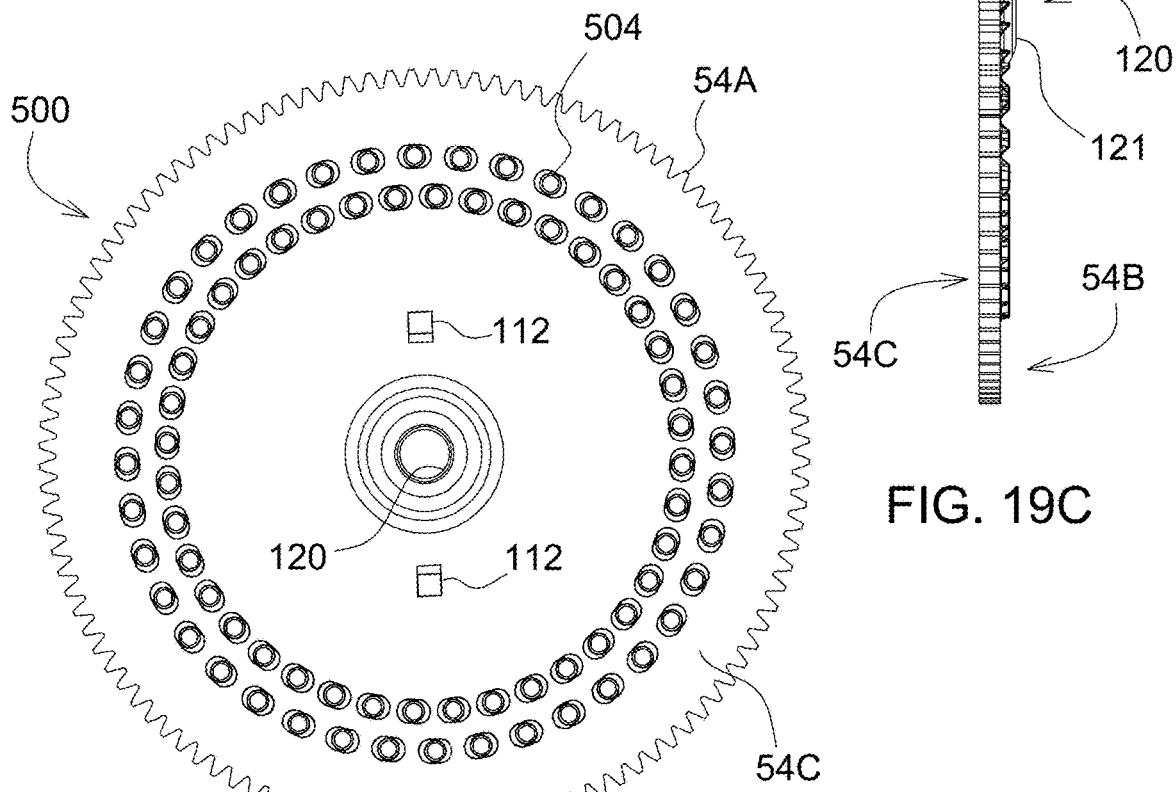
FIG. 19B
FIG. 19C

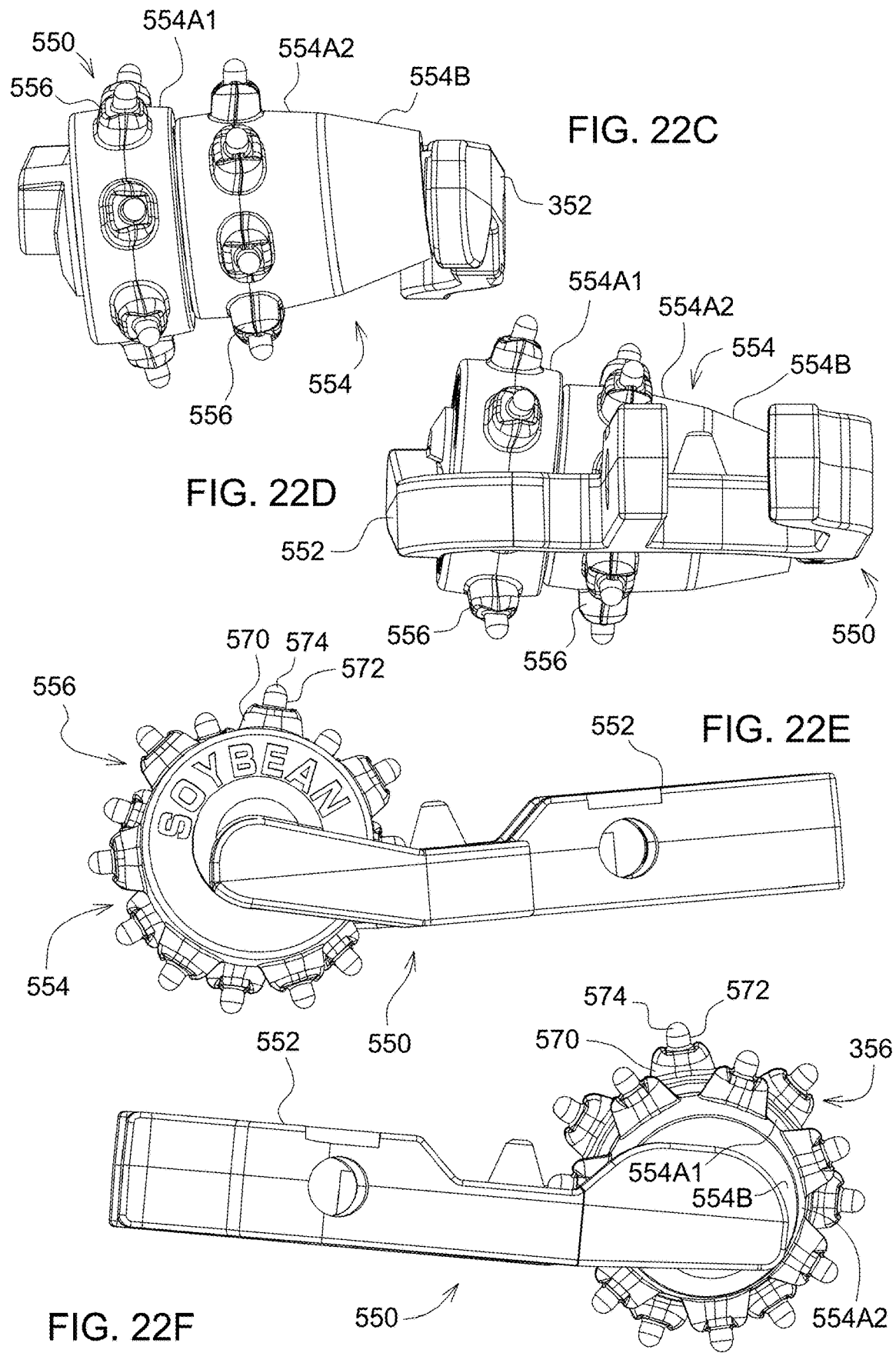

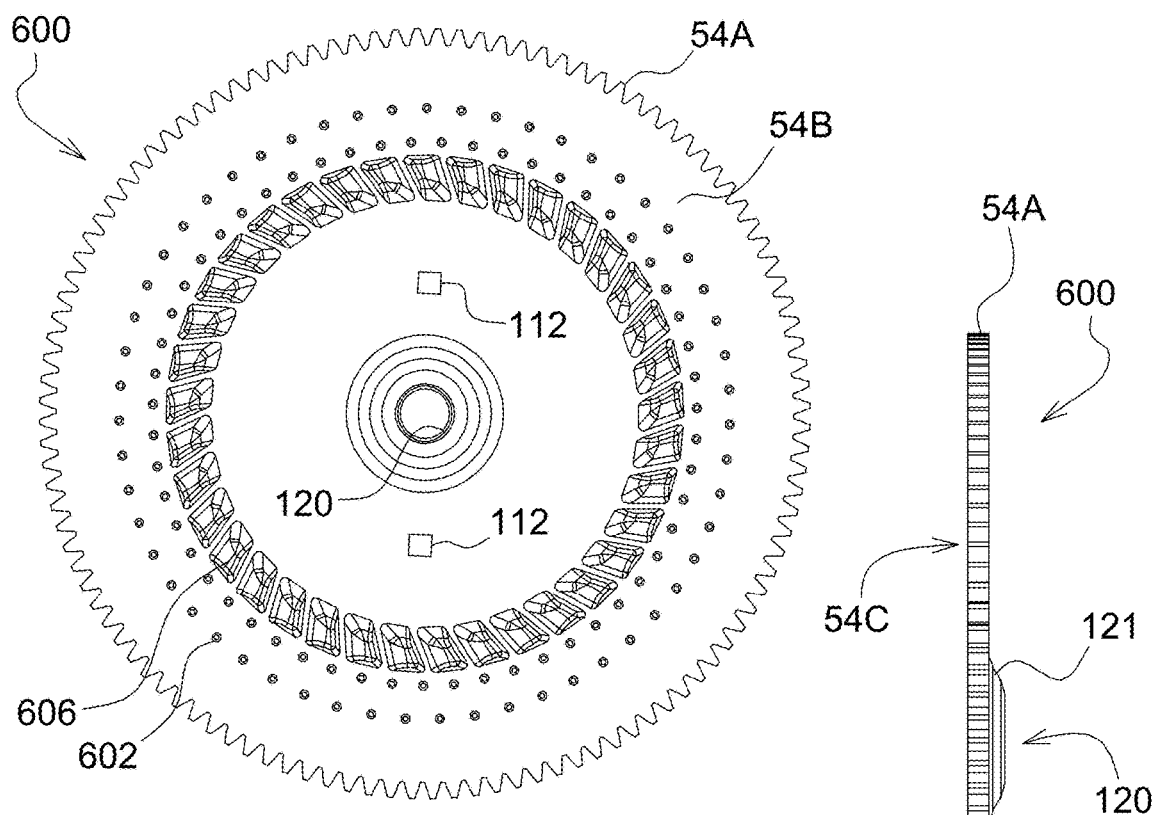
FIG. 24A
FIG. 24C
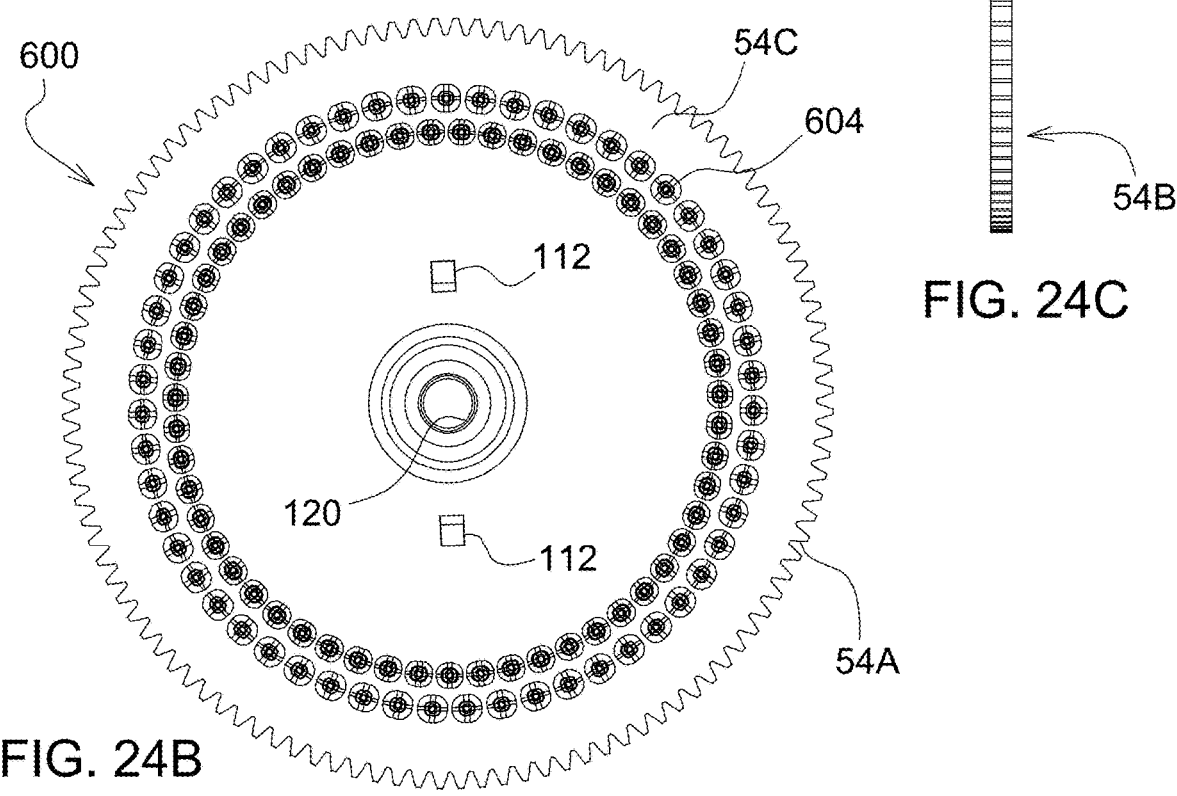
FIG. 24B

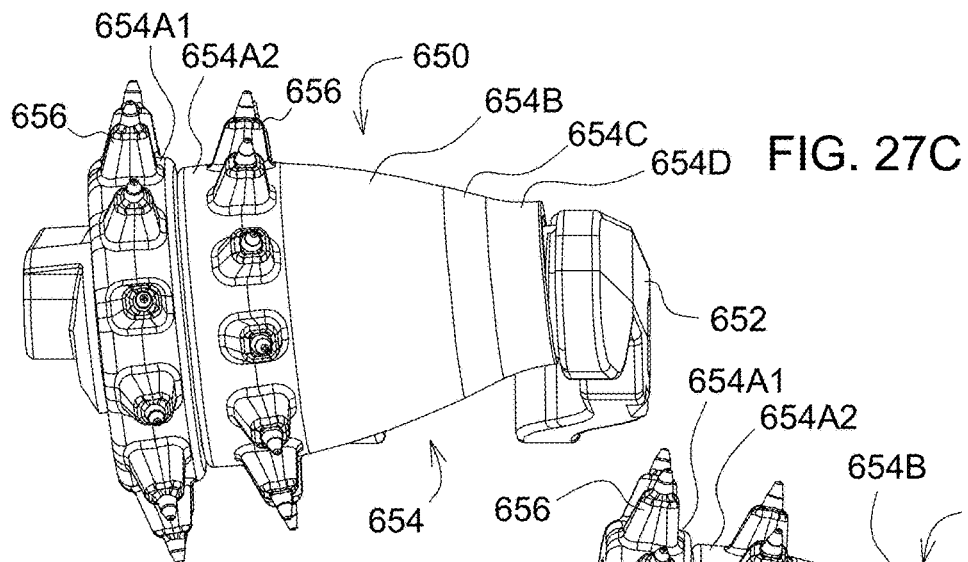
FIG. 27C
FIG. 27D
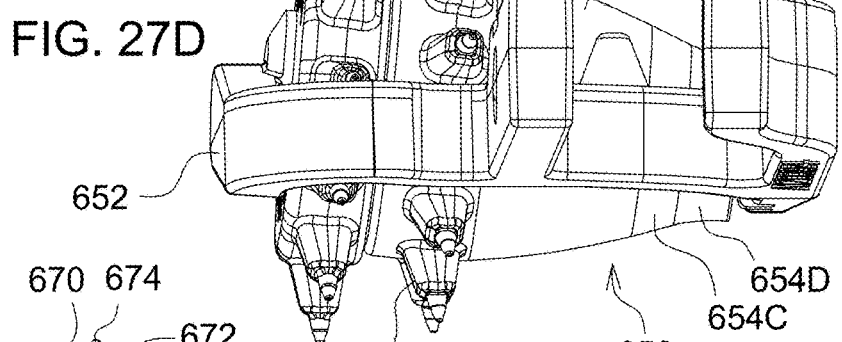
FIG. 27E
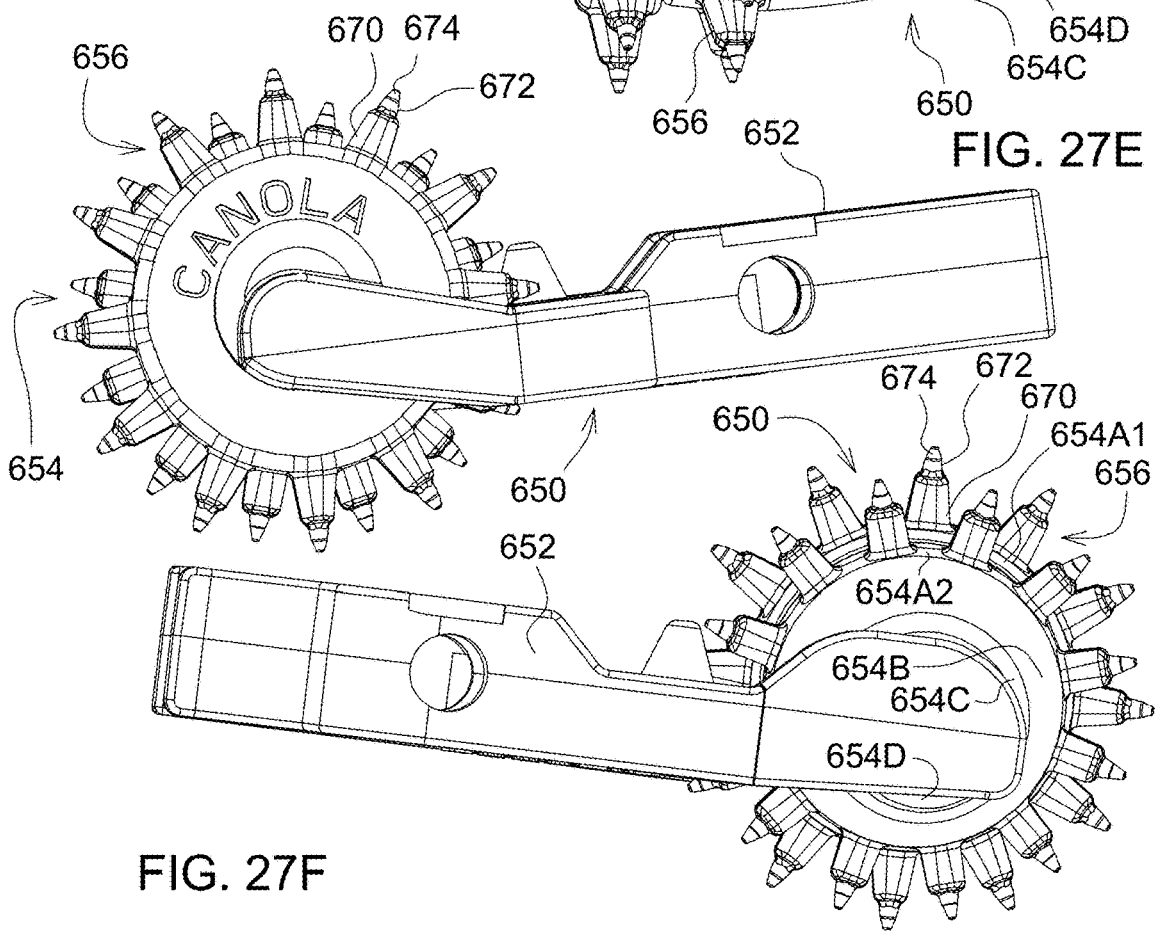
FIG. 27F

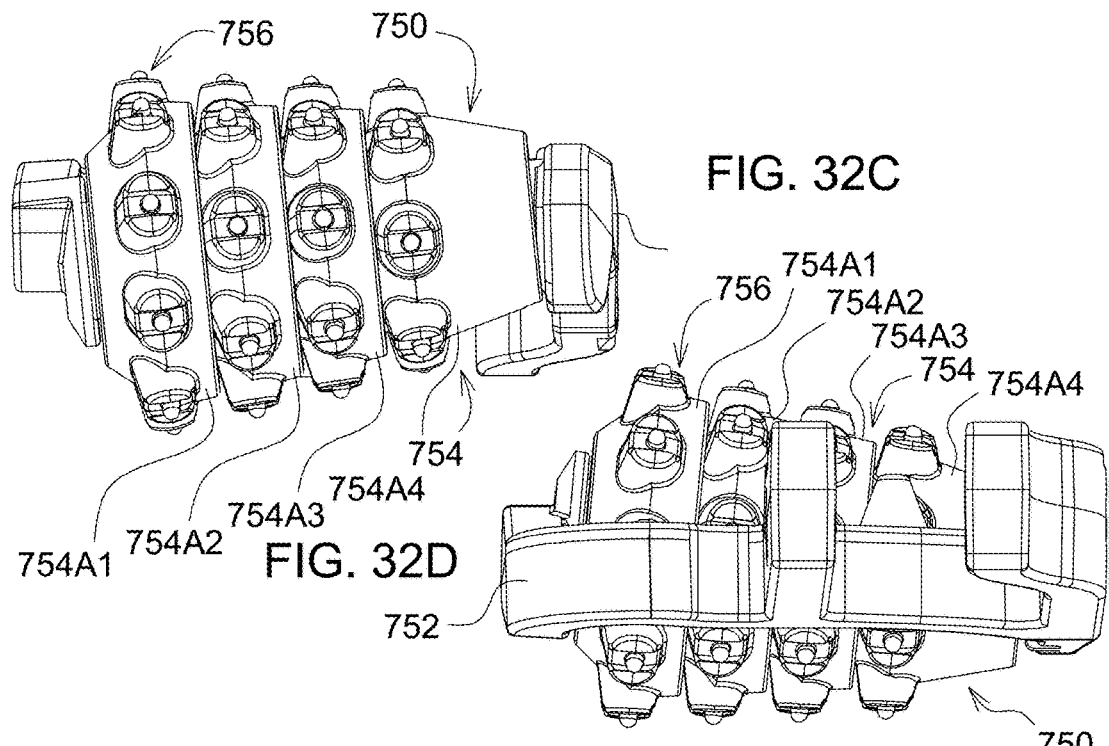
FIG. 32C
FIG. 32D
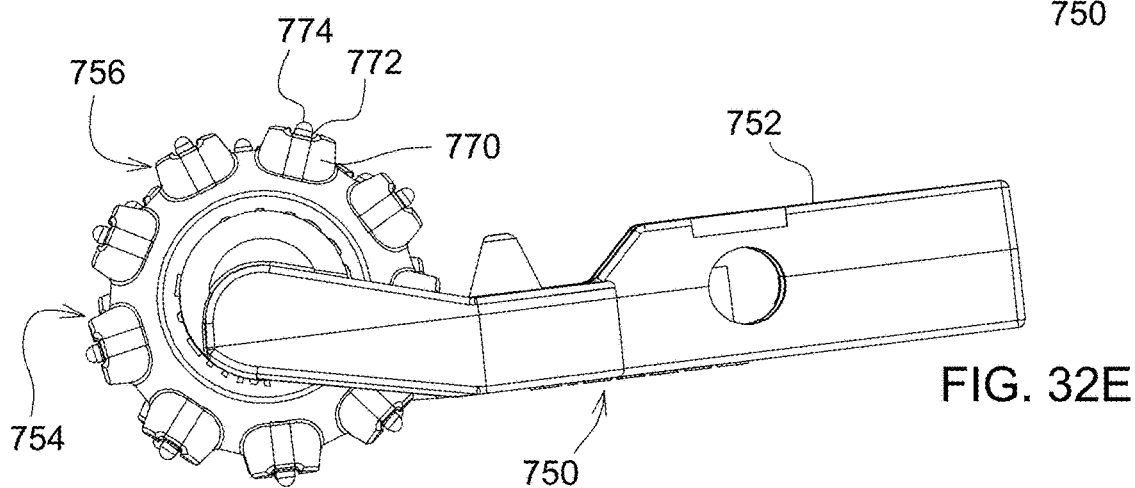
FIG. 32E
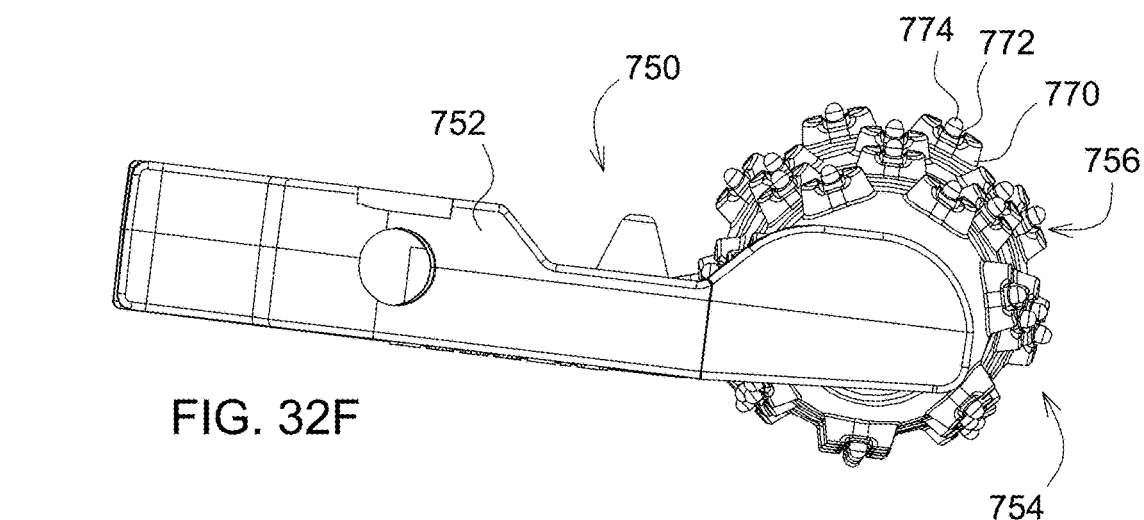
FIG. 32F

SEED METER DISK AND METHODS OF USING THE SAME

INCORPORATION BY REFERENCE TO ANY PRIORITY APPLICATIONS

This application claims priority benefit of U.S. Provisional Application Nos. 63/001,499, filed on Mar. 30, 2020 and 63/002,359, filed on Mar. 31, 2020. All of the above applications are incorporated by reference herein and are to be considered a part of this specification. Any and all applications for which foreign or domestic priority claim is identified in the Application Data Sheet as filed with the present application are hereby incorporated.

BACKGROUND

Field

The present application related generally to systems and methods for metering seed, and more specifically, relates to systems and methods for singulating and metering small seeds from a seed source and into a seed delivery system, e.g., a passive seed delivery system or an active seed delivery system.

Description of the Related Art

An agricultural seeding machine such as a row crop planter or grain drill may be configured to place seeds at a desired depth within a plurality of seed trenches, e.g., parallel seed trenches or furrows, formed in soil. In the case of a row crop planter, a plurality of row crop units, or row units, may be ground driven, e.g., using wheels, shafts, sprockets, transfer cases, chains or the like, or powered by one or more motors, e.g., electric motors or hydraulic motors. Each row crop unit has a frame which is movably coupled to a tool bar. The frame may carry one or more hoppers, e.g., a main seed hopper, an herbicide hopper, and/or an insecticide hopper. If herbicide and/or insecticide are used, the metering mechanisms associated with dispensing the such products, e.g., granular products, into the seed trench may be relatively simple. The metering mechanisms associated with metering and dispensing the seeds at predetermined, relative locations within the seed trench may be relatively complicated.

The mechanisms associated with metering seeds, e.g., from a bulk supply, and placing the seeds, e.g., into the seed trench or furrow, can generally be divided into two systems or groups of components: a seed metering system and a seed placement system (e.g., seed delivery system). Seed metering systems and seed delivery systems may be in communication with each other, e.g., in series communication with each other. For example, a seed metering system may be upstream of and in series with a seed placement system. Such a metering and placement system pair may be included on each row unit of a planter.

Seed metering systems may be configured to receive seeds in a bulk manner, e.g., from a seed hopper carried by the planter frame or a seed hopper carried by the row unit. Different types of seed metering systems may be used, such as, but not limited to, seed plates, finger plates, seed disks, etc. Metering systems comprising a seed disk may have a seed disk formed with a plurality of cells spaced about the periphery of the disk, e.g., seed cells on the seed-side of the disk and/or kick-out cells on the side of the disk opposite the seed-side of the disk (e.g., the vacuum side of the disk). Seeds may be moved into the seed cells with one or more seeds in each seed cell depending upon the size and configuration of the seed cell. A negative air pressure, e.g., vacuum, or positive air pressure differential may be used in conjunction with the seed disk to assist in moving the seeds into the seed cells and/or holding the seeds in the seed cells. Seeds may be singulated and/or discharged at a predetermined rate to the seed placement or delivery system.

In some embodiments, the seed delivery system comprises a gravity drop system. Gravity drop systems may include a seed tube having an inlet end positioned below, positionally or in sequence, and/or in communication with the seed metering system. Seeds from the seed metering system, e.g., singulated seeds from the seed metering system, may therefore drop into the seed tube and pass, e.g., fall, under the influence of at least one conveying force, e.g., at least a gravitational force, through the seed tube to a discharge end thereof where the seed is discharged into the seed trench. In some embodiments, the conveying force may comprise one or more forces, in addition to the gravitational force, e.g., a pneumatic force to accelerate the seed. The seed tube may have a rearward curvature to reduce bouncing of the seed as it strikes the bottom of the seed trench and to impart a horizontal velocity to the seed in order to reduce the relative velocity between the seed and the ground.

SUMMARY

In some embodiments, a seed metering system configured for use in a seed meter of a planting implement to meter a seed, the seed metering system comprises a seed metering disk comprising a first face, a second face, and a circumferential outer edge, and a kick-out wheel assembly. The first face of the seed metering disk may comprise a plurality of seed openings extending into the first face of the seed metering disk and arranged in a circumferential array. The second face of the seed metering disk may comprise a plurality of kick-out pockets extending into the second face of the seed metering disk and arranged in a circumferential array. The circumferential array of seed openings may be spaced radially inward from the circumferential outer edge of the seed metering disk by a distance. The circumferential array of kick-out pockets may be spaced radially inward from the circumferential outer edge of the seed metering disk by the same distance. A seed opening of the plurality of seed openings may be fluidly connected to a kick-out pocket of the plurality of kick-out pockets by a transition section aperture. Each seed opening of the plurality of seed openings may be configured to retain the seed on the first face of the seed metering disk using a pressure differential across the seed metering disk. The seed metering disk may be configured to move the seed along a seed path defined by the circumferential array of seed openings. Each kick-out pocket of the plurality of kick-out pockets may comprise a first pocket side wall extending into the second face of the seed metering disk, a second pocket side wall extending into the second face of the seed metering disk, a leading pocket wall extending into the second face of the seed metering disk, and a trailing pocket wall extending into the second face of the seed metering disk. The leading pocket wall may connect a first end of the first pocket side wall to a first end of the second pocket side wall and the trailing pocket wall may connect a second end of the first pocket side wall to a second end of the second pocket side wall. The kick-out wheel assembly may comprise a kick-out wheel having a protrusion portion and being rotatably held by a kick-out wheel arm. The protrusion portion of the kick-out wheel may comprise a plurality of protrusions. Each protrusion of the plurality of protrusions may comprise a shoulder section, a transition section, and an extension. The shoulder section of the protrusion may comprise a first protrusion side wall, a second protrusion side wall, a leading protrusion wall and a trailing protrusion wall. The leading protrusion wall may connect a first end of the first protrusion side wall to a first end of the second protrusion side wall and the trailing protrusion wall may connect a second end of the first protrusion side wall to a second end of the second protrusion side wall. The kick-out wheel assembly may be configured to be held in biased engagement with the second face of the seed metering disk such that a protrusion of the plurality of protrusions on the protrusion portion of the kick-out wheel extends into a kick-out pocket of the plurality of kick-out pockets on the second face of the seed metering disk.

In some embodiments, a junction of the first pocket side wall of each kick-out pocket of the plurality of kick-out pockets and the second face of the seed metering disk may comprise a generally linear portion, and a junction of the second pocket side wall of each kick-out pocket of the plurality of kick-out pockets and the second face of the seed metering disk may comprise a generally linear portion.

In some embodiments, a junction of the leading pocket wall of each kick-out pocket of the plurality of kick-out pockets and the second face of the seed metering disk may comprise a generally linear portion, and a junction of the trailing pocket wall of each kick-out pocket of the plurality of kick-out pockets and the second face of the seed metering disk may comprises a generally linear portion.

In some embodiments, a junction of the leading pocket wall of each kick-out pocket of the plurality of kick-out pockets and the second face of the seed metering disk may comprise a generally curved portion, and a junction of the trailing pocket wall of each kick-out pocket of the plurality of kick-out pockets and the second face of the seed metering disk may comprise a generally curved portion.

In some embodiments, at least a portion of at least one of the first pocket side wall of each kick-out pocket of the plurality of kick-out pockets and the second pocket side wall of each kick-out pocket of the plurality of kick-out pockets may be generally planar.

In some embodiments, at least a portion of at least one of the leading pocket wall of each kick-out pocket of the plurality of kick-out pockets and the trailing pocket wall of each kick-out pocket of the plurality of kick-out pockets may be generally planar.

In some embodiments, at least a portion of at least one of the first protrusion side wall of the shoulder section of each protrusion of the plurality of protrusions and the second protrusion side wall of the shoulder section of each protrusion of the plurality of protrusions may be generally planar.

In some embodiments, at least a portion of at least one of the leading protrusion wall of the shoulder section of each protrusion of the plurality of protrusions and the trailing protrusion wall of the shoulder section of each protrusion of the plurality of protrusions may be generally planar.

In some embodiments, the shoulder section of a protrusion of the plurality of protrusions may be configured to matingly engage a kick-out pocket of the plurality of kick-out pockets. The transition section of the protrusion of the plurality of protrusions may extend from the shoulder section and may be configured to matingly engage the aperture connecting the seed opening of the plurality of seed openings to a kick-out pocket of the plurality of kick-out pockets. The extension of the protrusion of the plurality of protrusions may extend from the transition section and may be configured to extend at least partially into the seed opening of the plurality of seed openings.

In some embodiments, the protrusion of the plurality of protrusions may be configured to dislodge the seed retained on the first face of the seed metering disk.

In some embodiments, the leading protrusion wall of the shoulder section of each protrusion of the plurality of protrusions may be generally planar, and the leading pocket wall of each kick-out pocket of the plurality of kick-out pockets may be generally planar, and the kick-out wheel of the kick-out wheel assembly may rotates as the seed metering disk rotates such that the generally planar leading protrusion wall of a shoulder section of a protrusion of the plurality of protrusions may rotate into engagement with the generally planar leading pocket wall of a kick-out pocket of the plurality of kick-out pockets.

In some embodiments, each seed opening of the plurality of seed openings may comprise a trumpet shape having a plurality of generally circular cross-sections. A largest circular cross-section of the plurality of generally circular cross sections may lie in the first face of the seed metering disk.

In some embodiments, each seed opening of the plurality of seed openings may comprise a crescent-shaped wedge having a generally linear leading edge and a curved trailing edge. The generally linear leading edge may be generally coplanar with the first face of the seed metering disk. A first end of the curved trailing edge may connect to a first end of the generally straight edge and a second end of the curved trailing edge may connect to a second end of the generally straight edge. The transition section aperture may connect each seed opening to a kick-out pocket at a deepest portion of the crescent-shaped wedge seed opening.

In some embodiments, each seed opening of the plurality of seed openings may be frustoconical. A portion of the frustoconical seed opening having a largest cross-sectional dimension may be coplanar with the first face of the seed metering disk and a portion of the frustoconical seed opening having a smallest cross-sectional dimension may connect to the transition section aperture.

In some embodiments, each seed opening of the plurality of seed openings may comprise a half-egg shape having a rounded end and a pointed end. The transition section aperture may connect each seed opening to a kick-out pocket at a deepest portion of the half-egg-shaped seed opening.

In some embodiments, the seed metering system may further comprise a metallic core circumferential ring. The metallic core circumferential ring may extend from a first radial location inside the circumferential array of seed openings to a second radial location outside the circumferential array of seed openings.

BRIEF DESCRIPTION OF THE DRAWINGS

FIG. 9A shows a seed-side face of the sorghum seed meter disk. FIG. 9B shows a vacuum-side face of the sorghum seed meter disk. FIG. 9C shows a side view of the sorghum seed meter disk.

FIG. 10A shows an enlarged view of the sorghum seed meter disk of FIG. 9A. FIG. 10B shows a cross-sectional view of the seed meter disk of FIG. 10A taken along line 10B 110B. FIG. 10C shows an enlarged view of the cross-sectional view of FIG. 10B.

FIG. 11A shows an enlarged view of the sorghum seed meter disk of FIG. 9B. FIG. 11B shows a cross-sectional view of the sorghum seed meter disk of FIG. 11A taken along line 11B 111B. FIG. 11C shows an enlarged view of the cross-sectional view of FIG. 11B.

FIGS. 12A-12F show various views of a sorghum kick-out wheel assembly configured for use with the sorghum seed meter disk of FIGS. 9A-9C.

FIGS. 14A-14C show various views of a seed meter disk for metering rice. FIG. 14A shows a seed-side face of the rice seed meter disk. FIG. 14B shows a vacuum-side face of the rice seed meter disk. FIG. 14C shows a side view of the rice seed meter disk.

FIGS. 15A-14C show various enlarged and cross-sectional views of the rice seed meter disk of FIGS. 14A-14C. FIG. 15A shows an enlarged view of the rice seed meter disk of FIG. 14A.

FIG. 16A shows an enlarged view of the rice seed meter disk of FIG. 14B. FIG. 16B shows a cross-sectional view of the rice seed meter disk of FIG. 16A taken along line 16B 116B. FIG. 16C shows an enlarged view of the cross-sectional view of FIG. 16B.

FIGS. 17A-17F show various views of a rice kick-out wheel assembly configured for use with the rice seed meter disk of FIGS. 14A-14C.

FIGS. 19A-19C show various views of a seed meter disk for metering soybeans. FIG. 19A shows a seed-side face of the soybean seed meter disk. FIG. 19B shows a vacuum-side face of the soybean seed meter disk. FIG. 19C shows a side view of the soybean seed meter disk.

FIG. 20A shows an enlarged view of the soybean seed meter disk of FIG. 19A. FIG. 20B shows a cross-sectional view of the soybean seed meter disk of FIG. 20A taken along line 20B 120B. FIG. 20C shows an enlarged view of the cross-sectional view of FIG. 20B.

FIG. 21A shows an enlarged view of the soybean seed meter disk of FIG. 19B. FIG. 21B shows a cross-sectional view of the soybean seed meter disk of FIG. 21A taken along line 21B 121B. FIG. 21C shows an enlarged view of the cross-sectional view of FIG. 21B.

FIGS. 22A-22F show various views of a soybean kick-out wheel assembly configured for use with the soybean seed meter disk of FIGS. 19A-19C.

FIGS. 24A-24C show various views of a seed meter disk for metering canola. FIG. 24A shows a seed-side face of the canola seed meter disk. FIG. 24B shows a vacuum-side face of the canola seed meter disk. FIG. 24C shows a side view of the canola seed meter disk.

FIG. 25A shows an enlarged view of the canola seed meter disk of FIG. 24A. FIG. 25B shows a cross-sectional view of the canola seed meter disk of FIG. 25A taken along line 25B 125B. FIG. 25C shows an enlarged view of the cross-sectional view of FIG. 25B.

FIG. 26A shows an enlarged view of the canola seed meter disk of FIG. 24B. FIG. 26B shows a cross-sectional view of the canola seed meter disk of FIG. 26A taken along line 26B 126B. FIG. 26C shows an enlarged view of the cross-sectional view of FIG. 26B.

FIGS. 27A-27F show various views of a canola kick-out wheel assembly configured for use with the canola seed meter disk of FIGS. 24A-24C.

FIG. 29A shows a seed-side face of the wheat seed meter disk. FIG. 29B shows a vacuum-side face of the wheat seed meter disk. FIG. 29C shows a side view of the wheat seed meter disk.

FIG. 30A shows an enlarged view of the wheat seed meter disk of FIG. 29A. FIG. 30B shows a cross-sectional view of the wheat seed meter disk of FIG. 30A taken along line 30B 130B. FIG. 30C shows an enlarged view of the cross-sectional view of FIG. 30B.

FIG. 31A shows an enlarged view of the wheat seed meter disk of FIG. 29B. FIG. 31B shows a cross-sectional view of the wheat seed meter disk of FIG. 31A taken along line 31B 131B. FIG. 31C shows an enlarged view of the cross-sectional view of FIG. 31B.

FIGS. 32A-32F show various views of a wheat kick-out wheel assembly configured for use with the wheat seed meter disk of FIGS. 29A-29C.

DETAILED DESCRIPTION

Figure 1A:
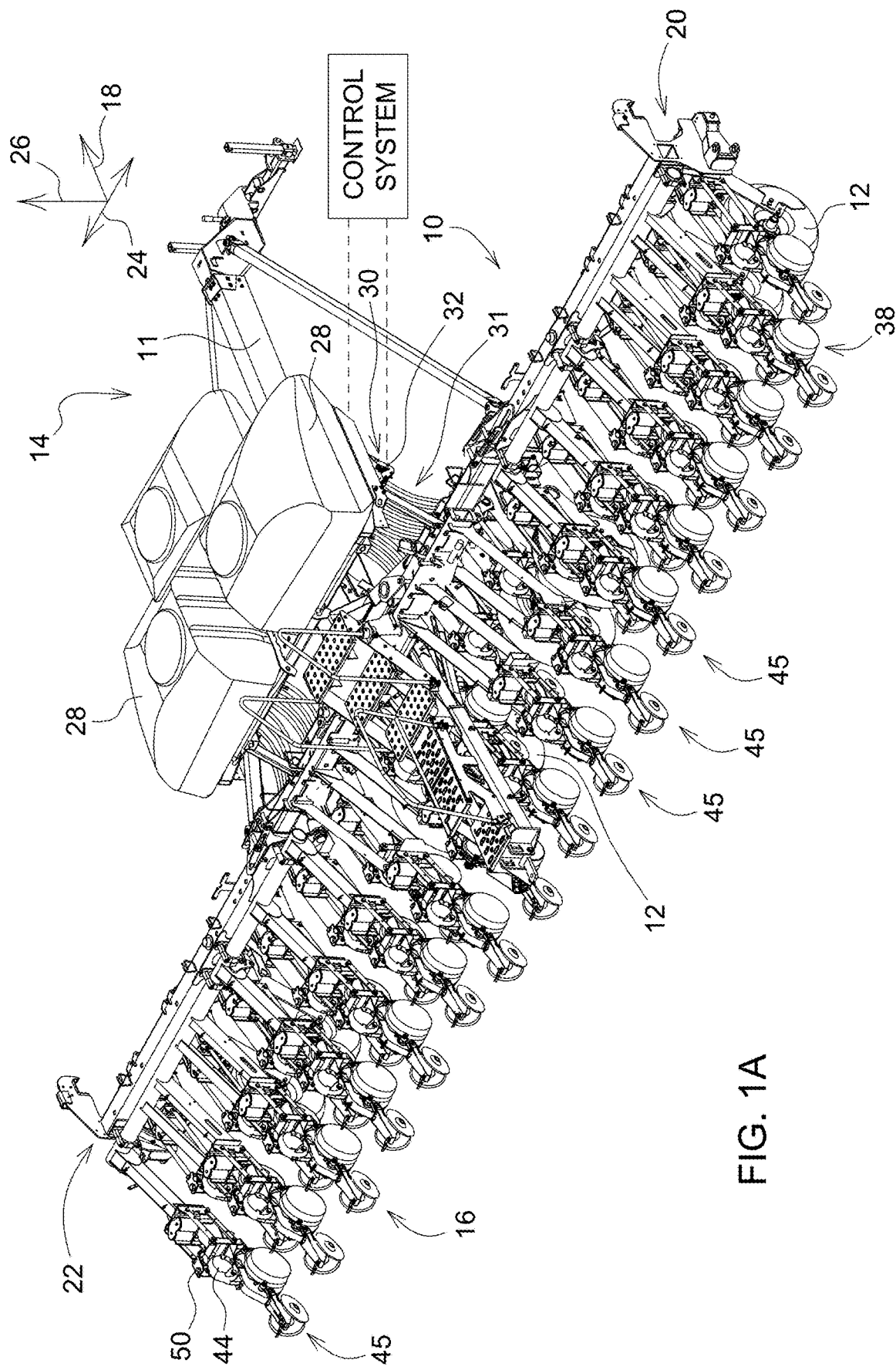
FIG. 1A is a perspective view of a vehicle having a plurality of seed meters.

FIG. 1A illustrates an embodiment of a work vehicle 10. The work vehicle 10 may be a towed work vehicle, e.g., towed by another vehicle (such as a tractor), not shown. The work vehicle 10 may be a self-propelled work vehicle, e.g., comprising its own power source and/or not needing another vehicle for movement. In some embodiments, the work vehicle 10 is an air cart or air seeder. In some embodiments, work vehicle 10 is a planter, e.g., a row crop planter. One or more features of the present disclosure may be included on a different work vehicle, such as, but not limited to, any air seeder, air cart, planter, commodity cart, or any other work vehicle without departing from the scope of the present disclosure.

The work vehicle 10 includes a front end 14, a rear end 16, and a fore-aft axis 18 extending generally between the front end 14 and rear end 16. The work vehicle 10 also includes a first lateral side 20, a second lateral side 22, and a lateral axis 24 extending generally between the first lateral side 20 and the second lateral side 22. A vertical axis 26 extends perpendicular to both the fore-aft axis 18 and the lateral axis 24.

The work vehicle 10 may include a chassis 11 and a plurality of wheels 12. The chassis 11 may be a rigid frame that supports various components of the work vehicle 10 described in additional detail herein. The wheels 12 may support the chassis 11 and enable movement of the work vehicle 10, e.g., along a road and/or across a field.

The work vehicle 10 may include one or more commodity containers 28, e.g., storage tanks. The commodity container 28 may be supported on or by the chassis 11. The commodity container 28 may be disposed proximate the rear end 16 of the work vehicle 10. In some embodiments, the commodity container 28 may be disposed centrally between the first lateral side 20 and the second lateral side 22, e.g., generally along or proximate the fore-aft axis 18. The one or more commodity containers 28 may contain one or more varieties of seed to be deposited into the ground. The one or more commodity containers 28 may also or alternatively contain fertilizer, herbicide, insecticide, and/or other particulate or granular commodities.

The work vehicle 10 may include a commodity metering or distribution system 30. In some embodiments, the metering or distribution system 30 is a seed on-demand metering system (e.g., a central commodity system), such as that shown in connection with the work vehicle 10 in FIG. 1A. In some embodiments, the metering system 30 is a volumetric metering system, such as that shown in connection with work vehicle 10' in FIG. 1B.

The work vehicle 10 may also include an airflow system 32, e.g., a pneumatic system. With continued reference to FIG. 1A, the seed on-demand metering system 30 can include nozzles 31 positioned below the commodity container 28 to receive seeds from the commodity container 28 and to communicate with an airflow system 32.

The airflow system 32 may include at least one fan 34 (not shown in FIG. 1A) that generates a pressure differential, e.g., a flow of air. The flow of air provided by the fan 34 may be directed into and/or through the nozzle 31 of the seed on-demand metering system 30. The airflow system 32 may include a plurality of airflow structures (e.g., plenums, tubes, lines, junctions, etc.) to convey air, e.g., receive air from the fan 34. Commodity contained within the nozzle may be entrained within the airflow from the fan 34 and be carried to a distribution system 36 (not shown in FIG. 1A). The distribution system 36 may include a plurality of hoses, lines, or other conduits that extend to different sections of the work vehicle 10 along one or more of the fore-aft axis 18 and the lateral axis 24 (or combinations of or oblique to such axes).

In operation, airflow generated by the fan 34 enters an upstream side of the nozzle 31, which may contain a quantity of commodity. The airflow picks up or entrains commodity within the nozzle 31 and carries it out the downstream side of the nozzle 31 and into the distribution system 36. The distribution system 36 directs the commodity-containing airflow to a plurality of row units 45.

Each row unit 45 of the work vehicle 10 may include a mini-hopper 50 and seed meter 44. The mini-hopper 50 accepts commodity received from the distribution system 36. The distribution system 36 fills the mini-hopper 50, e.g., fills the mini-hopper 50 until the connection between the distribution system 36 and the mini-hopper 50 becomes occluded or blocked by seed. At the point of port occlusion, insufficient airflow is allowed into the mini-hopper 50 and commodity stops flowing through that line or lines of the distribution system 36. As commodity is used or metered from the mini-hopper 50, e.g., by the seed meter 44, the junction between the distribution system 36 and the mini-hopper 50 can re-open and commodity can again begin to flow. In this way, the seed-on demand system of the present disclosure may serve to automatically keep the mini-hoppers 50 of the row units 45 supplied with commodity.

Each row unit 45 of the work vehicle 10 may include a seed meter 44 for metering, e.g., singulating, commodity from the mini-hopper 50 to or into its final location, e.g., the soil or a furrow or opening in the soil. The row unit 45 may also include a ground system 38 having one or more of openers, tillers, gauge wheels, closers, seed delivery systems (e.g., seed tubes, cartridges with conveyors, e.g., flighted belts or brush belts, etc.), seed farmers, fertilizer deposition systems, etc. These system components may help to prepare the ground or soil for delivery of commodity, e.g., seed, fertilizer, or other metered commodity, delivered to the row unit 45 by the distribution system 36.

The work vehicle 10 may include a control system 40 (not shown in FIG. 1A) for controlling flow of the commodity from the commodity container 28 to the row units 45. In some embodiments, the control system 40 may control actuation and volume and/or flow rate of the fluid flowing through the airflow system. However, in contrast to the work vehicle 10' shown in FIG. 1B and described in greater detail elsewhere herein, the seed on-demand metering system 30 may be a passive or automatic system (as described) that may not require any active input or control for moving or distributing commodity.

During operation of the work vehicle 10 (e.g., when towed by a tractor or other towing vehicle across a field), the commodity from the commodity container 28 is entrained by airflow from the airflow system 31 and carried through the distribution system 36 to the row units 45. At each row unit, the commodity accumulates within the mini-hopper 50 until an air outlet in the mini-hopper 50 is covered by the commodity, thereby generating a pressure build-up within the distribution system 36 upstream of the row unit 45. The increase in air pressure limits further commodity from reaching the row unit 45. The commodity within the mini-hopper 50 is fed (via gravity, or other method) to the seeding meter 44, as described in greater detail herein, where the commodity is metered and directed to the ground.

Figure 1B:
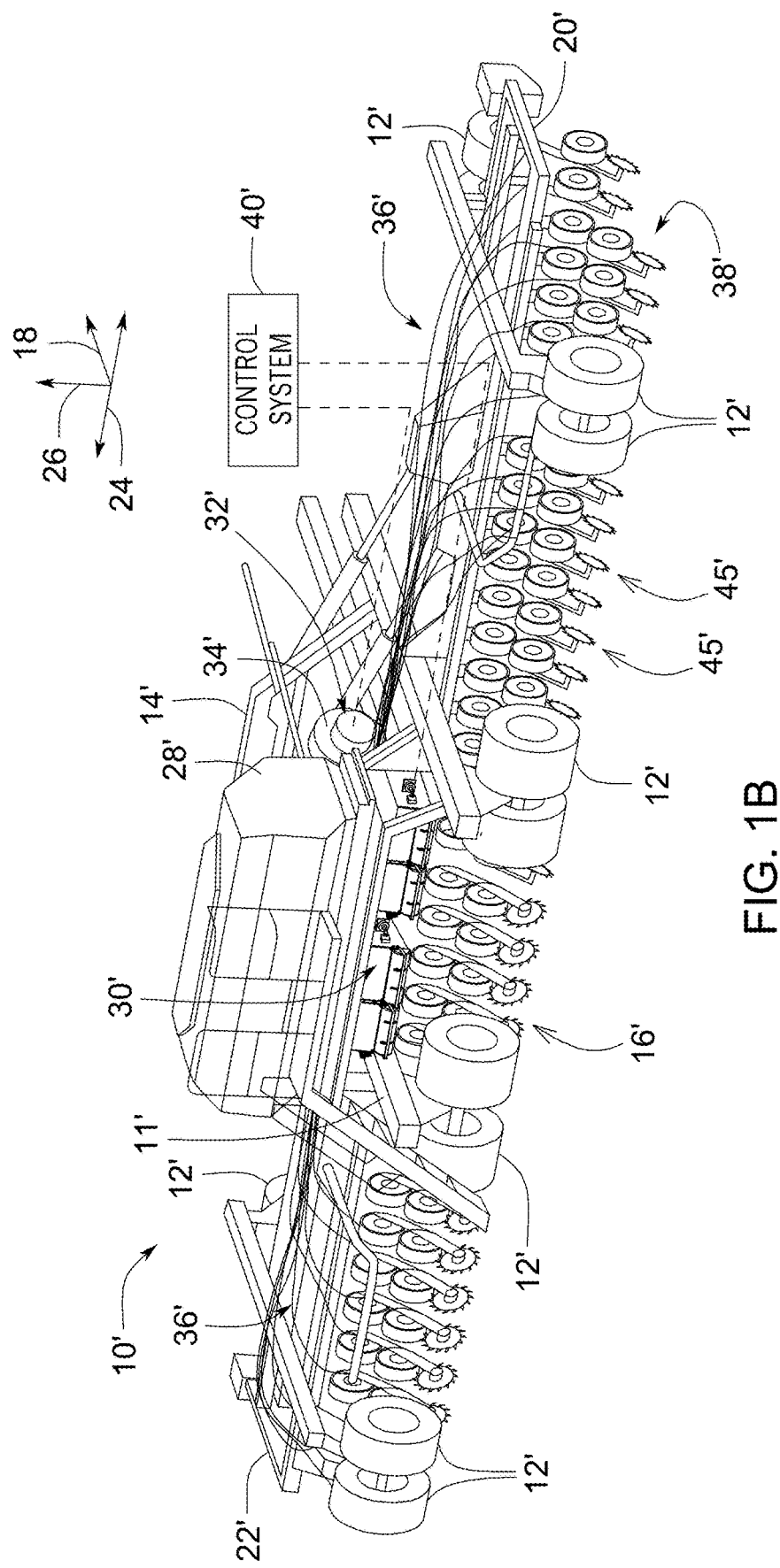
FIG. 1B is a perspective view of another vehicle having a plurality of seed meters.

FIG. 1B illustrates a work vehicle 10' similar to the work vehicle 10 shown in FIG. 1A, except for one or more differences described herein. Like elements are labeled with like reference numbers, differentiated by an apostrophe. The work vehicle 10' shown in FIG. 1B may include any, all, many, or some of the same components and/or features as the work vehicle shown in FIG. 1B. The work vehicle 10' may include a central metering system 30'. The central metering system 30' may be a volumetric metering system. The central metering system 30' may be disposed generally proximate, e.g., underneath, the commodity container(s) 28'. The central metering system 30' may meter out commodity from the commodity container 28' at a controlled rate as the work vehicle 10' operates, e.g., moves across the field. While metering of commodity in the work vehicle 10 of FIG. 1A may occur at the row unit 45 (e.g., seed is merely distributed from the seed on-demand system to the row unit 45 mini-hoppers 50 where is it metered), metering of commodity in the work vehicle 10' of FIG. 1B may occur, at least partially, in the volumetric metering system 30' proximate the commodity container 28' (e.g., commodity is volumetrically metered from the commodity container 28' after which it is pneumatically carried to one or more drills that deposit the metered commodity into the ground, e.g., directly into the ground).

The work vehicle 10' may also include an airflow system 32', e.g., a pneumatic system. The airflow system 32' may include at least one fan 34 that generates a pressure differential, e.g., a flow of air. The airflow system 32' may include a plurality of airflow structures (e.g., plenums, tubes, lines, junctions, etc.) to convey air, e.g., receive air from the fan 34'. The airflow system 32' may include a distribution system 36', which may include a plurality of hoses, lines, or other conduits that extend to different sections of the work vehicle 10' along one or more of the fore-aft axis 18' and the lateral axis 24'.

The work vehicle 10' may include a control system 40', e.g., an active control system. The control system 40' may be in communication with and may be configured to control one or more of the central metering system 30', the airflow system 32', and/or various other components of the work vehicle 10'. In some embodiments, the control system 40' is supported on the work vehicle 10', e.g., wholly supported on the work vehicle 10'. In other embodiments, the control system 40' includes one or more components that are remote from the work vehicle 10'. The control system 40' may be in data, electronic, hydraulic, pneumatic, mechanical, and/or other communication with one or more of the central metering system 30', the airflow system 32', and/or various other components of the work vehicle 10'. In some embodiments, the control system 40' may be in communication with motors, actuators, sensors, and/or other components of the work vehicle 10'.

During operation of the work vehicle 10' (e.g., when passing across a field under its own power or when being towed by a tractor or other towing vehicle across the field), commodity may fall or pass from the commodity container 28' toward the central metering system 30'. The control system 40' may control the central metering system 30' (e.g., by controlled actuation of one or more drive units), to dispense a controlled volume of commodity to pass into the airflow system 32', e.g., at a predetermined rate (e.g., to meter the commodity using the volumetric central metering system 30'). The control system 40' may also control the fan(s) 34' to generate an airstream, e.g., a continuous airstream or a discontinuous airstream, through the airflow system 32'. The airflow system 32' may receive commodity metered by the central metering system 30' from the commodity container 28' where it may flow through the distribution system 36' across the work vehicle 10', and, ultimately, to the soil.

Figure 2:
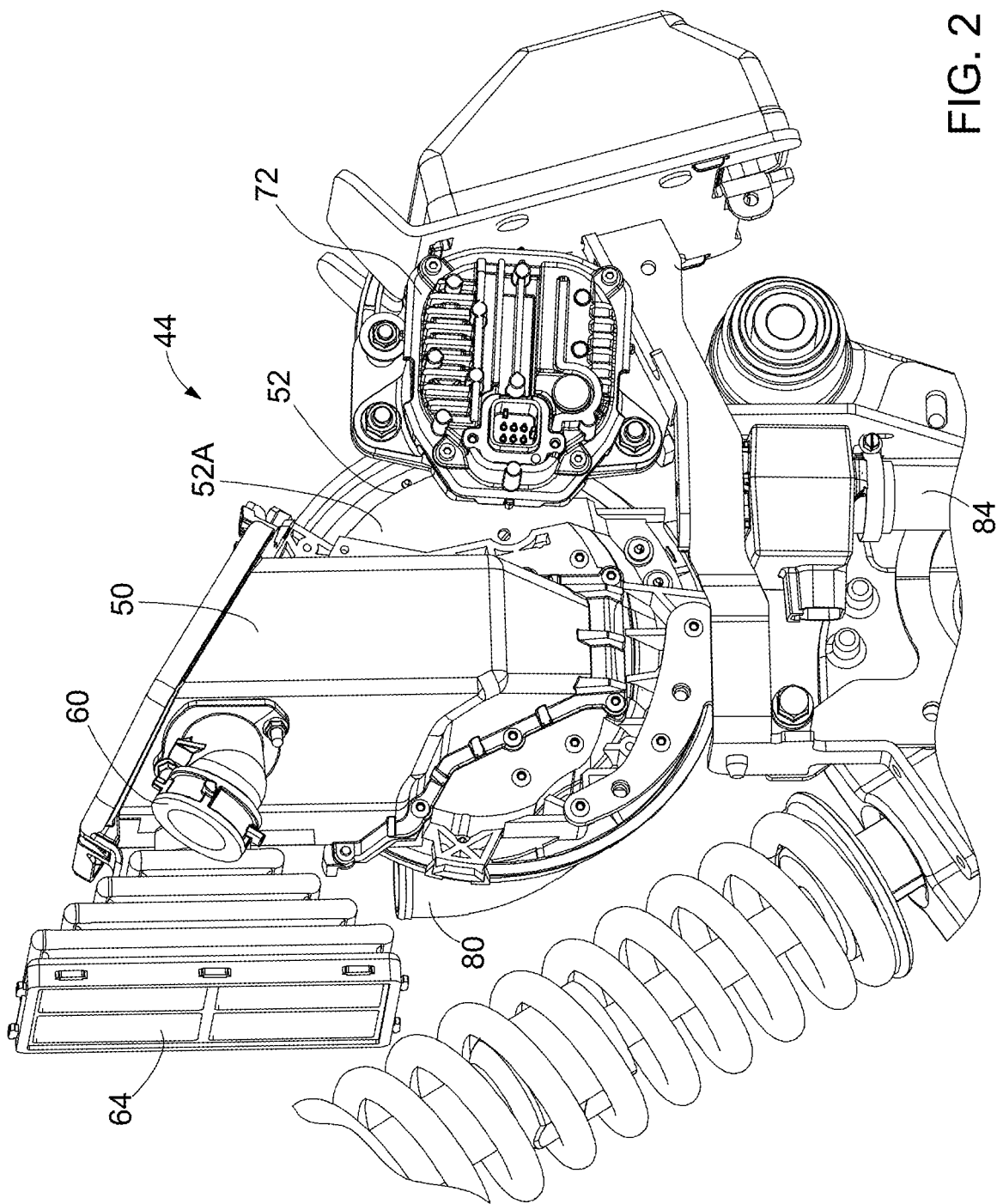
FIG. 2 is a perspective view of a seed meter.
Figure 3:
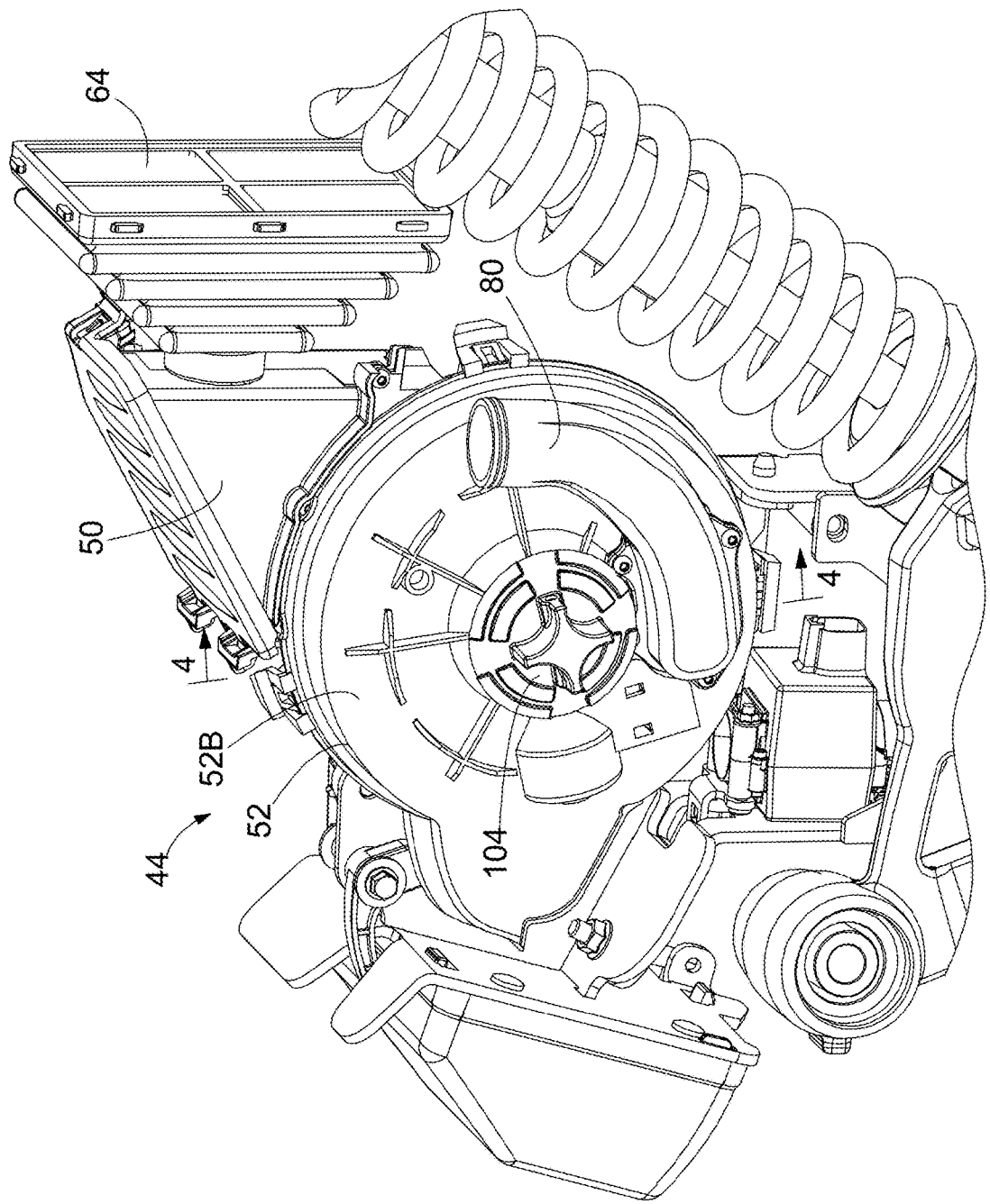
FIG. 3 is another perspective view of the seed meter shown in FIG. 2.
Figure 4:
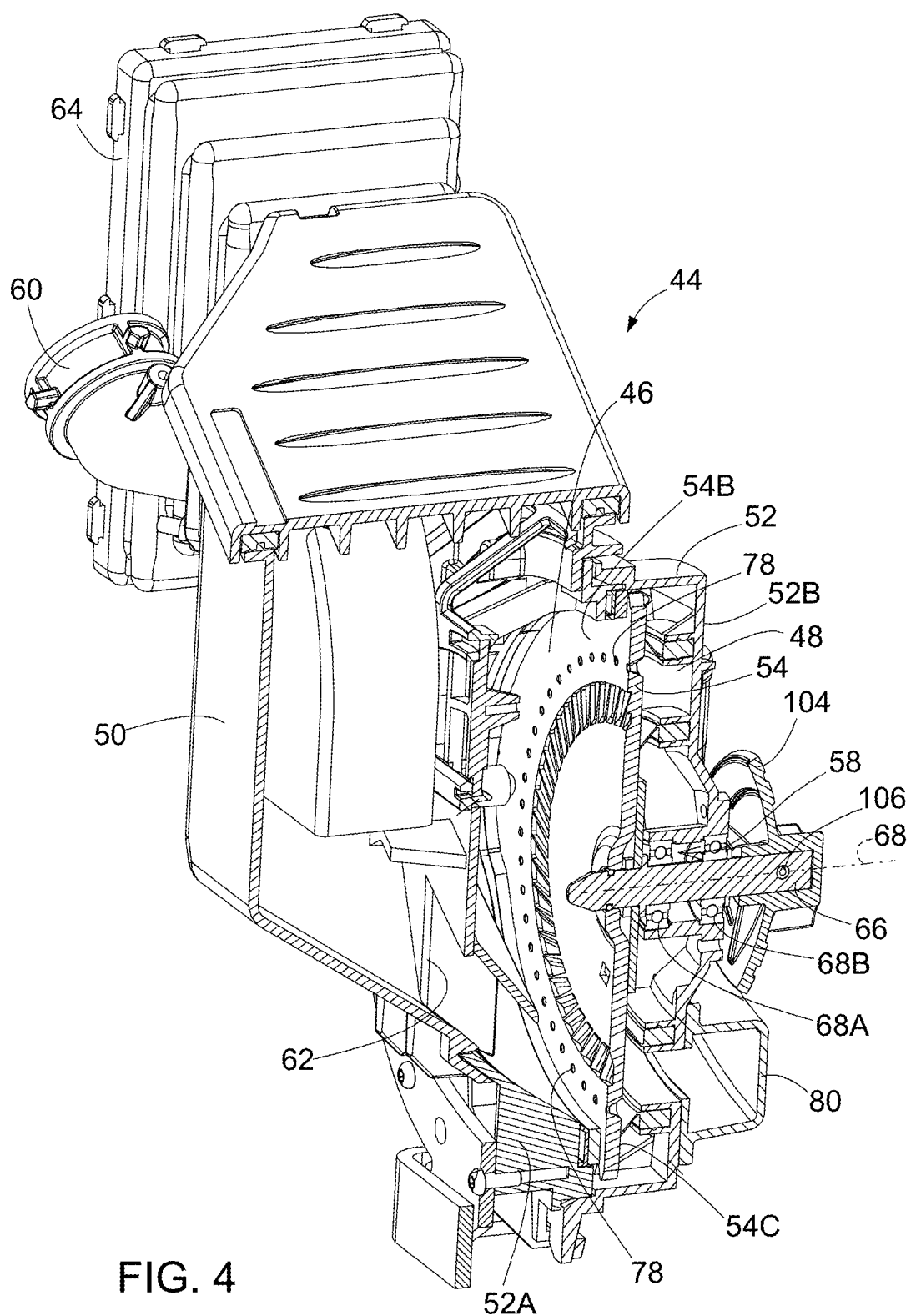
FIG. 4 is a perspective view of a cutaway of the seed meter shown in FIGS. 2 and 3, showing a metering member mounted on a hub.

As shown in FIGS. 2-4, the seed meter 44 may include one or more of, among other things, a hopper 50 (e.g., a mini-hopper), a housing 52 supporting and/or enclosing a metering member, such as a seed meter disk 54 (shown at least in FIG. 4, which is a cross-section of the metering system shown in FIG. 3, taken along line 414) (or, simply, seed disk or singulating disk), a singulator (shown in FIGS. 7-8), and a motor 72 for driving the metering member, e.g., the seed meter disk 54. While the metering system on each row unit row unit 45 is discussed herein as being a seed meter 44, it should be understood that the metering system may alternatively be used to meter other types of commodity, e.g., commodity other than seed.

The mini-hopper 50 is configured to accept/receive commodity from the commodity container 28, 28' (shown in FIGS. 1A-1B) (e.g., dispensed from the commodity container 28, 28' by the central metering system 30, 30') via hopper inlet 60 and, at least temporarily, store such commodity for subsequent or later metering by the seed meter 44. As shown in FIG. 2, the hopper inlet 60 may be located adjacent or near the top of the mini-hopper 50 such that commodity, e.g., seeds, entering the mini-hopper 50 can be directed, e.g., by gravity, to a seed outlet, e.g., of the mini-hopper 50, or seed disk housing inlet 62 (an example of which is shown in FIG. 4) in communication with the interior of the seed disk housing 52. With continued reference to FIG. 2, the mini-hopper 50 may further include an air inlet 64 positioned adjacent the hopper inlet 60 and for providing an airflow through the mini-hopper 50 and into the seed disk housing 52. The mini-hopper 50 and/or the seed inlet 60 may also or alternatively to air inlet 64 include one or more air flow exhaust screens or ports (not shown), which can provide a passage for air, but not seeds, to pass through such that the airflow that entrains the seeds to the mini-hopper 50 may be expelled or vented therethrough. As the seeds fill the mini-hopper 50, the seeds cover the exhaust screens and/or air passages (e.g., air inlet 64), thereby generating a back-pressure that slows the upstream air stream velocity to the point where the air stream will no longer pick up seeds at the nozzle (e.g., nozzle 31 shown in FIG. 1A), and will not deliver additional seeds to the mini-hopper 50 until the level of seeds within the mini-hopper 50 decreases and lessens the back-pressure.

The seed disk housing 52 may include two parts, e.g., two halves, including a front-side or seed-side portion 52A and a rear-side or vacuum-side portion 52B. The seed meter disk 54 may be housed therebetween, within the seed disk housing 52.

In some embodiments, and as shown in FIG. 4, an axle or hub 66 may be rotatably mounted within the seed disk housing 52, e.g., mounted within bearings 68A, 68B. Bearings 68A, 68B may be positioned within, e.g., held by, a cavity or aperture 58 in the vacuum-side or rear-side portion 52B of the seed disk housing 52 and defines an axis of rotation 68. The seed meter disk 54 may be mounted to the hub 66 and rotate therewith about the axis of rotation 68.

Figure 5A:
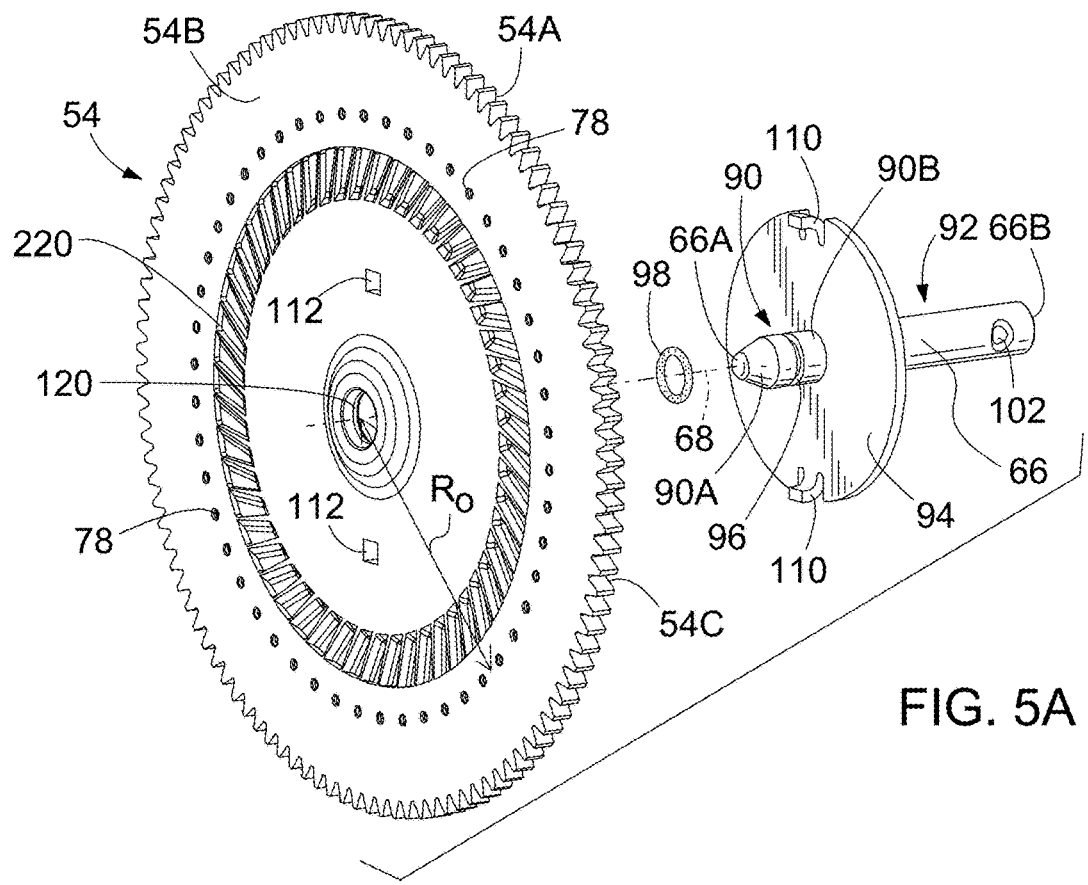
FIG. 5A is an exploded view of the metering member and the hub according to one embodiment.
Figure 5B:
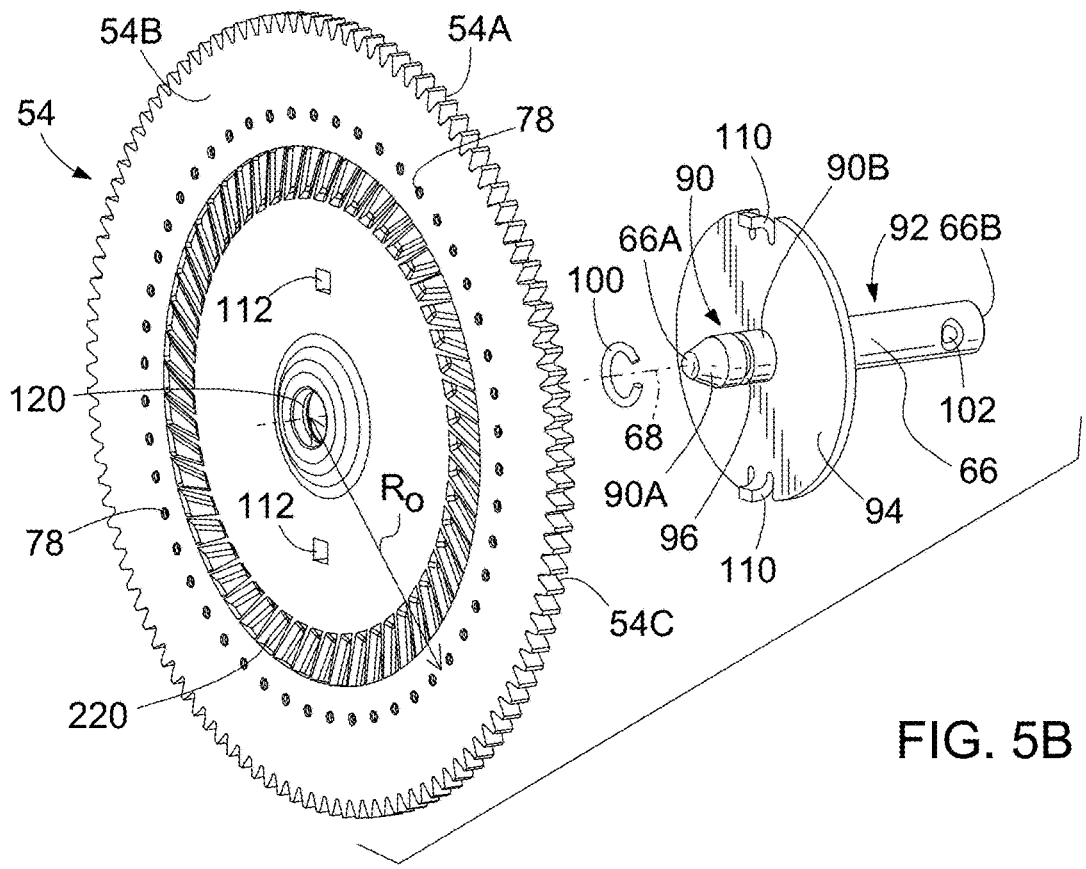
FIG. 5B is an exploded view of the metering member and the hub according to another embodiment.
Figure 6:
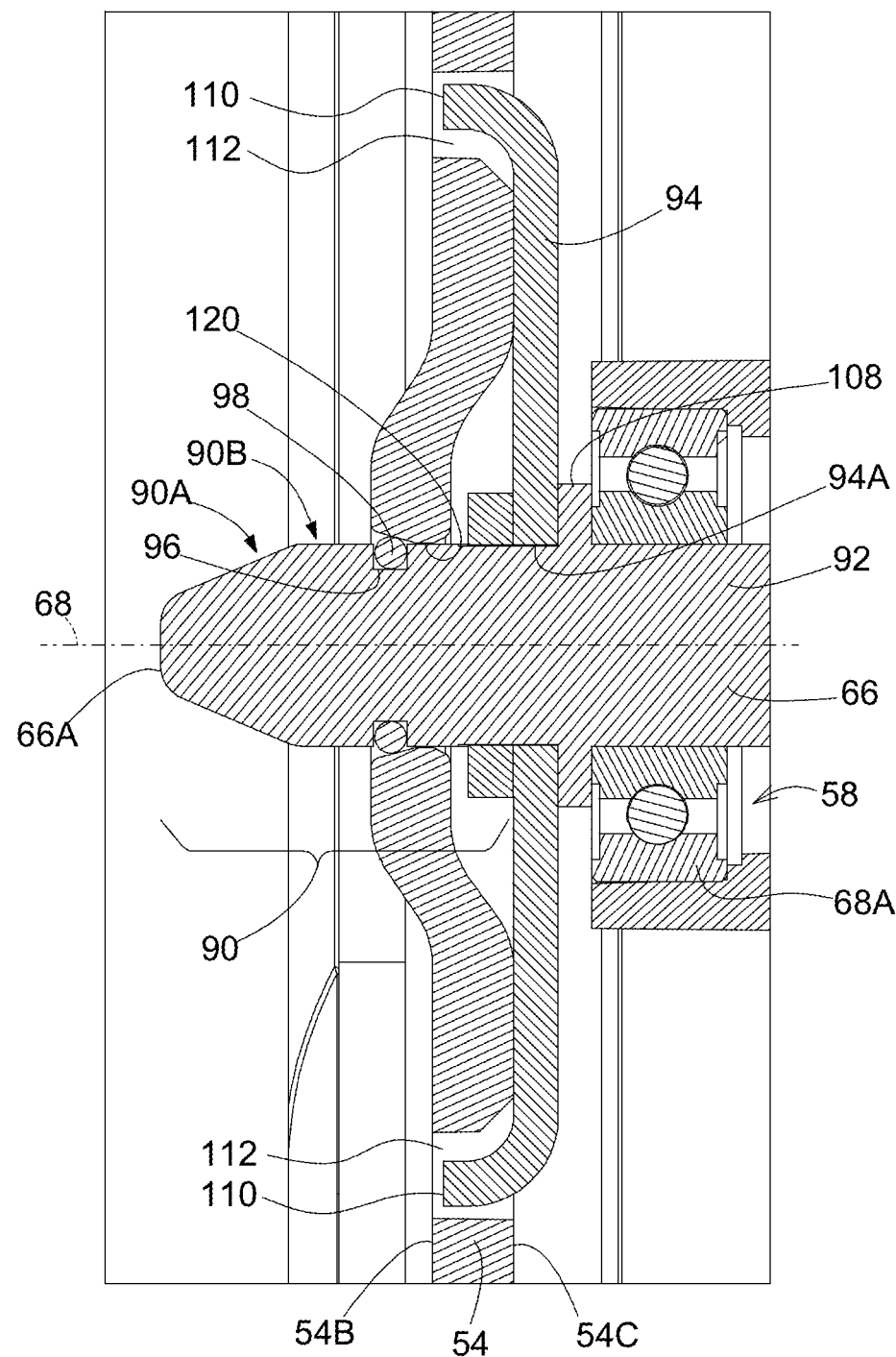
FIG. 6 is a cross-sectional view of the interface between the metering member and the hub.

As shown in FIGS. 5A-5B, the seed meter disk 54 may be constructed as a gear (e.g., a spur gear) defined by a wheel having radially extending teeth 54A, a seed-side face 54B, and a vacuum-side face 54C. With renewed attention to FIG. 4, a first volume, compartment, or cavity 46 is defined within the seed disk housing 52 between the front-side or seed-side portion 52A of the seed disk housing 52 and the seed meter disk 54. A second volume, compartment, or cavity 48 is defined within the seed disk housing 52 between the vacuum-side or rear-side portion 52B of the seed disk housing 52 and the seed meter disk 54. Both of the faces of the seed meter disk 54, the seed-side face 54B and vacuum-side face 54C, may be generally planar, though they can deviate from planar to define apertures (such as apertures 78, 112, 120, and agitator pockets 220, as described herein) and to accommodate mounting to the hub 66, as shown in FIGS. 5A-6.

Figure 7:
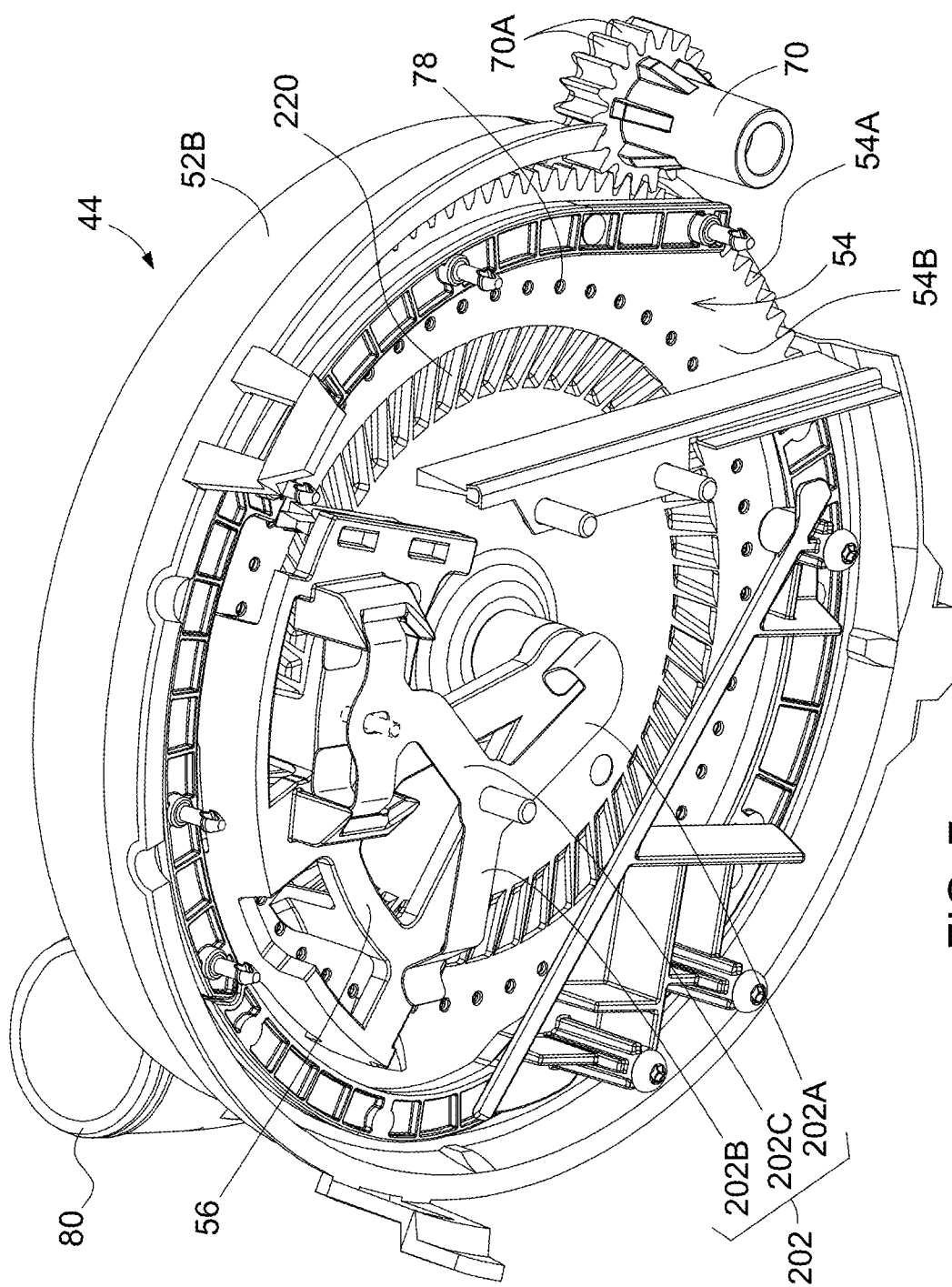
FIG. 7 is a perspective view of the seed meter with a portion of the meter housing removed to reveal a seed meter disk and seed singulator according to one embodiment of the present disclosure.

The seed meter disk 54 may include a plurality of teeth 54A on an outer edge of the disk, e.g., on an outer circumferential edge of the seed meter disk 54. As shown in FIG. 7, the teeth 54A may mesh with drive teeth 70A of a motor output gear 70. In some embodiments, the teeth 54A of the seed meter disk 54 mesh directly with the drive teeth 70A. In some embodiments, the teeth 54A of the seed meter disk 54 mesh indirectly with the drive teeth 70A, e.g., via an intermediate gear. Actuation of the motor 72, shown in FIG. 2, rotates the motor output gear 70, thereby rotating the seed meter disk 54 about the axis of rotation 68. The motor 72 and the output gear 70 represent only one embodiment of a seed meter drive unit that is selectively energized to drive rotation of the seed meter disk 54. Though many others are envisioned. In some embodiments, the seed meter disk 54 is rotated by a drive unit, e.g., the motor 72, in a single, predefined direction of rotation, R. In some embodiments, the seed meter disk 54 is rotated by a drive unit, e.g., the motor 72, in two directions of rotation, e.g., in the direction of rotation R and the direction of rotation opposite R.

The seed meter disk 54 further includes a plurality of apertures or openings, e.g., seed openings 78, located on the seed-side face 54B of the seed meter disk 54 and extending at least partially through the seed meter disk 54 to the vacuum-side face 54C of the seed meter disk. In this way, each seed opening 78 may define a passage through the seed meter disk 54, e.g., from the seed-side face 54B of the seed meter disk 54 to the vacuum-side face 54C of the seed meter disk 54. The seed openings 78 may be adapted for a particular or predetermined seed type, e.g., such that the seed openings are smaller (e.g., just or marginally smaller) than the particular or predetermined seed type, so that the seeds may not pass through the seed openings 78. In this way, commodity, e.g., seeds, can be retained by, held against, or adhered to the seed openings 78 and carried away from the seed pool as the seed meter disk 54 rotates.

The seed openings 78 may be provided in a circumferential array along the seed meter disk 54. The spacing of the seed openings 78 may be even or uneven, although a full circumferential array of seed openings 78 with even spacing is illustrated here. In some embodiments, as shown in FIGS. 5A and 5B, the circumferential array of seed openings 78 is arranged in or comprises a single row of seed openings 78, e.g., each seed opening 78 of the circumferential array of seed openings 78 being disposed at a single distance, $R_0$, from the center of the seed meter disk 54. In some embodiments, the circumferential array of seed openings 78 is arranged in or comprises multiple rows of seed openings 78. For example, a single seed disk 54 may have two, three, or more rows or circumferential arrays of seed openings 78. In this way, each seed opening 78 of a first circumferential array of seed openings 78 may be located at a first distance, $R_1$, from the center of the seed meter disk 54, each seed opening 78 of a second circumferential array of seed openings 78 may be located at a second distance, $R_2$, from the center of the seed meter disk 54, and each seed opening 78 of a third circumferential array of seed openings 78 may be located at a third distance, $R_3$, from the center of the seed meter disk 54, etc. As disclosed herein, a seed meter disk 54 may have multiple rows or circumferential arrays of seed openings 78. In some embodiments, a seed meter disk has one row of seed openings. In some embodiments, a seed meter disk has more than one row of seed openings 78, such as 2 rows, 3 rows, 4 rows, 5 rows, 6 rows, 7 rows, 8 rows, 9 rows, or 10 rows of seed openings 78, or any number of rows of seed openings 78 that facilitates the needed quantity of commodity to be deposited, e.g., the required population. It will be easily understood that increasing the number of circumferential arrays of seed openings 78 will increase the number of seeds picked up by the seed meter disk 54 in each rotation of the seed meter disk 54.

As illustrated, each row or array of seed openings 78 is located on the seed meter disk 54 at a single, fixed radial distance from the central axis of rotation 68. However, the seed openings 78 of a single circumferential array of seed openings 78 may be staggered, e.g., the seed openings 78 of a single circumferential array of seed openings 78 may have one, two, three, or more than three radial distances from the central axis of rotation 68. For example, including multiple radii for a single circumferential array of seed openings 78 could result in an array of seed openings 78 having a roughly sinusoidal shape, a saw tooth shape, or any other annular shape that is desired and beneficial.

Seed agitators of various construction, such as agitator pockets 220, may be located on the seed-side face 54B of the seed meter disk 54. For example, agitator pockets 220 may be formed in a circumferential array at a radial position adjacent the row(s) of seed openings 78. FIGS. 5A and 5B illustrate a circumferential array of agitators comprising a single row or circular/circumferential array of agitator pockets 220 formed in the seed-side face 54B of the seed meter disk 54. In some embodiments, a row of agitator pockets 220 is located radially inward of the seed openings 78. In some embodiments, a row of agitator pockets 220 is located radially outward of the seed openings 78. In some embodiments, a row of agitator pockets 220 is located both radially inward of the seed openings 78 and radially outward of the seed openings. In some embodiments, rows of agitator pockets 220 and rows of seed openings 78 alternate, e.g., an innermost row of agitator pockets 220, followed by a row of seed openings 78, followed by a row of agitator pockets 220, followed by a row of seed openings 78, etc. (the outermost row may be seed openings 78 or the outermost row may be agitator pockets 220—the innermost row may be seed openings 78 or the innermost row may be agitator pockets 220). The agitator pockets 220 can assist in stirring-up or agitating the seeds in the seed pool for encouraging seed retention within the seed openings 78 as the seed meter disk 54 rotates.

Turning to FIG. 3, the rear side of the seed disk housing 52, i.e., the vacuum-side or rear-side portion 52B, includes an air outlet 80 that may be attached to a vacuum source (not shown) to draw air from within the vacuum-side or rear-side portion 52B of the seed disk housing 52, thereby creating a pressure differential across the seed meter disk 54. The seed disk housing 52, i.e., the front-side or seed-side portion 52A, further includes a seed outlet or opening (not shown) for transferring the seeds (and likely some air) from the seed disk housing 52 and to the ground via an outlet, e.g., a chute 84 (as shown in FIG. 2).

In operation, commodity, e.g., seed, is transferred, e.g., dispersed, from the commodity container 28 to the mini-hoppers 50 on the various, e.g., each, row units 45 via the distribution system 36. The commodity enters the mini-hopper 50 through the hopper inlet 60. The commodity, e.g., seeds, collect within the mini-hopper 50. The motor 72, or other driving system, is actuated by a controller (not shown) to rotate the seed meter disk 54 (for example, by the meshing interface of teeth 54A and drive teeth 70A). Simultaneously, or previously, a vacuum source is actuated to create a pressure differential across the seed meter disk 54, thereby providing a suction force at the seed openings 78 and holding the seeds against the seed openings 78 as the seed meter disk 54 rotates. As discussed, the seed meter 44 may be a vacuum seed meter in which the pressure on the seed side of the seed meter disk 54 is made higher than the pressure on the opposite side of the seed meter disk 54 (e.g., the second cavity 48 on the vacuum-side face 54B of the seed meter disk 54) by removing fluid, e.g., air, from the opposite side of the seed meter disk 54. In some embodiments of a vacuum seed meter, the pressure on the seed side of the seed meter disk 54 is approximately atmospheric while the pressure on the opposite side of the seed meter disk 54 is less than atmospheric. In some embodiments of a vacuum seed meter, one or both sides of the seed meter disk 54 are below atmospheric pressure (though, the side of the seed meter disk 54 opposite the seed side of the seed meter disk 54 will have a lower relative pressure compared to the seed side of the seed meter disk 54). In some embodiments, the seed meter 44 is a positive pressure seed meter in which the pressure on the seed side of the seed meter disk 54 is made higher than the pressure on the opposite side of the seed meter disk 54 (e.g., the second cavity 48 on the vacuum-side face 54B of the seed meter disk 54) by adding fluid, e.g., air, into the seed side of the seed meter disk 54. In some embodiments of a positive pressure seed meter, the pressure on the seed side of the seed meter disk 54 higher than atmospheric while the pressure on the opposite side of the seed meter disk 54 is approximately atmospheric. In some embodiments of a positive pressure seed meter, one or both sides of the seed meter disk 54 are above atmospheric pressure (though, the seed side of the seed meter disk 54 will have a higher relative pressure compared to the opposite side of the seed meter disk 54).

Figure 8:
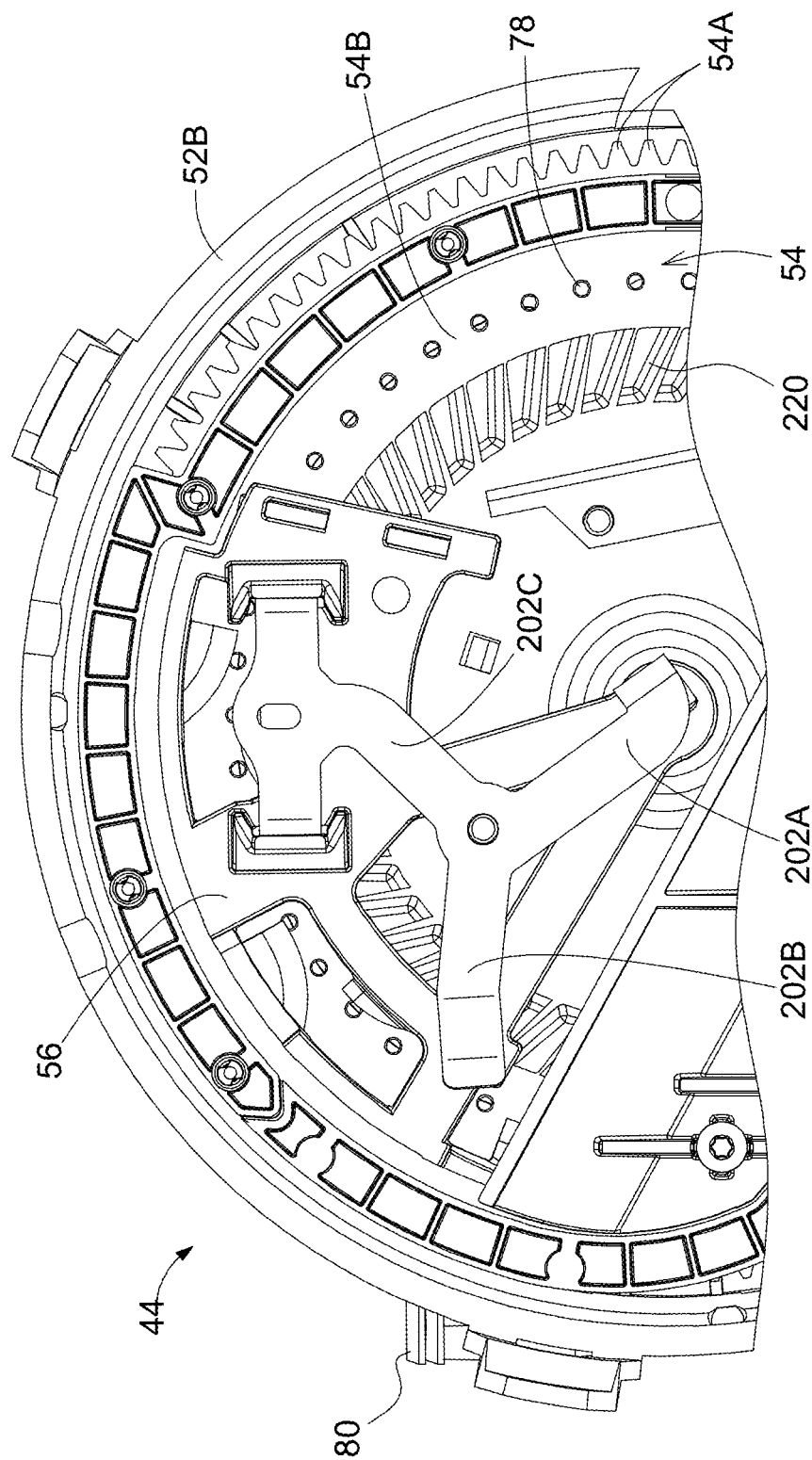
FIG. 8 is a front view of the seed meter with the singulator of FIG. 7.

A singulator 56, as shown in FIGS. 7 & 8, may knock off extraneous seeds (those seeds not within one of the seed openings 78 or where two or more seeds are adhered to a single seed opening 78) such that each seed opening 78 corresponds to or holds only a single seed. Once rotated past the singulator 56, the seeds may be kicked out, ejected from, or dislodged from the seed opening 78, for example, using a knock-out wheel as disclosed herein. The seeds may then fall down the seed outlet 82, through the chute 84, and to the ground to be planted.

As shown in FIGS. 5A, 5B, and 6, the hub 66 is a cylindrical post having a head portion 90 and a body portion 92 separated by a round plate structure 94. The head portion 90 of the hub 66 may comprise one or more sections or portions, such as a cylindrical portion 90B and a nose portion 90A. The cylindrical portion 90B of the head portion 90 may include an annular channel 96 inset into the outer surface of the cylindrical portion 90B. The annular channel may engage or retain a retention member 98, such as an elastomeric O-ring (as shown in FIGS. 5A, 6) or a metal C-ring 100 (as shown in FIG. 5B). The nose portion 90A of the head portion 90 may be formed as a truncated cone (i.e., conical frustum or a frustoconical portion) centered on the axis of rotation 68 of the hub 66. The nose portion 90A may be any other shape conducive to loading or accepting a seed meter disk 54. For example, the nose portion 90A may be hemispherical, or conical, or frustoconical, or frustospherical, etc. A first axial end 66A of the hub 66 is defined by the tip of the nose portion 90A, e.g., the truncated cone, the first axial end 66A having a cross-sectional area (and diameter) that is less than the cross-sectional area (and diameter) of the base of the nose portion 90A, e.g., the truncated cone. The base of nose portion 90A, e.g., the truncated cone, may be similar, e.g., the same, in cross-sectional area (and diameter) to the cylindrical portion 90B of the head 90, excepting for the decreased cross-sectional area of the annular channel 96.

The body portion 92 of the hub 66 may be cylindrical and may have a diameter sized to engage the bearings 68A, 68B in the vacuum-side or rear-side portion 52B of the seed disk housing 52. The body portion 92 of the hub 66 may extend from the head portion 90 (or from the plate structure 94) to a second axial end 66B, opposite the first axial end 66A. In some embodiments, the body 92 includes a through hole, e.g., a radial through hole 102, that extends transverse to the axis of rotational 68 adjacent to the second axial end 66B of the hub 66, e.g., closer to the second axial end 66B of the hub 66 than to the first axial end 66A of the hub.

As shown in FIG. 4, a handle 104 may be mounted on or to the second axial end 66B of the hub 66 to permit or facilitate rotation, e.g., selective or manual rotation, of the hub 66 relative to the seed disk housing 52. The handle 104 is configured to slide over the second axial end 66B of the hub 66, e.g., covers the second axial end 66B. The handle 104 may have an inner diameter seated against the outer diameter of the body 92 of the hub 66. Once seated, an aperture (not shown) in the handle 104 may be aligned with the through hole 102 and a fastener 106 (e.g., a threaded fastener, a pin, a rivet, etc.) positioned in the aperture in the handle 104 and the through hole 102 such that rotation of the handle 104 results in rotation of the hub 66. Alternatively, the handle 104 may be attached or coupled, e.g., reversibly or irreversibly fixed, to the hub 66 without a fastener 106 (e.g., press fit) or with an alternative fastener such as an adhesive. Any other fastening or attachments may be used to fasten or attach the handle 104 to the hub 66.

As shown in FIG. 6, the hub 66 may include a collar 108. In some embodiments, the collar 108 is integrally formed with the head portion 90 and the body portion 92 at a location between the head portion 90 and the body portion 92. In some embodiments, the collar 108 may be separately formed from the hub 66, then attached, e.g., fixed, to the hub 66 at a location between the head portion 90 and the body portion 92. The collar 108 may have a larger circular cross-sectional area, e.g., a larger radius or diameter when measured perpendicular to the axis of rotation 68, than the cross-sectional area of the body portion 92 and can function as a backstop, e.g., support or supporting structure, for the plate structure 94. Furthermore, the collar 108 may function as a spacer between the plate structure 94 and the bearing 68A.

The plate structure 94 may be a generally flat plate, e.g., generally flat, circular plate, and includes a central aperture 94A at the center of the plate structure 94 (aligned with the rotational axis 68 when assembled) for sliding over the head portion 90 of the hub 66. Once in place, e.g., abutted, against the collar 108, the plate structure 94 may be fixed to the collar 108 to prevent rotation and/or axial translation of the plate structure 94 relative to the collar 108. For example, the plate structure 94 may be fixed to the collar 108 using an adhesive, a weld, a press fit, or a fastener.

Two protrusions, e.g., prongs 110, extend generally axially (i.e., generally in the axial direction defined by the rotational axis 68) from the periphery of the plate structure 94 toward the head portion 90 of the hub 66. The prongs 110 may correspond to mating apertures 112 in the vacuum-side face 54C of the seed meter disk 54 (the mating apertures 112 may extend partially or entirely through the thickness of the seed meter disk 54 from the vacuum-side face 54C to the seed-side face 54B). In some embodiments, the seed meter disk 54 is driven using the motor output gear 70 and drive teeth 70A. In such embodiments, rotation of the seed meter disk 54 induces, causes, or results in rotation of the hub 66, at least in part, because of positive engagement of the prongs 110 and the mating apertures 112 in the seed meter disk 54. In some embodiments, the seed meter disk is not driven using the motor output gear 70 and drive teeth 70A. In some embodiments, the hub 66 is driven. For example, a motor or other actuator may be directly or indirectly coupled, e.g., direct drive or geared drive, to the hub 66 (not shown). In such embodiments, rotation of the hub 66 induces, causes, or results in rotation of the seed meter disk 54, at least in part, because of positive engagement of the prongs 110 and the mating apertures 112 in the seed meter disk 54.

While the figures, particularly FIGS. 5A-5B, illustrate the plate structure 94 having two prongs 110, the plate structure 94 may have more than two prongs 110 or the plate structure 94 may have fewer than two prongs 110. It will be understood that the number of prongs 110 included on the plate structure 94 may advantageously correspond to the number of mating apertures 112 included on each seed meter disk 54. For example, the plate structure 94 may have no prongs, e.g., the plate structure 94 may hold the seed-side face 54B using friction or another type of engagement, e.g., like a clutch. The plate structure 94 may have only one prong 110. The plate structure 94 may have 2 prongs 110, 3 prongs 110, 4 prongs 110, 5 prongs 110, 6 prongs 110, or more prongs 110. In some embodiments, i.e., embodiments in which an even number of prongs 110 are used (e.g., 2, 4, 6 etc.), the prongs 110 are diametrically opposed from one another (i.e., antipodal points). In some embodiments, the prongs 110 are evenly spaced around the plate structure 94. For example, a prong 110 may be included on the plate structure 94 at a set interval, which may be defined as 360/the number of prongs 110. In other embodiments, the prongs 110 are not spaced evenly around the plate structure 94.

FIGS. 5A-5B illustrate the prongs 110 being substantially at an outer periphery of the plate structure 94. While this configuration may impart an advantageous torque on the seed meter disk 54 by the plate structure 94 or, conversely, on the plate structure 94 by the seed meter disk 54, other configurations are possible. For example, all prongs 110 may be located at a fixed radial distance from the center of the plate structure 94 (an example is all prongs 110 being located on the periphery of the plate structure 94, another example is all prongs 110 being located halfway between the innermost and outermost edges of the plate structure 94). In other examples, the prongs 110 may be located at varied radial distances from the center of the plate structure 94.

As is discussed in additional detail herein, the seed meter disk 54 includes a number of seed openings 78. In some embodiments, the seed meter disk 54 includes apertures 112. In some embodiments, the seed meter disk 54 includes a central mounting aperture 120 for mounting to the hub 66, and, specifically, to the head portion 90 of the hub 66. In some embodiments, the seed meter disk 54 does not include a central mounting aperture 120. For example, the seed meter disk 54 may be solid at its center and held to the plate structure 94 using, partially or entirely, the mating engagement of the prongs 110 and the mating apertures 112. In embodiments of the seed meter disk 54 having a central mounting aperture 120, the central mounting aperture 120 extends from the seed-side face 54B of the seed meter disk 54 through to the vacuum-side face 54C (or vice versa), defining an opening or channel therebetween. In some embodiments, as shown in FIG. 6, the diameter of the mounting aperture 120 is variable, e.g., varied, from the seed-side 54B to the vacuum-side 54C of the seed meter disk 54. For example, the diameter of the central mounting aperture 120 may decrease (e.g., linearly, parabolically, etc.) from the seed-side face 54B of the seed meter disk 54 to the vacuum-side face 54C of the seed meter disk 54. In some embodiments (not shown), the diameter of the central mounting aperture 120 is substantially constant from the seed-side face 54B to the vacuum-side face 54C of the seed meter disk 54, e.g., the central mounting aperture 120 may be a substantially cylindrical through-hole at the center of the seed meter disk 54.

Assembly of the seed meter 44 may include mounting the seed meter disk 54 within the seed disk housing 52. The bearings 68A, 68B may be positioned within the cavity 58 in the vacuum-side or rear-side portion 52B of the seed disk housing 52, where they may be fixed axially by a press fit, spacer, adhesive, or other fastener to prevent the outer race of the bearings 68A, 68B from rotating relative to the seed disk housing 52. The second axial end 66B of the hub 66 is inserted, e.g., axially inserted, through the bearings 68A, 68B from an interior of the seed disk housing 52 such that the second axial end 66B of the axle 66 passes through both bearings 68A, 68B. The hub 66 may be considered inserted, e.g., fully inserted, into the bearings 68A, 68B when the spacer or collar 108 contacts or abuts the first bearing 68A. With the collar 108 positioned against the bearing 68A, the second axial end 66B may extend past the housing 52 a distance to permit assembly or connection of the handle 104 to the hub 66.

The round plate structure 94 may be placed over the nose portion 90A of the first axial end 66A of the hub 66. The plate structure 94 may then be seated axially against the collar 108. The round plate structure 94 may be fixed to the head portion 90 or the collar 108 via a press fit, weld, adhesive, or another fastener (e.g., threaded fastener, rivet, etc.) such that rotation of the round plate structure 94 rotates the collar 108 and the head portion 90. Alternatively, the round plate structure 94 may be integrally formed with the collar 108 and not require the separate step of assembling the plate structure 94 to the collar 108.

The retention member (O-ring 98 or C-ring 100) may be inserted into the annular channel 96. The O-ring 98 can be slid over the nose portion 90A and cylindrical portion 90B of the head portion 90 and into the annular channel 96. The C-ring 100 may be inserted, e.g., axially inserted, into the annular channel 96 or may otherwise be elastically expanded (e.g., via a tool such as a snap ring pliers) and inserted, e.g., radially inserted, into the annular channel 96.

With the retention member 98, 100 in place, the central mounting aperture 120 of the seed meter disk 54 may be loaded onto or placed on the hub 66 over the nose portion 90A with the vacuum-side face 54C of the seed meter disk 54 facing the collar 108, the round plate structure 94, and the vacuum-side or rear-side portion 52B of the seed disk housing 52. The increasing diameter of the tapered nose portion 90A may aid in initial placement of the seed meter disk 54 onto the hub 66 and centering of the seed meter disk 54 relative to the hub 66. Once the central mounting aperture 120 of the seed meter disk 54 clears the tapered nose portion 90A, it may be guided along the cylindrical portion 90B of the head portion 90.

One or more alignment features may be implemented to interface the seed meter disk 54 with other portions of the system, e.g., one or more of the motor output gear 70, the hub 66, etc. For example, the teeth 54A of the seed meter disk 54 may be aligned with the drive teeth 70A of the motor output gear 70 (or an intermediate gear therebetween). Further, the apertures 112 in the seed meter disk 54 may be aligned with the prongs 110 on the plate structure 94 of the hub 66. Once these components are aligned, the seed meter disk 54 can be axially translated along the hub 66 and over the retention member 98, 100.

With reference to FIG. 6, translating the seed meter disk 54 over the retention member 98, 100 may include compressing the retention member 98, 100 a first amount to pass the narrowest point of the mounting aperture 120 over the retention member 98, 100. Once past the narrowest point, the retention member 98, 100 may be compressed a second amount, less than the first amount. Compression of the retention member 98, 100, may be great enough or sufficient to maintain contact between retention member 98, 100 in the annular channel 96 and the mounting aperture 120. With the retention member 98, 100 compressed the second amount, less than the first amount, removal of the seed meter disk 54 requires once again compressing the retention member 98, 100 the first amount, which can prevent accidental removal of the seed meter disk 54 from the hub 66, e.g., the seed meter disk 54 may snap in and out of place by passing over the retention member 98, 100.

When the retention member 98, 100 is compressed the second amount, the vacuum-side face 54C of the seed meter disk 54 abuts against or contacts the round plate structure 94, further limiting translation of the seed disk toward the vacuum-side or rear-side portion 52B of the seed disk housing 52. In some embodiments, the retention member 98, 100 and the round plate structure 94 may serve to limit or minimize axial translation of the seed meter disk 54 relative to the seed disk housing 52. In some embodiments, the retention member 98, 100 may serve to limit radial translation of the seed meter disk 54 relative to the seed disk housing 52. Due to the interface between the apertures 112 and the prongs 110, rotation of the seed meter disk 54 produces similar rotation of the hub 66, and vice versa. Likewise, the interface between the teeth 54A and the drive teeth 70A permits rotation of the seed meter disk 54 in response to actuation of the motor 72 and rotation of the motor output gear 70.

As an alternative to the retention member 98, 100 and the annular channel 96, the hub 66 may include an alternative retention member. For example, the retention member may be a detent feature or spring-biased member such as a ball or a plunger that is biased radially outward from the cylindrical portion 90B of the hub 66 (i.e., at a similar axial position to the annular channel 96), e.g., by a spring. The spring may bias the ball or plunger into engagement with the central mounting aperture 120 of the seed meter disk 54 similar to the retention member 98, 100, as discussed above. The hub 66, or other component such as the handle 104, may further comprise a button for retracting the spring to decrease or eliminate the force provided on the central mounting aperture 120 by the spring-biased member and spring.

As an alternative to the retention member 98, 100 and the annular channel 96, the hub 66 may include any one or more of a number of different alternative retention member(s). For example, particularly advantageous in connection with embodiments of the seed meter disk 54 not having a central mounting aperture 120, the prongs 110 may have positive engagement features that provide engagement with the mating apertures 112 of the seed meter disk 54.

FIGS. 7 and 8 illustrate an interior of the seed meter 44, as viewed from the seed-side face 54B of the seed meter disk 54, by way of the front-side or seed-side portion 52A of the seed disk housing 52 being removed. The singulator 56 and its biasing spring 202 are illustrated in an in-use position. However, it should be understood that the biasing spring 202 may be mounted, e.g., via one or more fasteners, to the front-side or seed-side portion 52A of the seed disk housing 52 that is removed in FIGS. 7 and 8. In some embodiments, the biasing spring 202 extends in at least two or at least three separate directions from the mounting point where the fastener is provided or located. The mounting point can be a central point of the biasing spring 202, with the biasing spring 202 having two, three, or more arms 202A, 202B, 202C that extend in a radially outward manner therefrom to individual distal ends.

Figure 9A:
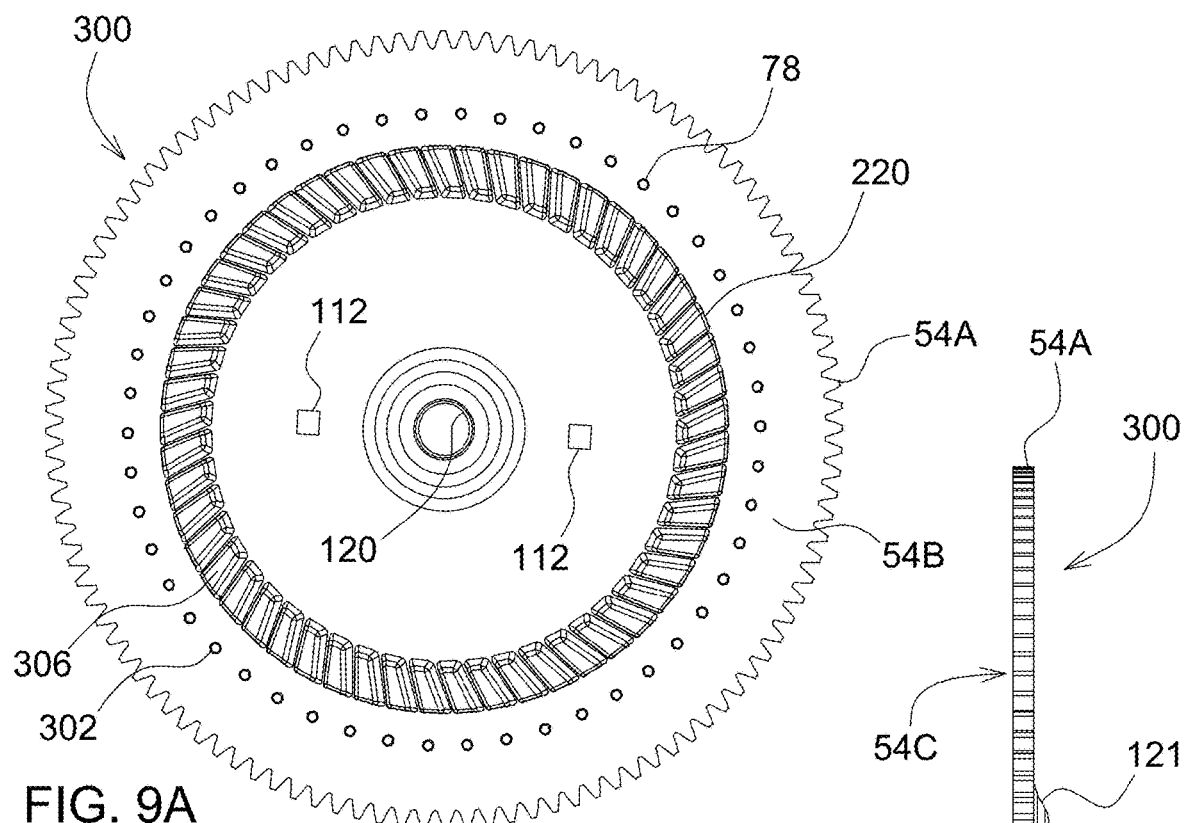
FIGS. 9A-9C show various views of a seed meter disk for metering sorghum.
Figure 9C:
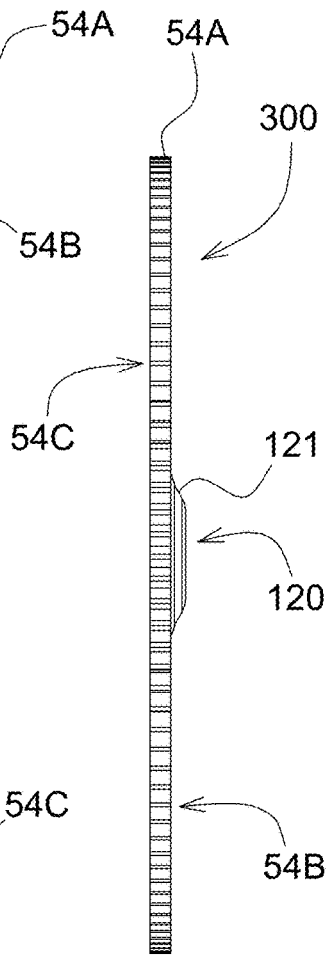
Figure 9B:
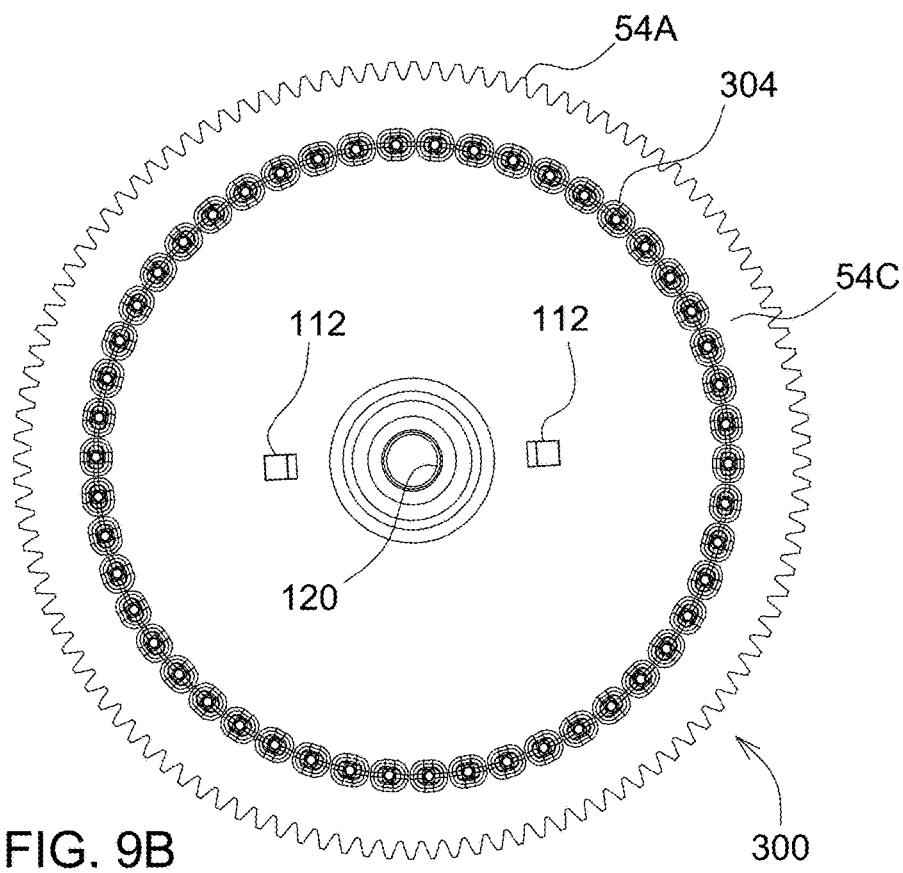
Figure 29A:
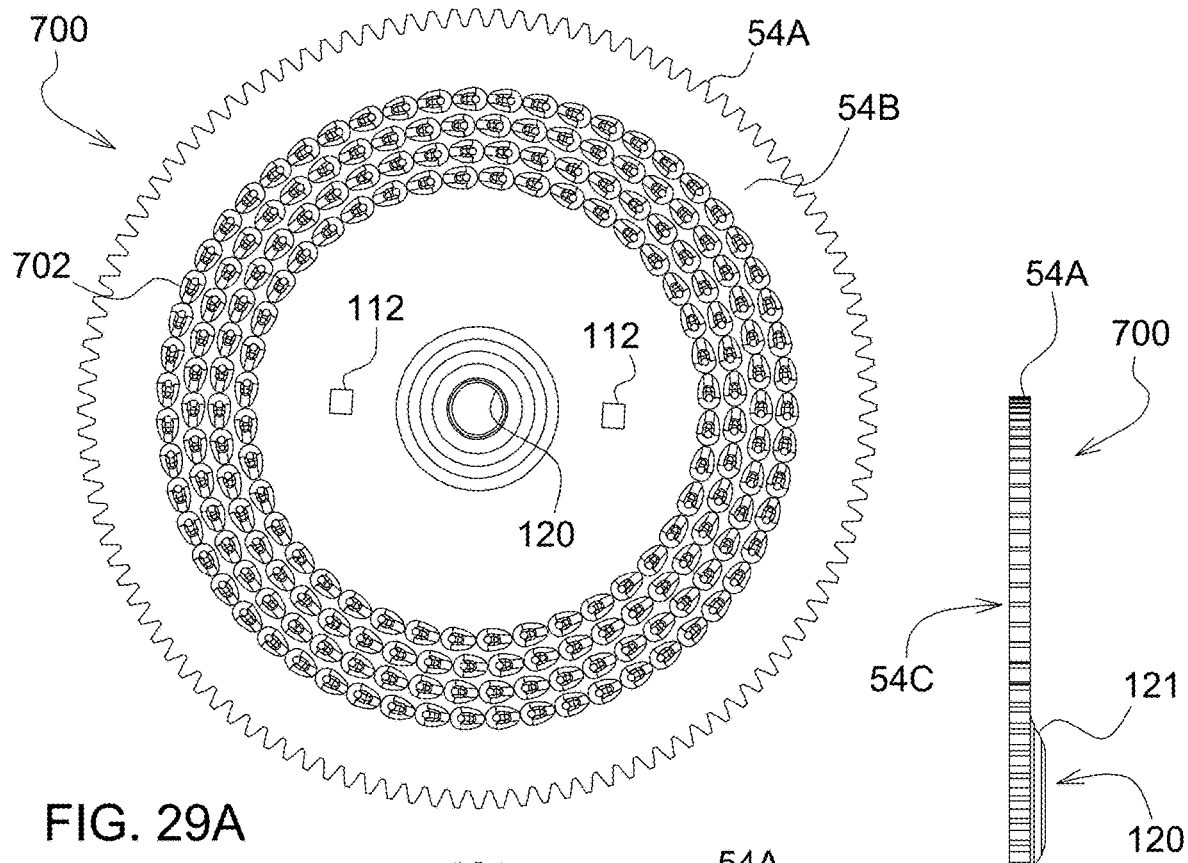
FIGS. 29A-29C show various views of a seed meter disk for metering wheat.
Figure 29B:
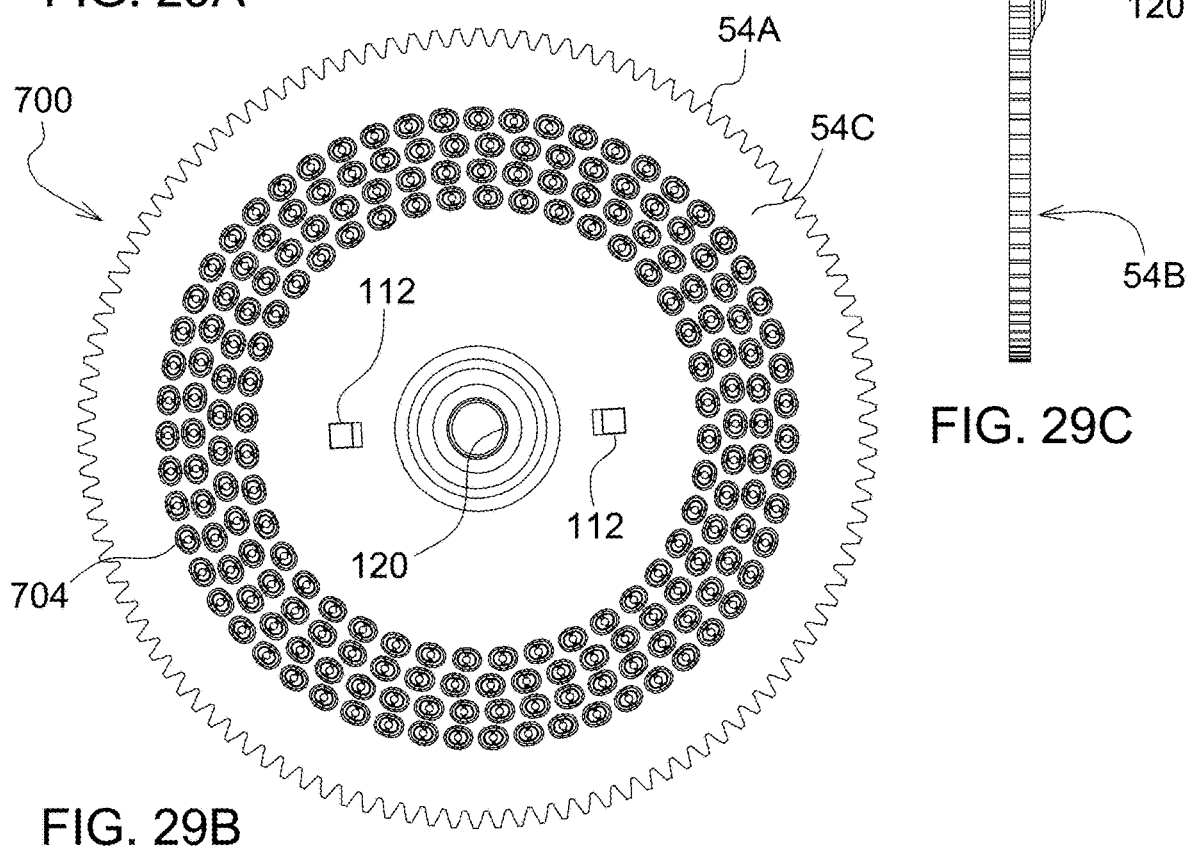
Figure 29C:
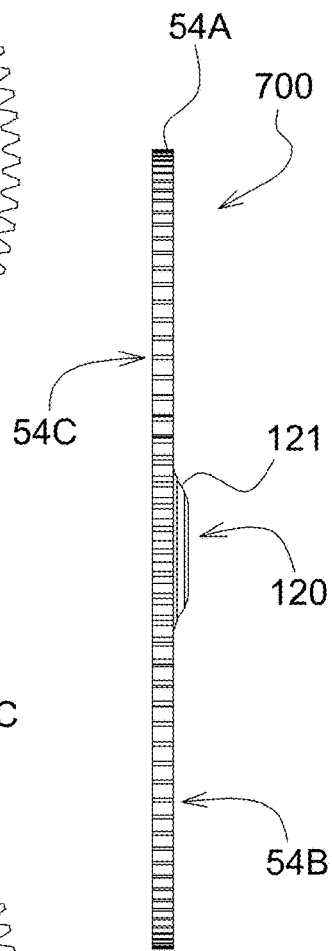

The seed meter disks 54 disclosed herein may advantageously fit or be held by the seed meter 44. The seed meter disks 54 disclosed herein may additionally or alternatively fit or be held by other seed meters. Additionally, the seed meter disks 54 disclosed herein may have one or more standardized or common dimensions so that different seed meter disks 54 may be used in the same seed meter 44. For example, a first seed meter disk 54 having a thickness, a diameter, and a central mounting aperture 120 (or, as disclosed herein, no central mounting aperture 120) may have seed openings 78 configured to meter wheat. A second seed meter disk 54 having the same thickness, the same diameter, and the same central mounting aperture 120, may have seed openings 78 configured to meter canola. In this way, a seed meter 44 may be used to place different commodity, whether it may be fertilizer or seed, merely by switching one seed meter disk 54 for another seed meter disk 54 with different features on one or more of its seed-side face 54B and vacuum-side face 54C. For example: FIGS. 9A-9C illustrate various views of a sorghum disk 300 configured to meter sorghum seeds; FIGS. 14A-14C illustrate various views of a rice disk 400 configured to meter rice seeds; FIGS. 19A-19C illustrate various views of a soybean disk 500 configured to meter soybeans; FIGS. 24A-24C illustrate various views of a canola disk 600 configured to meter canola; and FIGS. 29A-29C illustrate various views of a wheat disk 700 configured to meter wheat.

The various seed meter disks 54 disclosed herein, including the sorghum disk 300, rice disk 400, soybean disk 500, canola disk 600, and wheat disk 700, among others may have a disk thickness 55. In some embodiments, the disk thickness 55 is consistent across the disk(s), e.g., including or excluding any feature(s) of the central mounting aperture (such as a raised hub section 121). In some embodiments, the disk thickness 55 is not consistent, e.g., is not the same, across the disk(s), e.g., including or excluding any feature(s) of the central mounting aperture (such as a raised hub section 121). Variability in disk thickness 55 may be radial or polar. In some embodiments, the disk thickness 55 is between about 5-15 mm, between about 6-14 mm, between about 7-13 mm, between about 8-12 mm, or between about 9-11 mm. In some embodiments, the disk thickness 55 is about 8 mm, about 9 mm, about 10 mm, about 11 mm, or about 12 mm.

FIGS. 9A-9C illustrate a sorghum disk 300 configured to meter sorghum seeds. FIG. 9A shows the seed-side face 54B of the sorghum disk 300. At the center of the sorghum disk 300 is shown a central mounting aperture 120. However, as disclosed elsewhere herein, in some embodiments, the seed meter disks 54 have a central mounting aperture 120. In some embodiments, the seed meter disks 54 do not have a central mounting aperture 120, but rely on one or more other features to hold the seed meter disk 54 within the seed meter 44. In some embodiments, the seed meter disks 54 rely on both a central mounting aperture 120 and one or more other features to hold the seed meter disk 54 within the seed meter 44. Spaced radially outward from the central mounting aperture 120 are one or more mating apertures, e.g., two mating apertures 112, that are configured to accept the prongs 110 of the plate structure 94 shown in FIGS. 5A-6. The sorghum disk 300 includes a single circumferential array of sorghum disk agitator pockets 306. Next to the single circumferential array of sorghum disk agitator pockets 306 is a single circumferential array of sorghum disk seed openings 302.

FIG. 9A illustrates a single circumferential array of sorghum disk agitator pockets 306. However, in some embodiments, the sorghum disk 300 includes 2 circumferential arrays of sorghum disk agitator pockets 306 or 3 circumferential arrays of sorghum disk agitator pockets 306. When 2 or more circumferential arrays of sorghum disk agitator pockets 306 are included, the arrays may be circumferentially distinct or partially circumferentially overlapping. The sorghum disk agitator pockets 306 extend into the seed-side face 54B of the sorghum disk 300 and toward the vacuum-side face 54C of the sorghum disk 300. But, the sorghum disk agitator pockets 306 do not extend all the way to the vacuum-side face 54C, e.g., the sorghum disk agitator pockets 306 do not penetrate the entire disk thickness 55 of the sorghum disk 300. The sorghum disk agitator pockets 306 are generally canted, tilted, or slanted, in a generally counterclockwise manner (when viewed from the seed-side face 54B of the disk). In some embodiments, agitator pockets may be generally canted in the same direction as the seed meter disk 54 rotates during metering of seeds. In some embodiments, agitator pockets may be generally canted in a direction opposite the rotation of the seed meter disk 54 during metering of seeds. In embodiments having two or more circumferential arrays of agitator pockets, one or more circumferential arrays may be generally canted in the same direction as the seed meter disk 54 rotates during metering of seeds and one or more circumferential arrays of agitators pockets may be generally canted in a direction opposite the rotation of the seed meter disk 54 during metering of seeds. In some embodiments having two or more circumferential arrays of agitator pockets, all circumferential arrays may be canted in the same direction, e.g., in the same direction as the seed meter disk 54 rotates during metering of seeds or in a direction opposite the rotation of the seed meter disk during metering of seeds. Canting may advantageously facilitate agitation of the seeds, e.g., sorghum seeds, contained within a seed pool held by the seed meter 44. The sorghum disk 300 shown in FIG. 9A illustrates 53 sorghum disk agitator pockets 306 in a single circumferential array. In some embodiments, each circumferential array of sorghum disk agitator pockets 306 has a number of cells that is less than about 70, less than about 68, less than about 66, less than about 64, less than about 62, less than about 60, less than about 58, less than about 56, less than about 54, less than about 52, less than about 50, less than about 48, less than about 46, less than about 44, less than about 42, less than about 40, or any other number of cells that facilitates advantageous agitation of the sorghum seeds contained within the seed meter 44.

FIG. 9A illustrates a single circumferential array of sorghum disk seed openings 302 placed radially past the circumferential array of sorghum disk agitator pockets 306. However, in some embodiments, the sorghum disk 300 includes 2 circumferential arrays of sorghum disk seed openings 302 or 3 circumferential arrays of sorghum disk seed openings 302. The number of arrays of sorghum disk seed openings 302 is proportional to the desired number of seeds to be metered per revolution of the seed meter disk 54: two arrays will approximately double the rate of metering of one array at the same speed of rotation, three arrays will approximately triple the rate of metering of one array at the same speed of rotation. Rates of metering can be increased by increasing the speed of rotation of the disk: a seed meter disk 54 having one array of seed openings (having Z openings) and rotating at 2X revolutions per minute can meter approximately the same number of seeds as a seed meter disk 54 having two arrays of seed openings (each having Z openings) and rotating at X revolutions per minute. The sorghum disk seed openings 302 extend into the seed-side face 54B of the sorghum disk 300 and toward and to the vacuum-side face 54C of the sorghum disk 300. In this way, the sorghum disk seed openings 302 fully penetrate the face and disk thickness 55 of the sorghum disk 300 so that a pressure differential placed across the sorghum disk 300 when in use facilitates adhesion or adherence of the sorghum seeds to the sorghum disk seed openings 302 of the sorghum disk 300. As shown in FIG. 9A, at the seed-side face 54B of the sorghum disk 300, the sorghum disk seed openings 302 are each circular, e.g., generally or substantially circular. The sorghum disk 300 shown in FIG. 9A includes 50 sorghum disk seed openings 302. In some embodiments each circumferential array of sorghum disk seed openings 302 has a number of openings that is less than about 70, less than about 68, less than about 66, less than about 64, less than about 62, less than about 60, less than about 58, less than about 56, less than about 54, less than about 52, less than about 50, less than about 48, less than about 46, less than about 44, less than about 42, less than about 40, or any other number of openings that meters the desired number of seeds in a given rotation of the seed meter disk 54.

Additional circumferential arrays of seed openings 78 may be included on any seed meter disk 54 disclosed herein. There is a relationship between rate of rotation of the seed meter disk 54, number of seed openings 78, and number of seeds metered by the seed meter 44. For example, if a sorghum disk 300 has 50 sorghum disk seed openings 302 (as shown in FIG. 9A) and rotates at one revolution per second, the sorghum disk 300 will meter 3000 sorghum seeds per minute. Increasing the number of sorghum disk seed openings 302 (such as by adding another circumferential array of sorghum disk seed openings 302) by 50, but maintaining a rate of at one revolution per second doubles the rate of metering to 6000 sorghum seeds per minute.

At its outermost, or circumferential, edge, the sorghum disk 300 has teeth 54A. As discussed elsewhere herein, the teeth 54A may be used to drive the sorghum disk 300. However, the teeth 54A may not be used to drive the sorghum disk 300. For example, in a seed meter 44 in which the axle or hub 66 is powered, e.g., attached to a motor, the sorghum disk 300 may be driven by its engagement with one or more components of the axle 66. In such cases, the teeth 54A need not be used and may not be included, e.g., the outermost or circumferential, edge of the seed meter disk 54 may be circular or flat or rounded. The sorghum disk 300 shown in FIG. 9A illustrates 112 teeth 54A, though more of fewer teeth 54A may be used.

FIG. 9B illustrates the sorghum disk 300 of FIG. 9A, except from the vacuum-side face 54C. The central mounting aperture 120 and mating apertures 112 discussed above can be seen. Spaced radially outward from the mating apertures 112, or radially inward from the outermost edge of the seed meter disk 54 or the teeth 54A, is a single circumferential array of sorghum disk kick-out pockets 304. A single sorghum disk kick-out pocket 304 is provided on the vacuum-side face 54C for each sorghum disk seed openings 302 on the seed-side face 54B, and generally axially opposite thereto. Therefore, the radial distance from the center of the sorghum disk 300 may be approximately the same for the sorghum disk seed openings 302 and the sorghum disk kick-out pockets 304. As discussed herein, the sorghum disk kick-out pockets 304 may be configured to accept the projections of a kick-out wheel, including a shoulder portion, a transition section portion, and an extension portion. As can be seen from FIG. 9B and FIG. 11A (an enlargement of FIG. 9B), each sorghum disk kick-out pocket 304 has an elongate shape in which its minor axis dimension (the dimension through the pocket in the radial direction) is smaller than its major axis dimension (the dimension through the pocket in the tangential direction (direction perpendicular to a radius of the sorghum disk 3000)). The sorghum disk kick-out pockets 304 have a generally rounded-rectangular, e.g., rounded 4-sided, shape, at the surface of the seed disk (and, in some embodiments, in one or more planes intersecting the kick-out pockets parallel to the surface(s) of the disk).

FIG. 9C illustrates a side view of the sorghum disk 300. As shown in connection with FIG. 6, the seed meter disks 54 disclosed herein, including the sorghum disk 300, may include a raised hub section 121 at the center of the seed meter disk 54 through which the central mounting aperture 120 passes. FIG. 9C also shows the teeth 54A on the circumferential edge of the sorghum disk 300.

Figure 10A:
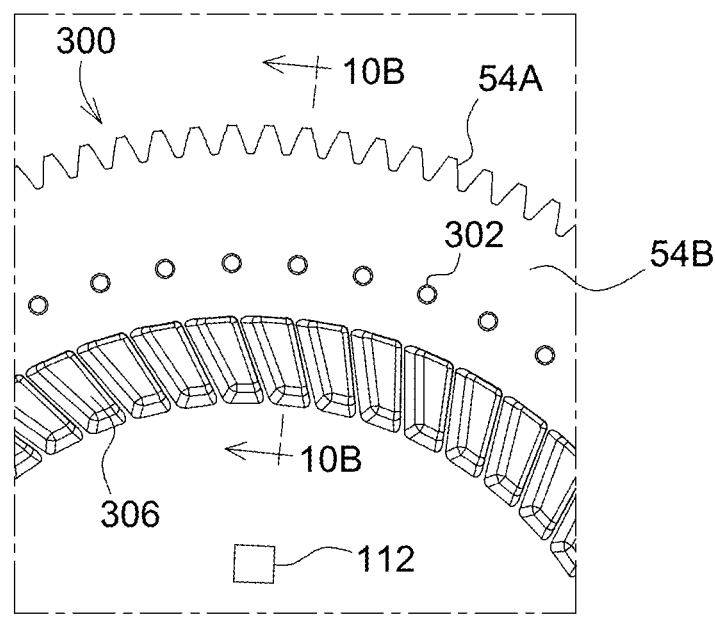
FIGS. 10A-10C show various enlarged and cross-sectional views of the sorghum seed meter disk of FIGS. 9A-9C.
Figure 10B:
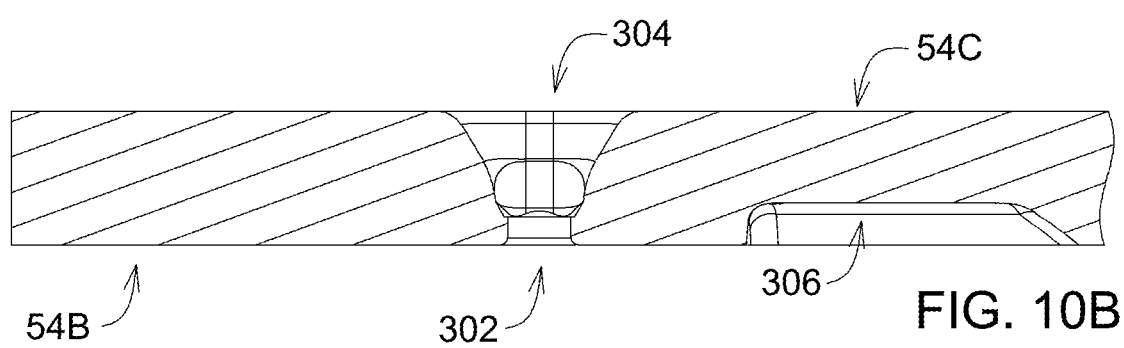
Figure 10C:
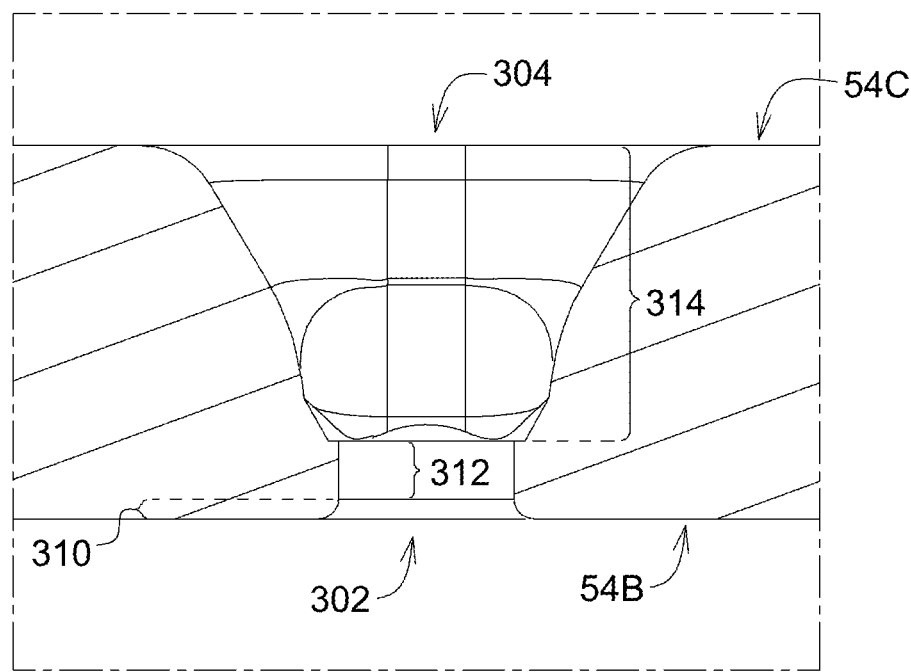

FIG. 10A shows an enlarged view of a portion of FIG. 9A, including at least a portion of the circumferential array of sorghum disk seed openings 302. FIG. 10B shows a cross-sectional view of the sorghum disk seed openings 302 of FIG. 10A taken along line 10B 110B. Also in FIG. 10B, a single sorghum disk agitator pocket 306 extending into the seed-side face 54B of the sorghum disk 300 can be seen. FIG. 10C illustrates an enlarged view of the sorghum disk seed opening 302 and sorghum disk kick-out pocket 304 of FIG. 10B. Line 10B 10B passes radially from the center of the sorghum disk 300 through the center of the sorghum disk seed opening 302 shown in FIGS. 10B and 10C. Therefore, the cross-section of FIG. 10C shows the minor axis cross-section of the sorghum disk kick-out pockets 304 on the vacuum-side face 54C of the seed meter disk 54, e.g., as shown in FIG. 9B.

Turning to FIG. 10C, the sorghum disk seed opening 302 and sorghum disk kick-out pocket 304 extending through the disk include a plurality of sections, including a sorghum disk seed opening section 310, a sorghum disk transition section 312, and a sorghum disk kick-out section 314. The sorghum disk seed opening section 310 (with reference to FIG. 10A) is circular (e.g., has a circular cross-section), e.g., generally circular, and extends into the face of the disk only a distance, e.g., a short distance. In some embodiments, the sorghum disk seed opening section 310 extends into the face of the disk by less than 10% of the thickness of the disk. In some embodiments, the sorghum disk seed opening section 310 extends into the face of the disk by less than about 9%, less than about 8%, less than about 7%, less than about 6%, less than about 5%, less than about 4%, or less than about 3% of the thickness of the disk. The outer circumferential edge of the sorghum disk seed opening section 310 (the transitional edge between the face of the seed-side face 54B and the sorghum disk seed opening section 310) may have a rounded aspect. The sorghum disk seed opening section 310 may have a smallest cross-sectional dimension, e.g., cross-sectional diameter, that is smaller, e.g., just smaller, than the diameter of a sorghum seed. In some embodiments, the sorghum disk seed opening section 310 has a smallest cross-sectional dimension to sorghum seed diameter relationship of less than about 98%, less than about 96%, less than about 94%, less than about 92%, less than about 90%, less than about 88%, less than about 86%, less than about 84%, less than about 82%, or less than about 80% (in these embodiments, the smallest cross-sectional dimension to sorghum seed diameter relationship will generally be larger than 60%).

The sorghum disk transition section 312 may have a circular cross-section, e.g., a generally circular cross-section, and extends between the sorghum disk seed opening section 310 and the sorghum disk kick-out section 314, placing the two in fluid communication, so that a pressure differential, e.g., a vacuum, may be applied across the disk. Alternatively stated, the sorghum disk transition section 312 may comprise an aperture, e.g., a cylindrical aperture, connecting the seed-side face 54B to the vacuum-side face 54C, e.g., connecting the sorghum disk seed opening section 310 to the sorghum disk kick-out section 314. The sorghum disk transition section 312 has a smallest cross-sectional dimension, e.g., diameter, that is approximately equal to the smallest cross-sectional dimension, e.g., diameter, of the sorghum disk seed opening section 310. The sorghum disk transition section 312 extends, e.g., extends axially, through the thickness of the disk by less than about 12%, less than about 11%, less than about 10%, less than about 9%, less than about 8%, less than about 7%, less than about 6%, less than about 5%, less than about 4%, or less than about 3%. In its minor axis (e.g., in a plane intersecting in its minor axis), the sorghum disk kick-out section 314 has a generally inverse bell shape, with the top of the bell connecting to the sorghum disk transition section 312, the walls of the bell extending toward the vacuum-side face 54C of the seed meter disk 54 at a steep angle, and the mouth of the bell connecting to or opening at the vacuum-side face 54C of the seed meter disk 54.

Figure 11A:
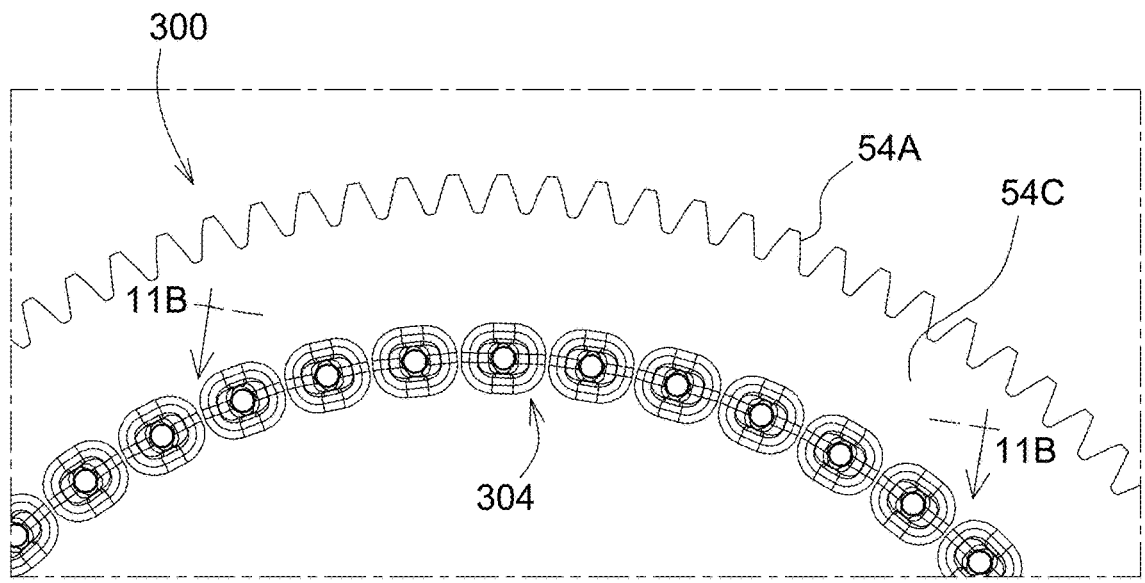
FIGS. 11A-11C show various enlarged and cross-sectional views of the sorghum seed meter disk of FIGS. 9A-9C.
Figure 11B:
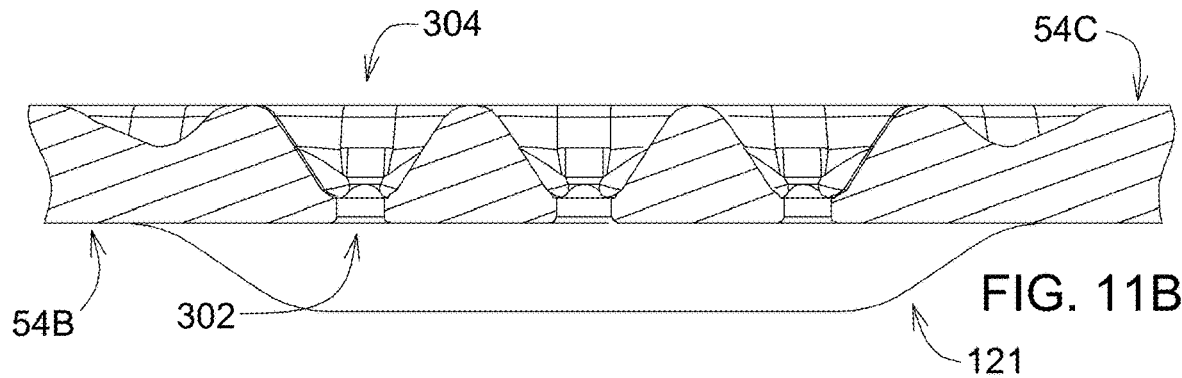
Figure 11C:
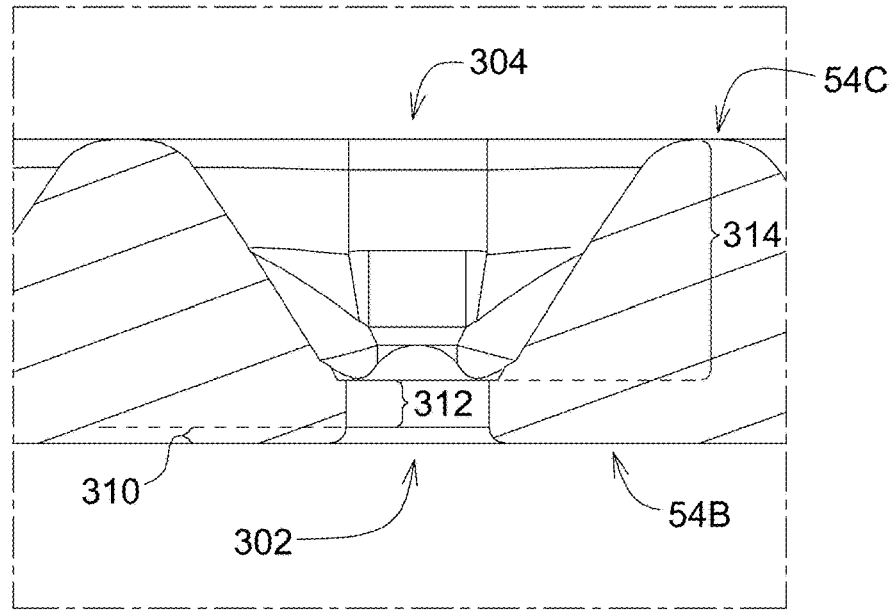

FIG. 11A shows an enlarged view of a portion of FIG. 9B, including at least a portion of the circumferential array of sorghum disk kick-out pockets 304. FIG. 11B shows a cross-sectional view of the sorghum disk kick-out pockets 304 of FIG. 11A taken along line 11B 111B. FIG. 11C illustrates an enlarged view of the sorghum disk kick-out pocket 304 and associated sorghum disk seed openings 302 of FIG. 11B. Line 11B 111B passes through the center of the sorghum disk kick-out pocket 304 shown in FIGS. 11B and 11C perpendicular to a line extending radially, from the center of the sorghum disk 300 through the center of the sorghum disk kick-out pocket 304 shown in FIGS. 11B and 11C (i.e., it passes through the major axis of the sorghum disk kick-out pocket 304 shown in FIGS. 11B and 11C or tangentially through the center of the sorghum disk kick-out pocket 304).

Turning to FIG. 11C, the sorghum disk seed opening 302 and sorghum disk kick-out pocket 304 extending through the disk include a plurality of sections, including a sorghum disk seed opening section 310, a sorghum disk transition section 312, and a sorghum disk kick-out section 314. The sorghum disk seed opening section 310 (with reference to FIG. 10A) is circular, e.g., generally circular, and extends into the face of the disk only a short distance. Therefore, the sorghum disk seed opening section 310 cross-section is substantially the same regardless of orientation of the cross-section. The sorghum disk transition section, too, 312 may be circular, e.g., generally circular, and extends between the sorghum disk seed opening section 310 and the sorghum disk kick-out section 314. Therefore, the sorghum disk transition section 312 cross-section may be substantially the same regardless of orientation of the cross-section. In its major axis, the sorghum disk kick-out section 314 has a generally inverse bell shape, with the top of the bell connecting to the sorghum disk transition section 312, the walls of the bell extending toward the vacuum-side face 54C at a steep angle, and the mouth of the bell connecting to or opening at the vacuum-side face 54C of the disk. The angle of the walls of the sorghum disk kick-out section 314 along its major axis extend outward, toward the 54C at an angle that is less steep than the angle of the walls of the sorghum disk kick-out section 314 along its minor axis (compare the slope of the walls of the sorghum disk kick-out section 314 in FIG. 11C to the slope of the walls of the sorghum disk kick-out section 314 in FIG. 10C). The diminished angle of the walls of the sorghum disk kick-out section 314 along the major axis of the sorghum disk kick-out pocket 304 by comparison to a larger or greater or steeper angle of the walls of the sorghum disk kick-out section 314 along the minor axis of the sorghum disk kick-out pocket 304 creates a generally oblong cavity with a larger dimension along the major axis than along the minor axis. As can be seen in FIG. 11A, the corners of each sorghum disk kick-out pocket 304, e.g., where the walls of the sorghum disk kick-out pocket 304 along the major axis and minor axis join, are generally rounded to create an outer opening and one or more cross-sections (e.g., parallel to the face(s) of the seed meter disk) of the sorghum disk kick-out section 314 that are generally rectangular with rounded or curved or radiused corners. Thus, the sorghum disk kick-out section 314 is generally frustopyramidal with rounded or radiused corners.

Figure 12A:
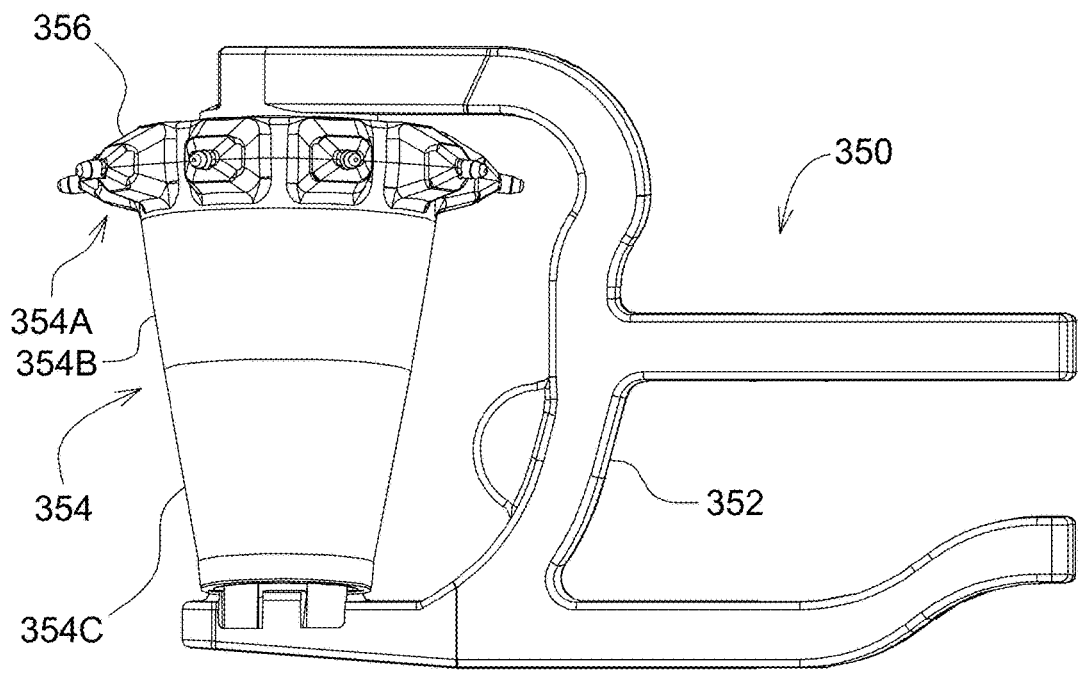
Figure 12B:
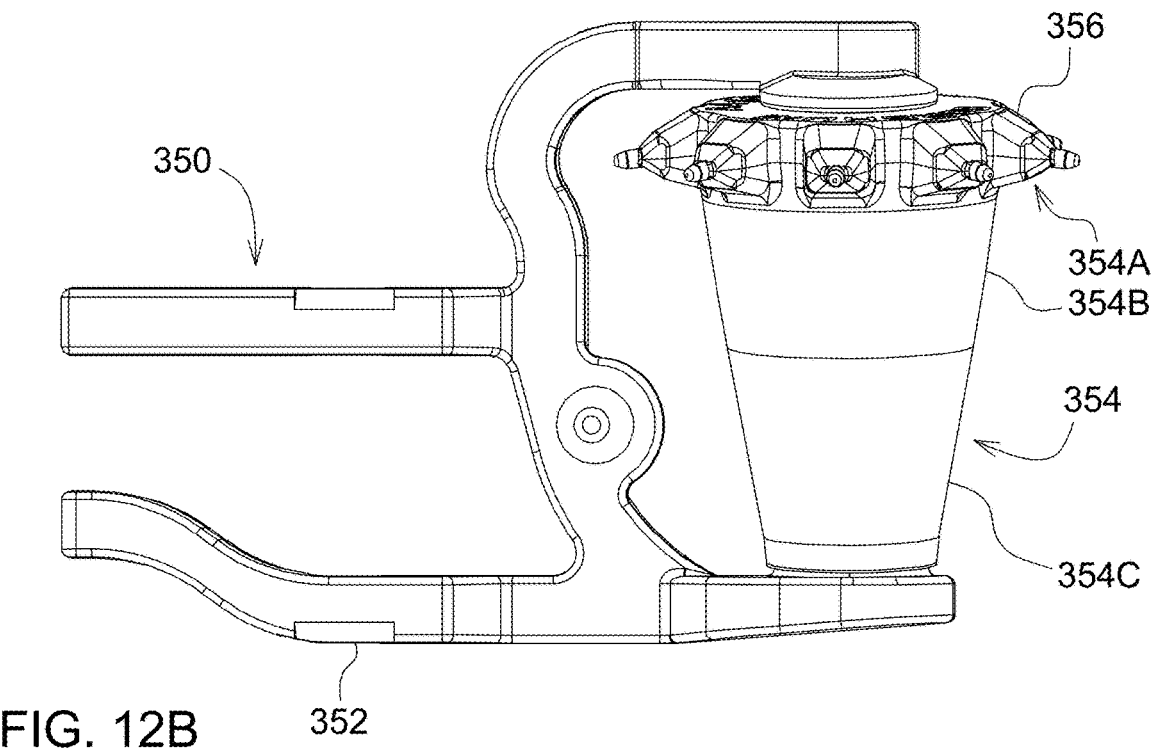

FIGS. 12A-12F show various views of a sorghum disk kick-out wheel assembly 350. The sorghum disk kick-out wheel assembly 350 may be configured to work with the sorghum disk 300 to advantageously improve performance, e.g., singulation performance, of a seed meter 44 metering sorghum. As shown in FIGS. 12A-12B, the sorghum disk kick-out wheel assembly 350 may include a sorghum disk kick-out wheel 354 having a plurality of sorghum disk kick-out protrusions 356 and held, e.g., rotatably held, by a sorghum disk kick-out wheel arm 352.

The sorghum disk kick-out wheel 354 includes a protrusion portion 354A having a plurality of sorghum disk kick-out protrusions 356 and at least one body portion, e.g., first body portion 354B and second body portion 354C. The sorghum disk kick-out protrusions 356 may be arranged in a ring on the protrusion portion 354A. In some embodiments, the sorghum disk kick-out wheel 354 includes a protrusion portion 354A having a single ring of sorghum disk kick-out protrusions 356. In some embodiments, the sorghum disk kick-out wheel 354 includes a protrusion portion 354A having two or more, e.g., 3, 4, 5, or 6, rings of sorghum disk kick-out protrusions 356. As can be appreciated from FIG. 13, the number of rings of sorghum disk kick-out protrusions 356 included in the protrusion portion 354A (and/or the number of protrusion portions included in the kick-out wheel) may correspond to the number of circumferential arrays of sorghum disk kick-out pockets 304 (and, thus, also the number of circumferential arrays of sorghum disk seed openings 302) that are included on the sorghum disk 300. With reference to FIGS. 12E-12F, the protrusion portion 354A of the sorghum disk kick-out wheel 354 may include 9 sorghum disk kick-out protrusions 356, which may be arranged in a ring. In some embodiments, the protrusion portion 354A of the sorghum disk kick-out wheel 354 may include more or fewer sorghum disk kick-out protrusions 356. For example, each ring sorghum disk kick-out protrusions 356 included in the protrusion portion 354A may include a number of protrusions that is less than about 20, less than about 18, less than about 16, less than about 14, less than about 12, less than about 10, less than about 8, less than about 6, less than about 4, or any other number of protrusions that advantageously improve performance of the sorghum disk kick-out wheel assembly 350 within a seed meter.

Turning again to FIGS. 12A-12B, the sorghum disk kick-out wheel 354 may include a body portion adjacent the protrusion portion 354A. The body portion may be generally conical or frustoconical. In some embodiments, the sorghum disk kick-out wheel 354 comprises a single body portion. In some embodiments, the sorghum disk kick-out wheel 354 has two body portions, e.g., as shown in FIGS. 12A and 12B. In yet other embodiments, the sorghum disk kick-out wheel 354 has three or more body portions, e.g., four, five, six, or seven body portions, or any other number of body portions that advantageously improve performance of the sorghum disk kick-out wheel assembly 350 within a seed meter. The sorghum disk kick-out wheel 354 may be formed as a single, unitary component, such as by injection molding, and out of a wear resistant material, e.g., a wear resistant plastic or polymer. In such embodiments, the protrusion portion 354A may be fused, continuous, or monolithic with the body portion, e.g., first body portion 354B (and where more than one body portion is included, such more than one body portions may be fused, continuous, or monolithic with each other). The sorghum disk kick-out wheel 354 may include several distinct components. For example, the protrusion portion 354A may be distinct and separate from any body portions, e.g., first body portion 354B and second body portion 354C. In the same way, any included body portions, e.g., the first body portion 354B and second body portion 354C, may be separate and distinct from each other (though they may be fused or unitary with each other, but separate and distinct from the protrusion portion 354A). In the same way, any separate rings of sorghum disk kick-out protrusions 356 of the protrusion portion 354A may be distinct and separate from each other: separate and distinct rings of sorghum disk kick-out protrusions 356 that are able to rotate at different rates may advantageously allow for successive circumferential arrays of sorghum disk kick-out pockets 304 that include varying numbers of pockets.

Figure 13:
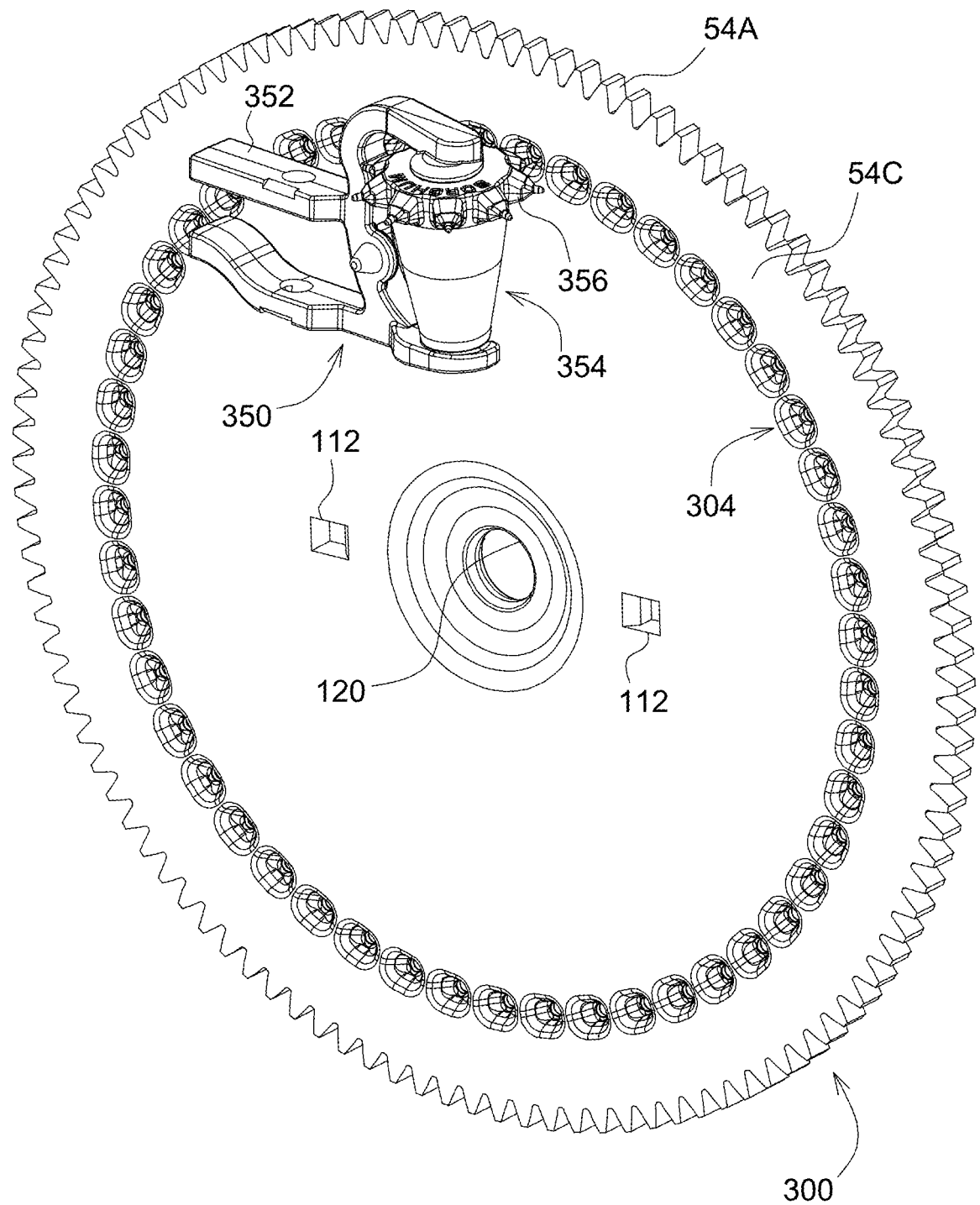
FIG. 13 shows the sorghum kick-out wheel assembly of FIGS. 12A-12F in mating engagement with the sorghum seed meter disk of FIGS. 9A-9C.

The various portions of the sorghum disk kick-out wheel 354, e.g., the protrusion portion 354A, first body portion 354B, and second body portion 354C, may be rotatably held by the sorghum disk kick-out wheel arm 352. The sorghum disk kick-out wheel arm 352 may be attached to or held by an inner surface or portion of the seed disk housing 52 on the vacuum-side face 54C of the seed meter disk 54. For example, the sorghum disk kick-out wheel arm 352 may be attached to or held by an inner surface or portion of the rear-side portion 52B of the seed disk housing 52 so that the protrusion portion 354A of the sorghum disk kick-out wheel 354 is held adjacent the release position of the seed meter 44, e.g., where seeds are intended to be removed from or disengage from the seed meter disk 54. FIG. 13 illustrates the sorghum disk kick-out wheel assembly 350 engaged with a sorghum disk 300, with all other components of the system removed, for clarity's sake. The sorghum disk kick-out wheel arm 352, and thus the rest of the sorghum disk kick-out wheel assembly 350 may be biased by a spring or other biasing member away from the rear-side portion 52B of the seed disk housing 52, such that the sorghum disk kick-out wheel 354 is held in close contact or biased engagement with the vacuum-side face 54C of the sorghum disk 300.

Turning to FIG. 12F, each sorghum disk kick-out protrusion 356 of the sorghum disk kick-out wheel 354 includes a plurality of sections, arranged in radial sequence. In some embodiments, the sorghum disk kick-out protrusion 356 includes a sorghum protrusion shoulder section 370 (a first section), a sorghum protrusion transition section 372 (a second section), and a sorghum protrusion extension 374 (a third section). Each section of the sorghum disk kick-out protrusion 356 has a shape, profile, and/or dimension along a minor axis (i.e., in or along a plane parallel to a line or plane that is perpendicular to the ring containing the plurality of sorghum disk kick-out protrusions 356). Additionally, each section of the sorghum disk kick-out protrusion 356 has a shape, profile, and/or dimension along a major axis (i.e., in or along a plane parallel to a line or plane that is tangential to the ring containing the plurality of sorghum disk kick-out protrusions 356). Considering FIG. 12F alongside FIGS. 10C and 11C, it may be seen that the shape and or profile of the sorghum disk kick-out protrusions 356 generally mate with, e.g., mirror, the sorghum disk kick-out pockets 304. For example, the shape or profile of the sorghum protrusion shoulder section 370 of the sorghum disk kick-out protrusion 356 along the major axis mates with (e.g., is configured to mate with), e.g., is a mirror image to, or is an inverse to, or is an approximate opposite to, the shape or profile of the sorghum disk kick-out section 314 of the sorghum disk kick-out pockets 304 along the major axis. In much the same way, the shape or profile of the sorghum protrusion shoulder section 370 of the sorghum disk kick-out protrusion 356 along the minor axis mates with (e.g., is configured to mate with), e.g., is a mirror image to, or is an inverse to, or is an approximate opposite to, the shape or profile of the sorghum disk kick-out section 314 of the sorghum disk kick-out pockets 304 along the minor axis. The sorghum protrusion shoulder section 370 is generally bell shaped (along both the minor and major axes) and configured to mate with the bell shape of the sorghum disk kick-out section 314: the sorghum protrusion shoulder section 370 is generally frustopyramidal with a generally rectangular base. As with the sorghum disk kick-out section 314, the sorghum protrusion shoulder section 370 may have rounded or radiused corners. The frustopyramidal shape of the sorghum protrusion shoulder section 370 and the mating shape of the sorghum disk kick-out section 314 of the sorghum disk kick-out pockets 304 may advantageously improve connection or contact between the sorghum disk kick-out protrusion 356 of the sorghum disk kick-out wheel 354 and the sorghum disk kick-out pockets 304 of the sorghum disk 300. Evenness of contact may advantageously distribute forces across the contact surfaces, e.g., across a larger contact surface that may be provided by a frustoconical protrusion or a cylindrical protrusion, thereby potentially advantageously improving fit, function, performance, and wear of the components.

The shape or profile of the sorghum protrusion transition section 372 of the sorghum disk kick-out protrusion 356 along the major axis mates with (e.g., is configured to mate with), e.g., is a mirror image to, or is an inverse to, or is an approximate opposite to, the shape or profile of the sorghum disk transition section 312 along the major axis. In much the same way, the shape or profile of the sorghum protrusion transition section 372 of the sorghum disk kick-out protrusion 356 along the minor axis mates with (e.g., is configured to mate with), e.g., is a mirror image to, or is an inverse to, or is an approximate opposite to, the shape or profile of the sorghum disk transition section 31 along the minor axis. As the sorghum disk transition section 312 is a generally cylindrical opening (e.g., having a generally circular cross-section), the sorghum protrusion transition section 372 may be a generally cylindrical solid (but at least has a largest cross-sectional dimension that is smaller than the smallest cross-sectional dimension of the sorghum disk transition section 312). In much the same way, the sorghum protrusion transition section 372 may have a length dimension that is approximately equal to a depth dimension of the sorghum disk transition section 312. In some embodiments, the length dimension of the sorghum protrusion transition section 372 is between about 80-120% of the depth dimension of the sorghum disk transition section 312. In some embodiments, the relationship between those two dimensions is between about 82-118%, between about 84-116%, between about 86-114%, between about 88-112%, between about 90-110%, between about 92-108%, between about 94-106%, between about 96-104%, or between about 98-102%.

The sorghum protrusion extension 374 of the sorghum disk kick-out protrusion 356 is generally frustoconical, cylindrical, hemispherical, or otherwise rounded and extends radially out from the sorghum protrusion transition section 372. The base of the sorghum protrusion extension 374 may have a cross-sectional dimension that is approximately the same as the cross-sectional dimension of the outermost surface or portion of the sorghum protrusion transition section 372, e.g., the sorghum protrusion extension 374 may extend, e.g., extend substantially continuously from, the sorghum protrusion transition section 372. The sorghum protrusion extension 374 has a length that allows the sorghum protrusion extension 374 to extend into, through, or past the sorghum disk seed opening section 310. In some embodiments, the sorghum protrusion extension 374 has a length such it just enters, e.g., is configured to enter, the sorghum disk seed opening section 310. For example, the sorghum protrusion extension 374 may extend into the sorghum disk seed opening section 310 by less than about 10%, less than about 9%, less than about 8%, less than about 7%, less than about 6%, less than about 5%, less than about 4%, less than about 3%, or less than about 2% of the depth of the sorghum disk seed opening section 310. In some embodiments, the sorghum protrusion extension 374 has a length such that it enters, e.g., is configured to enter, but does not extend out of the sorghum disk seed opening section 310. For example, the sorghum protrusion extension 374 may extend into the sorghum disk seed opening section 310 by less than about 100%, less than about 90%, less than about 80%, less than about 70%, less than about 60%, less than about 50%, less than about 40%, less than about 30%, or less than about 20% of the depth of the sorghum disk seed opening section 310. In some embodiments, the sorghum protrusion extension 374 both enters, e.g., is configured to enter, and extends out of the sorghum disk seed opening section 310, e.g., the sorghum protrusion extension 374 extends, e.g., is configured to extend, past the seed-side face 54B of the seed meter disk 54. For example, the sorghum protrusion extension 374 may extend out of the sorghum disk seed opening section 310 and past the seed-side face 54B of the seed meter disk 54 by less than about 16%, less than about 14%, less than about 12%, less than about 10%, less than about 8%, less than about 6%, less than about 4%, or less than about 2% of the disk thickness 55 of the seed meter disk 54.

In operation, as the seed meter disk 54 rotates through a seed pool, the pressure differential applied across the seed openings, e.g., the sorghum disk seed openings 302, causes seeds to adhere to the seed openings passing through the seed pool. Seeds are carried by the seed openings, retained by the pressure differential, to a release or removal location. The kick-out wheel assembly, e.g., the sorghum disk kick-out wheel assembly 350, is held, e.g., by the rear-side portion 52B of the seed disk housing 52, in biased engagement with the vacuum-side face 54C of the seed meter disk 54 generally opposite the release or removal location. As a sorghum disk seed opening 302 carrying a seed approaches the release or removal location, a sorghum disk kick-out protrusion 356 begins to rotate into the sorghum disk kick-out pocket 304 corresponding to the sorghum disk seed opening 302 carrying the seed. The leading edges of the sorghum disk kick-out pocket 304 and the sorghum disk kick-out protrusion 356, e.g., the leading flat surfaces of the frustopyramidal sorghum disk kick-out protrusion 356 and mating sorghum disk kick-out pocket 304, mate and cause the sorghum protrusion extension 374 to rotate toward the sorghum disk seed opening section 310 where the seed is held. When the sorghum disk kick-out protrusion 356 and the sorghum disk kick-out pocket 304 are fully aligned and engaged, the sorghum protrusion shoulder section 370 is generally mated with the sorghum disk kick-out section 314, the sorghum protrusion transition section 372 is generally mated with the sorghum disk transition section 312, and the sorghum protrusion extension 374 extends at least partially into the sorghum disk seed opening section 310. The sorghum protrusion extension 374 extending into or past the sorghum disk seed opening section 310 of the seed meter disk 54 facilitates removal of the seed from the sorghum disk seed opening section 310, regardless of whether the pressure differential remains across the seed meter disk 54 at that location or at that time.

In some embodiments, the pressure differential is cut off prior to the sorghum disk seed openings 302 (and any associated, carried or adhered seed) reaching the removal or release position. This may be done in any of a number of ways, for example using a shaped vacuum seal. In some embodiments, the pressure differential is not cut off prior to the sorghum disk seed openings 302 (and any associated, carried or adhered seed) reaching the removal or release position. In some embodiments, the sorghum protrusion extension 374 extending into of past the sorghum disk seed opening section 310 of the seed meter disk 54 dislodges any seed(s) stuck in the sorghum disk seed opening 302. In some embodiments, the sorghum protrusion extension 374 forcibly removes any seed(s) held in the sorghum disk seed opening 302 by any intentional or unintentional pressure differential. In some embodiments, the sorghum protrusion extension 374 blocks the flow of fluid (e.g., air) across the disk and thereby locally removes or destroys any pressure differential across the disk allowing any seed(s) held in the sorghum disk seed opening 302 to drop off. The sorghum protrusion extension 374 may serve as a redundant backup to a pressure differential cutoff (e.g., a vacuum cutoff). The sorghum protrusion extension 374 may also serve to remove any particulate or debris caught by or held within any one or more of the sorghum disk kick-out section 314, sorghum disk transition section 312, and sorghum disk seed opening section 310. In some embodiments, two or more sorghum disk kick-out wheel assemblies 350 may be included in a single seed meter 44, on the vacuum-side face 54C of the seed meter disk 54. For example, one sorghum disk kick-out wheel assembly 350 may be provided at the release or removal position to dislodge, remove, or force out a seed or debris from the sorghum disk seed opening section 310 of the sorghum disk seed openings 302. A sorghum disk kick-out wheel assembly 350 may be provided on the vacuum-side face 54C between the release or removal position and the seed pool to clean out, (e.g., remove any particulate, dirt, or seed pieces from) any one or more of the sorghum disk kick-out section 314, sorghum disk transition section 312, and the sorghum disk seed opening section 310. A sorghum disk kick-out wheel assembly 350 may be provided on the vacuum-side face 54C opposite the seed pool to remove or reduce doubles, e.g., more than one seed held by a single sorghum disk seed opening section 310. Other sorghum disk kick-out wheel assemblies 350, particularly having sorghum disk kick-out protrusions 356 with different dimensions may be provided at other locations on the vacuum-side face 54C along the circular seed path. For example, a sorghum disk kick-out wheel assembly 350 having sorghum disk kick-out protrusions 356 with short sorghum protrusion extensions 374, just long enough to slightly jostle or wiggle the seed, may be provided on the vacuum-side face 54C between the seed pool and the release or removal position. Short sorghum protrusion extension 374 may advantageously serve to remove doubles while not dislodging a main seed, thereby advantageously improving meter singulation.

FIGS. 14A-14C illustrate a rice disk 400 configured to meter rice seeds. FIG. 14A shows the seed-side face 54B of the rice disk 400. FIG. 14B shows the vacuum-side face 54C of the rice disk 400. FIG. 14C shows the edge of the rice disk 400. The rice disk 400 may include any, all, many, some, or none of the features, dimension, locations, and/or functions of the various parts or portions of the other seed disks disclosed herein, including, for example, the sorghum disk 300. As shown in FIG. 14A, the seed-side face 54B of the rice disk 400 includes, in a radially innermost to a radially outermost direction, a central mounting aperture 120, a circumferential array of rice disk inner agitator pockets 407, a plurality (e.g., two) of mating apertures 112, a circumferential array of rice disk outer agitator pockets 406, a circumferential array of rice agitator pegs 430, a circumferential array of rice disk seed openings 402, and a plurality of teeth 54A. As shown in FIG. 14B, the vacuum-side face 54C of the rice disk 400 includes, in a radially innermost to a radially outermost direction, a central mounting aperture 120, a plurality (e.g., two) of mating apertures 112, a circumferential array of rice disk kick-out pockets 404, and a plurality of teeth 54A.

FIG. 14A shows the two circumferential arrays of agitator pockets, including an array of rice disk outer agitator pockets 406 and an array of rice disk inner agitator pockets 407. In some embodiments, the rice disk 400 includes one or two circumferential arrays of agitator pockets. In some embodiments, the rice disk 400 includes 3, 4, or 5 circumferential arrays of agitator pockets. In some embodiments, one or more, e.g., some or all, of the agitator pockets are oriented radially. In some embodiments, one or more, e.g., some or all, of the agitator pockets are canted, angled, inclined, or swept with respect to a radial line. In some embodiments, all circumferential arrays of agitator pockets are canted, inclined, or swept in the same direction, e.g., all agitator pockets are canted, inclined, or swept in a counterclockwise direction or all agitator pockets are canted, inclined, or swept in a clockwise direction. In embodiments of the rice disk 400 having two or more circumferential arrays of agitator pockets, one or more arrays of agitator pockets may be canted, inclined, or swept in a direction opposite the direction of cant, incline, or sweep, or one or more different or other arrays of agitator pockets. For example, a first array of agitator pockets may be canted in a first direction (e.g., clockwise or counterclockwise), then a second array of agitator pockets radially outward to the first array of agitator pockets may be canted in a second direction, opposite the first direction. In some embodiments, a first and second array of agitator pockets are canted in the same direction but at varying degrees of cant, incline, or sweep. As shown in FIG. 14A, the radially inner circumferential array of rice disk inner agitator pockets 407 is canted or inclined in a counterclockwise direction and the radially outer circumferential array of rice disk outer agitator pockets 406 is canted or inclined in a clockwise direction. Additionally, the radially inner circumferential array of rice disk inner agitator pockets 407 is more aggressively canted, e.g., at a steeper angle with respect to a radial line than the radially outer circumferential array of rice disk outer agitator pockets 406 (however the steepness of cant could be reversed such that the radially outer circumferential array of rice disk outer agitator pockets 406 is more aggressively canted than the radially inner circumferential array of rice disk inner agitator pockets 407. The rice disk 400 shown in FIG. 14A has 28 rice disk inner agitator pockets 407 and 56 rice disk outer agitator pockets 406. In some embodiments, the rice disk 400 may have more or fewer rice disk inner agitator pockets 407. For example, the rice disk 400 may have a number of rice disk inner agitator pockets 407 that is between about 18-38, between about 20-36, between about 22-34, between about 24-32, or between about 26-30, or any other number of rice disk inner agitator pockets 407 that advantageously agitates seed and/or improves function of the seed meter disk 54. In some embodiments, the rice disk 400 may have more or fewer rice disk outer agitator pockets 406. For example, the rice disk 400 may have a number of rice disk outer agitator pockets 406 that is between about 36-76, between about 38-74, between about 40-72, between about 42-70, between about 44-68, between about 46-66, between about 48-64, between about 50-62, between about 52-60, between about 54-58, or any other number of rice disk outer agitator pockets 406 that advantageously agitates seed and/or improves function of the seed meter disk 54. In some embodiments, the rice disk outer agitator pockets 406 are volumetrically larger than the rice disk inner agitator pockets 407. In some embodiments, the rice disk inner agitator pockets 407 are volumetrically larger than the rice disk outer agitator pockets 406. In some embodiments, the rice disk outer agitator pockets 406 are volumetrically approximately equal to the rice disk inner agitator pockets 407.

As shown in FIG. 14A, the rice disk 400 includes a circumferential array of rice agitator pegs 430 spaced radially between the rice disk outer agitator pockets 406 and the rice disk seed openings 402. While a single array of rice agitator pegs 430 are shown, the rice disk 400 may include more than one circumferential array of rice agitator pegs 430, e.g., 2, 3, 4 or more circumferential arrays of rice agitator pegs 430. In some embodiments, at least one circumferential array of rice agitator pegs 430 is provided or located radially inward of the rice disk inner agitator pockets 407. In some embodiments, at least one circumferential array of rice agitator pegs 430 is provided or located radially within the rice disk inner agitator pockets 407. In some embodiments, at least one circumferential array of rice agitator pegs 430 is provided or located radially between the rice disk inner agitator pockets 407 and the rice disk outer agitator pockets 406. In some embodiments, at least one circumferential array of rice agitator pegs 430 is provided or located radially within the rice disk outer agitator pockets 406. In some embodiments, at least one circumferential array of rice agitator pegs 430 is provided or located radially between the rice disk outer agitator pockets 406 and the rice disk seed openings 402. In some embodiments, at least one circumferential array of rice agitator pegs 430 is provided or located radially outward of the rice disk seed openings 402. The rice disk 400 shown in FIG. 14A includes 22 rice agitator pegs 430. In some embodiments, more or fewer rice agitator pegs 430 are included in each circumferential array of agitator pegs. For example, the rice disk 400 may include a number of rice agitator pegs 430 in each circumferential array of agitator pegs that is between about 12-32, between about 14-30, between about 16-28, between about 18-26, between about 20-24, or any other number of rice agitator pegs 430 that advantageously agitates seed and/or improves function of the seed meter disk 54.

As shown in FIG. 14C, the rice agitator pegs 430 are raised from or extend from the surface of the seed-side face 54B of the rice disk 400. The rice agitator pegs 430 may be generally smooth and have generally smooth connections or couplings to advantageously permit agitation of seeds, but minimize damage to seeds, e.g., from sharp transitions or corners. In some embodiments, the rice agitator pegs 430 are cylindrical, e.g., generally cylindrical, pegs. In some embodiments, the rice agitator pegs 430 have radiused or rounded top corners or edges or are capped by hemispherical portions. In some embodiments, the rice agitator pegs 430 have curved skirts connecting the raised sides of the rice agitator pegs 430 to the seed-side face 54B of the rice disk 400. In some embodiments, the rice agitator pegs 430 have a length dimension, e.g., from the face of the seed disk to the outer end of the rice agitator peg 430, that is approximately equal to the disk thickness 55 of the rice disk 400. In some embodiments, the rice agitator pegs 430 have a length dimension to disk thickness 55 relationship of between about 50-150%, between about 55-145%, between about 60-140%, between about 65-135%, between about 70-130%, between about 75-125%, between about 80-120%, between about 85-115%, between about 90-110%, between about 95-105%, any other length dimension to disk thickness relationship that advantageously agitates seed and/or improves function of the seed meter disk 54. In some embodiments, the rice agitator pegs 430 have a largest cross-sectional dimension, e.g., a cylindrical peg diameter, of about 3 mm. In some embodiments, the rice agitator pegs 430 have a largest cross-sectional dimension of less than about 5 mm, less than about 4 mm, less than about 3 mm, less than about 2 mm, less than about 1 mm or any other largest cross-sectional dimension that advantageously agitates seed and/or improves function of the seed meter disk 54.

As further shown in FIG. 14A, the rice disk 400 includes a plurality of rice disk seed openings 402 arranged in a single circumferential array. The rice disk 400 shown in FIG. 14A includes 44 rice disk seed openings 402. As with any of the other seed disks disclosed herein, the rice disk 400 may include more or fewer rice disk seed openings 402 arranged in one or more circumferential arrays. For example, the rice disk 400 may have 1, 2, 3, 4 or more circumferential arrays of rice disk seed openings 402, each of which may include a number of rice disk seed openings 402 that is between about 34-54, between about 36-52, between about 38-50, between about 40-48, or between about 42-46.

Figure 15A:
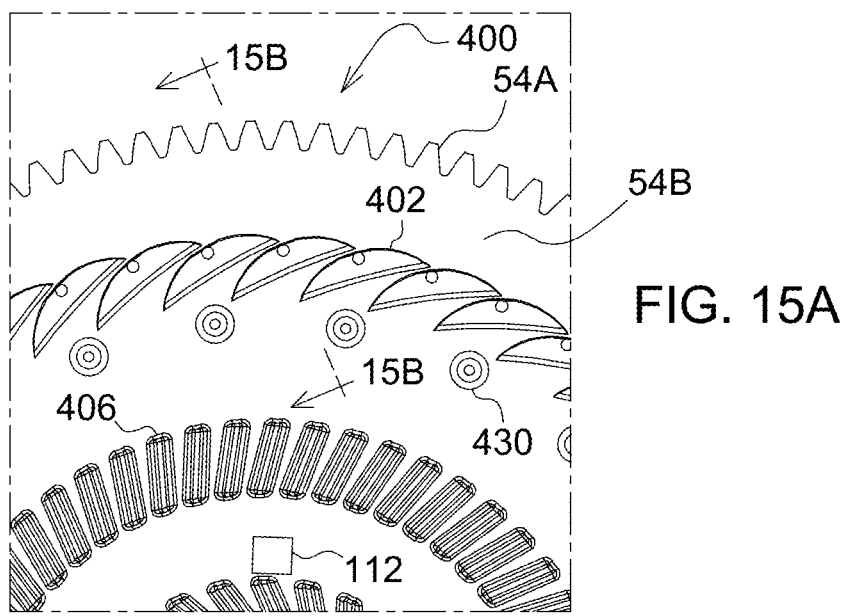
Figure 15B:
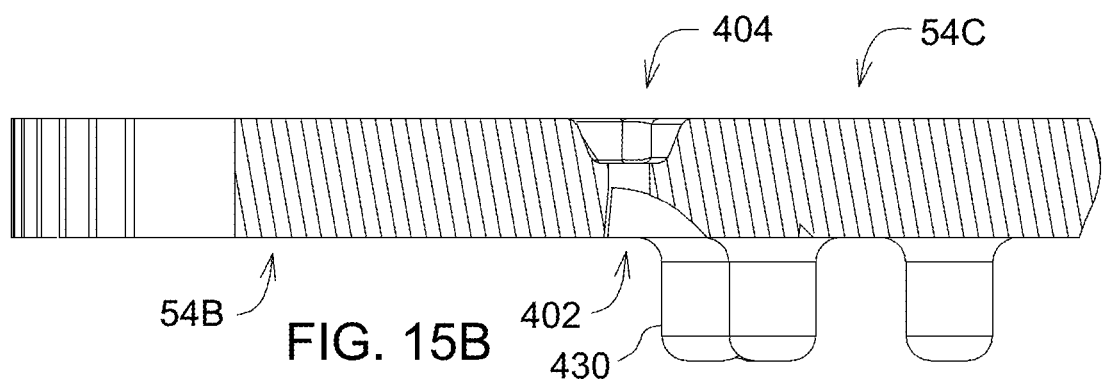
FIG. 15B shows a cross-sectional view of the rice seed meter disk of FIG. 15A taken along line 15B 115B.
Figure 15C:
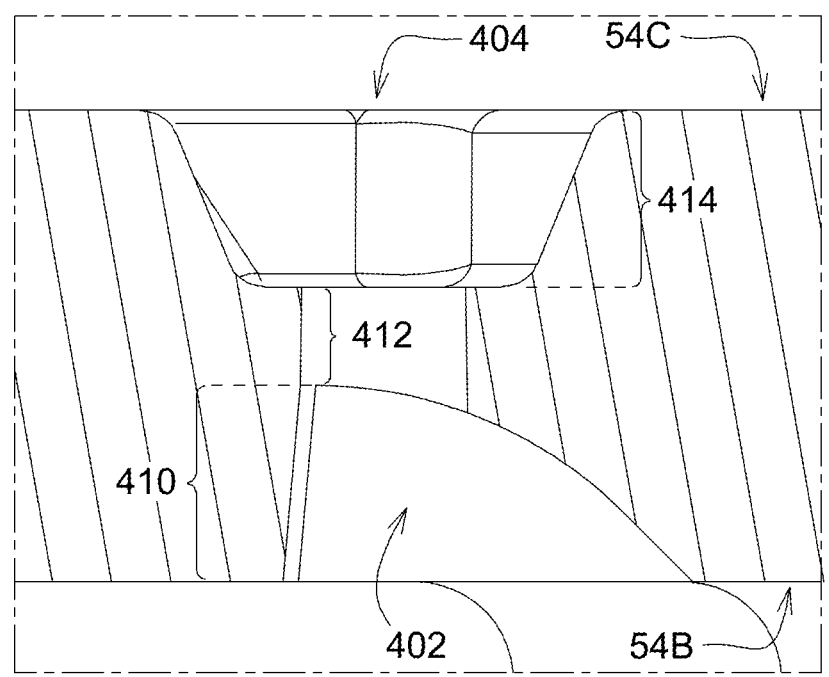
FIG. 15C shows an enlarged view of the cross-sectional view of FIG. 15B.

Each rice disk seed opening 402 of the rice disk 400 may have a crescent or wedge shape that is generally symmetrical along its minor axis, generally asymmetrical along its major axis, and canted with respect to a radius of the rice disk 400. FIG. 15A shows an enlarged view of a portion of the rice disk 400 shown in FIG. 14A, including at least a portion of the rice disk outer agitator pockets 406, rice agitator pegs 430, and rice disk seed openings 402. FIG. 15B shows a cross-sectional view of the rice disk seed openings 402 of FIG. 15A taken along line 15B 15B. FIG. 15C illustrates an enlarged view of the rice disk seed opening 402 and rice disk kick-out pockets 404, including the rice disk seed opening section 410, rice disk transition section 412 and rice disk kick-out section 414 of FIG. 15B. Line 15B 115B passes through the minor axis cross-section, or the line of bilateral symmetry, of the rice disk seed opening section 410.

As can be seen from FIG. 15A, the inner portion of the rice disk seed opening section 410, i.e., the portion to the left of line 15B 15B, symmetrical to the outer portion of the rice disk seed opening section 410, i.e., the portion to the right of line 15B 115B. Thus, the rice disk seed opening section 410 is bilaterally symmetrical about line 15B 15B. Each rice disk seed opening section 410 has a generally straight or very slightly curved first edge and a generally curved second edge or wall, e.g., each rice disk seed opening section 410 may have a generally curved crescent wedge shape. The first edge of the rice disk seed opening section 410 begins at the seed-side face 54B of the seed meter disk 54 and curves gently down into the seed-side face 54B of the seed meter disk 54 (e.g., curves generally, almost, or actually parabolically). The second edge or wall of the rice disk seed opening section 410 is sharply angled, e.g., nearly axially (e.g., nearly perpendicular to the seed-side face 54B of the seed meter disk 54), into the seed-side face 54B of the seed meter disk 54. In some embodiments, the first edge of the rice disk seed opening section 410 leads the second edge or wall of the rice disk seed opening section 410 in the direction of rotation of the seed meter disk 54 (during metering operation), e.g., the first edge leads the second edge or wall. In some embodiments, the first edge of the rice disk seed opening section 410 follows the second edge or wall of the rice disk seed opening section 410 in the direction of rotation of the seed meter disk 54 (during meter operation), e.g., the second edge or wall leads the first edge or wall.

As shown in FIG. 4, an inner edge of the seed-side portion 52A of the seed disk housing 52 is positioned adjacent the seed-side face 54B of the seed meter disk 54. In some embodiments, an inner edge of the seed-side portion 52A of the seed disk housing 52 is positioned both adjacent the seed-side face 54B of the seed meter disk 54 and slightly above the outermost edge of the crescent or wedge-shaped rice disk seed openings 402. For example, the edge of the meter housing may be positioned just radially outside of the rice disk transition section 412 of the rice disk seed openings 402 (e.g., only a small portion of the rice disk seed openings 402 is covered by the meter housing at the seed pool location. This allows an elongated rice seed to slide into the seed pocket, e.g., or rice disk seed openings 402, as the rice disk 400 rotates. The crescent shape of the rice disk seed openings 402 may advantageously scoop seed up and lift them out of the seed puddle within the seed-side portion 52A of the seed disk housing 52 during metering. In some embodiments, the edge of the meter housing covers a portion of the seed cells only in or near the seed pool. The edge of the meter housing covering the portion of the seed cells in or near the seed pool may diverge away from the seed cells on either side of the seed pool. This may advantageously promote scoop up and adhesion within the seed pool, then unobstructed conveyance along the seed path (where the housing portion does not obstruct any portion of the seed cells.

In some embodiments, the first edge of the rice disk seed opening 402 is oriented perpendicularly to a radius of the rice disk 400. In some embodiments, the first edge of the rice disk seed opening section 410 is oriented generally along a radius of the rice disk 400. In some embodiments, the first edge of the rice disk seed opening section 410 is canted with respect to a line perpendicular to a radius of the rice disk 400. The first edge may be canted with a positive clockwise angle, as shown in FIG. 14A. Alternatively, the first edge may be canted with a negative clockwise angle, not shown. The first edge of the rice disk seed opening section 410 may be canted at an angle with respect to a line perpendicular to a radius of the rice disk 400 having a magnitude, e.g., encompassing both a positive clockwise angle and/or a negative clockwise angle, of about 35°. In some embodiments, the first edge of the rice disk seed opening section 410 may be canted at an angle with respect to a line perpendicular to a radius of the rice disk 400 having a magnitude of less than about 90°, less than about 85°, less than about 80°, less than about 75°, less than about 70°, less than about 65°, less than about 60°, less than about 55°, less than about 50°, less than about 45°, less than about 40°, less than about 35°, less than about 30°, less than about 25°, less than about 20°, less than about 15°, less than about 10°, less than about 5°, or any other angle that advantageously facilitates pickup, adherence, and/or retention of a seed in the rice disk seed opening(s) 402.

Turning to FIG. 15C, a cross-section of a rice disk seed opening 402 and rice disk kick-out pockets 404, including the rice disk seed opening section 410, rice disk transition section 412, and rice disk kick-out section 414 taken along its line of bilateral symmetry or minor axis (e.g., line 15B 15B) is shown. The rice disk seed opening section 410 extends into the seed-side face 54B of the seed meter disk 54 as disclosed herein. On the minor axis and at the deepest point in the rice disk seed opening section 410, e.g., the apex of the curved second wall, the rice disk seed opening section 410 connects with a rice disk transition section 412, which, in turn, connects to a rice disk kick-out section 414. As the rice disk seed opening section 410 of FIGS. 15A and 15C is canted with respect to a radius of the rice disk 400, the cross-section of the rice disk kick-out section 414 shown in FIG. 15C is not entirely aligned with any minor or major axis of that rice disk kick-out section 414.

In some embodiments, the rice disk seed opening section 410 extends into the seed-side face 54B of the rice disk 400 by about 50% of the disk thickness 55. In some embodiments, the rice disk seed opening section 410 extends into the face of the disk by less than about 70%, 65%, 60%, 55%, 50%, 45%, 40%, 35%, or 30%, of the thickness of the disk.

The rice disk transition section 412 may have a circular, e.g., generally circular, cross-section and extends between the rice disk seed opening section 410 and the rice disk kick-out section 414, placing the two in fluid communication so that a pressure differential, e.g., a vacuum, may be applied across the disk. The rice disk transition section 412 may have a largest cross-sectional dimension, e.g., diameter of about 1.5 mm. In some embodiments, the rice disk transition section 412 has a largest cross-sectional dimension, e.g., diameter, of less than about 3 mm, less than about 2.8 mm, less than about 2.6 mm, less than about 2.4 mm, less than about 2.2 mm, less than about 2 mm, less than about 1.8 mm, less than about 1.6 mm, less than about 1.4 mm, less than about 1.2 mm, less than about 1 mm, less than about 0.8 mm or any other diameter that facilitates maintaining a pressure differential across the rice disk 400. The rice disk transition section 412 extends through the thickness of the disk by less than about 12%, less than about 11%, less than about 10%, less than about 9%, less than about 8%, less than about 7%, less than about 6%, less than about 5%, less than about 4%, or less than about 3%.

FIG. 14B shows the vacuum-side face 54C of the rice disk 400. The vacuum-side face 54C may include any, all, many, some, or none of the features, dimension, locations, and/or functions of the various parts or portions of the other seed disks disclosed herein, including, for example, the sorghum disk 300. As shown in FIG. 14B, the vacuum-side face 54C of the rice disk 400 includes, in a radially innermost to a radially outermost direction, a central mounting aperture 120, a plurality (e.g., two) of mating apertures 112, a circumferential array of rice disk kick-out pockets 404, and a plurality of teeth 54A.

Figure 16A:
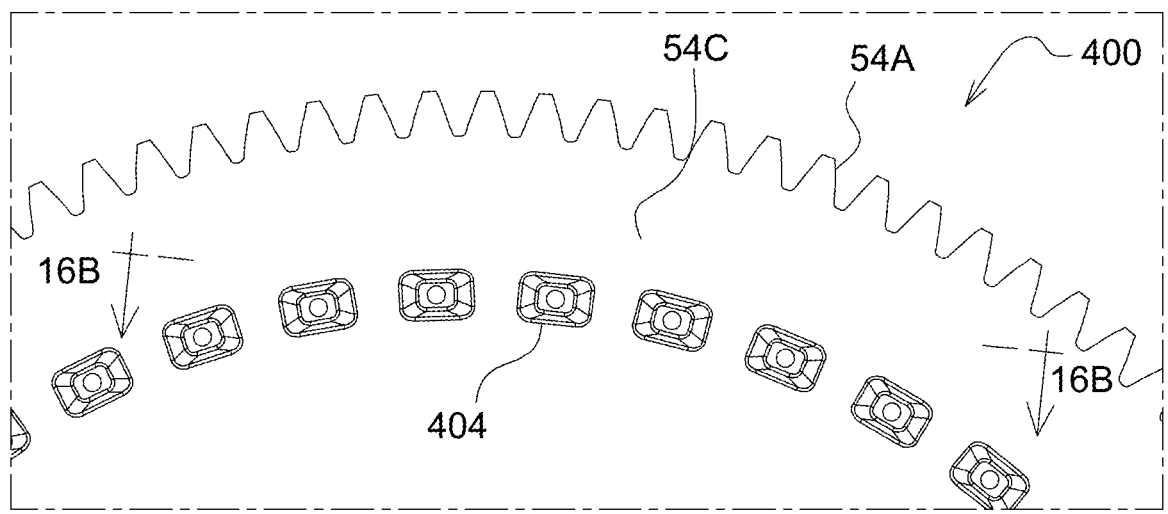
FIGS. 16A-16C show various enlarged and cross-sectional views of the rice seed meter disk of FIGS. 14A-14C.
Figure 16B:
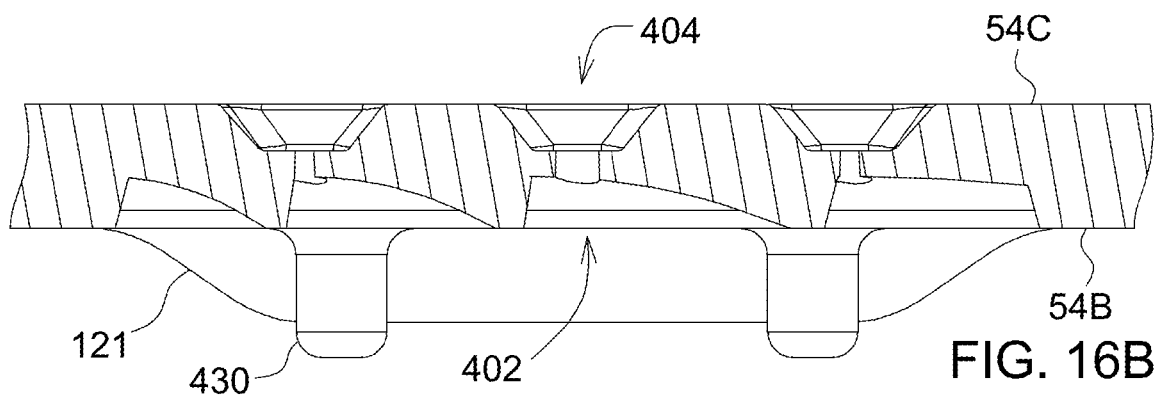
Figure 16C:
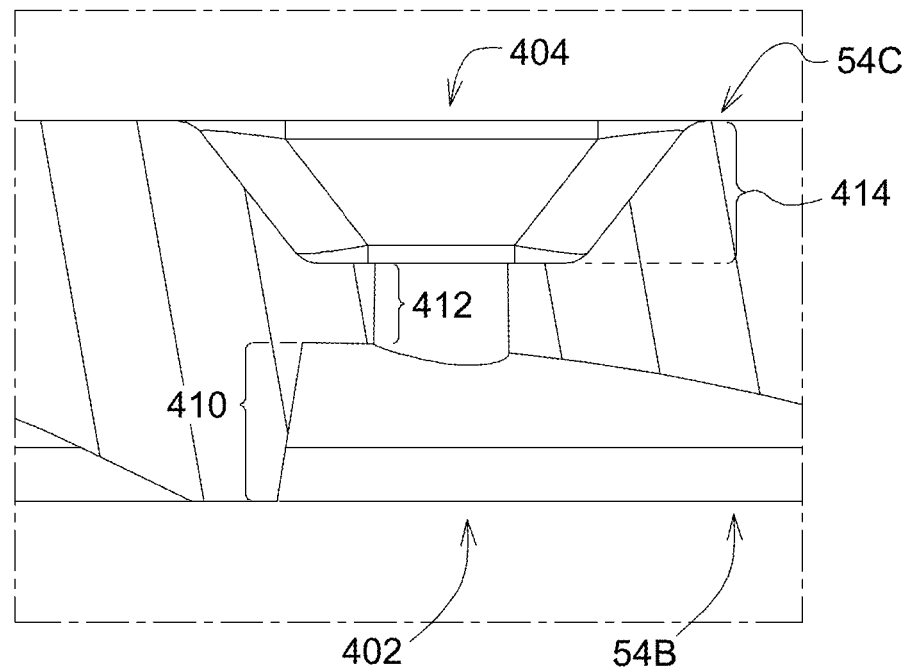

FIG. 16A shows an enlarged view of a portion of FIG. 14B, including at least a portion of the circumferential array of rice disk kick-out pockets 404. FIG. 16B shows a cross-sectional view of the rice disk kick-out pockets 404 of FIG. 16A taken along line 16B 16B. FIG. 16C illustrates an enlarged view of the rice disk kick-out pockets 404 and associated rice disk seed openings 402 of FIG. 16B. Line 16B 116B passes through the center of the rice disk kick-out pocket 404 shown in FIGS. 16B and 16C perpendicular to a line extending radially from the center of the rice disk 400 through the center of the rice disk kick-out pockets 404 shown in FIGS. 16B and 16C (i.e., it passes through the major axis of the rice disk kick-out pockets 404 shown in FIGS. 16B and 16C or tangentially through the center of the rice disk kick-out pockets 404).

As can be seen from FIGS. 16A and 16C, the rice disk kick-out pockets 404 have a generally inverse frustopyramidal shape, with the narrowest portion of the frustopyramid connecting to the rice disk transition section 412, the walls of the pyramid extending toward the vacuum-side face 54C at an angle, and the mouth or bottom of the pyramid connecting to or opening at the vacuum-side face 54C of the disk. The corners of the inverse frustopyramidal rice disk kick-out pockets 404 may be rounded, including both the corners of the pyramid extending into the vacuum-side face 54C of the disk and the bottom edges of the pyramid where the mouth of the rice disk kick-out pocket 404 meets the vacuum-side face 54C of the disk. In some embodiments, the various features and functions of the rice disk kick-out pockets 404 may be the same or similar to the various features and functions of other kick-out pockets disclosed herein, such as the sorghum disk kick-out pockets 304 of the sorghum disk 300.

FIGS. 17A-17F show various view of a rice disk kick-out wheel assembly 450. The rice disk kick-out wheel assembly 450 may include any, all, many, some, or none of the features, dimension, locations, and/or functions of the various parts or portions of the various other kick-out wheel assemblies disclosed herein, including, for example, the sorghum disk kick-out wheel assembly 350. The rice disk kick-out wheel assembly 450 may include a rice disk kick-out wheel 454 having a plurality of rice disk kick-out protrusions 456 and held, e.g., rotatably held, by a rice disk kick-out wheel arm 452.

Figure 17A:
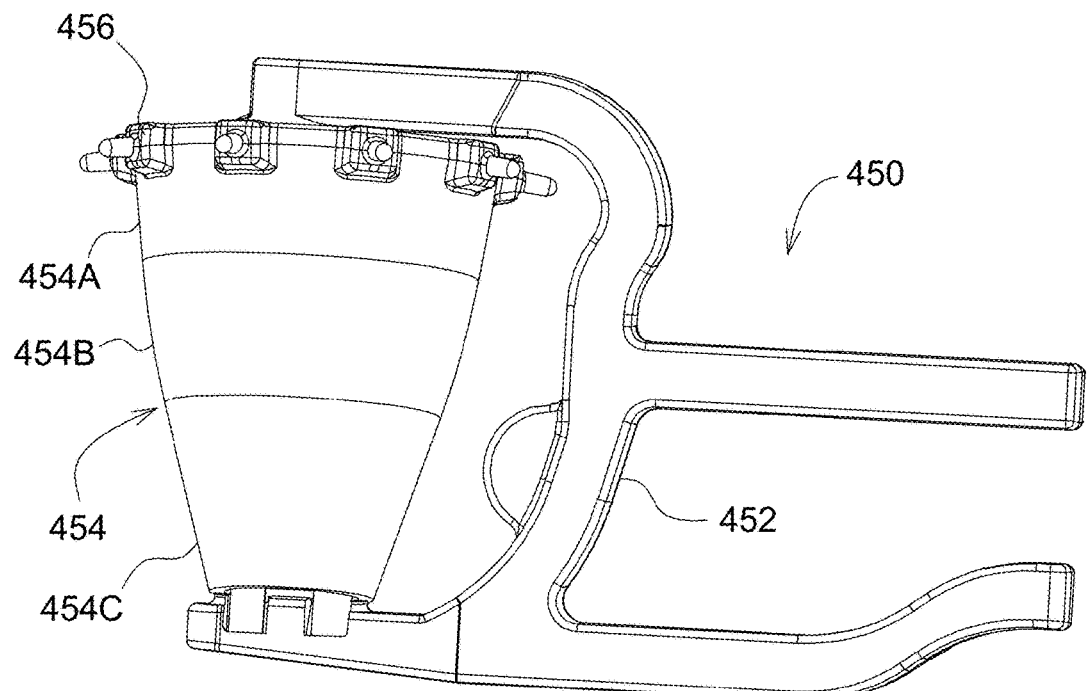
Figure 17B:
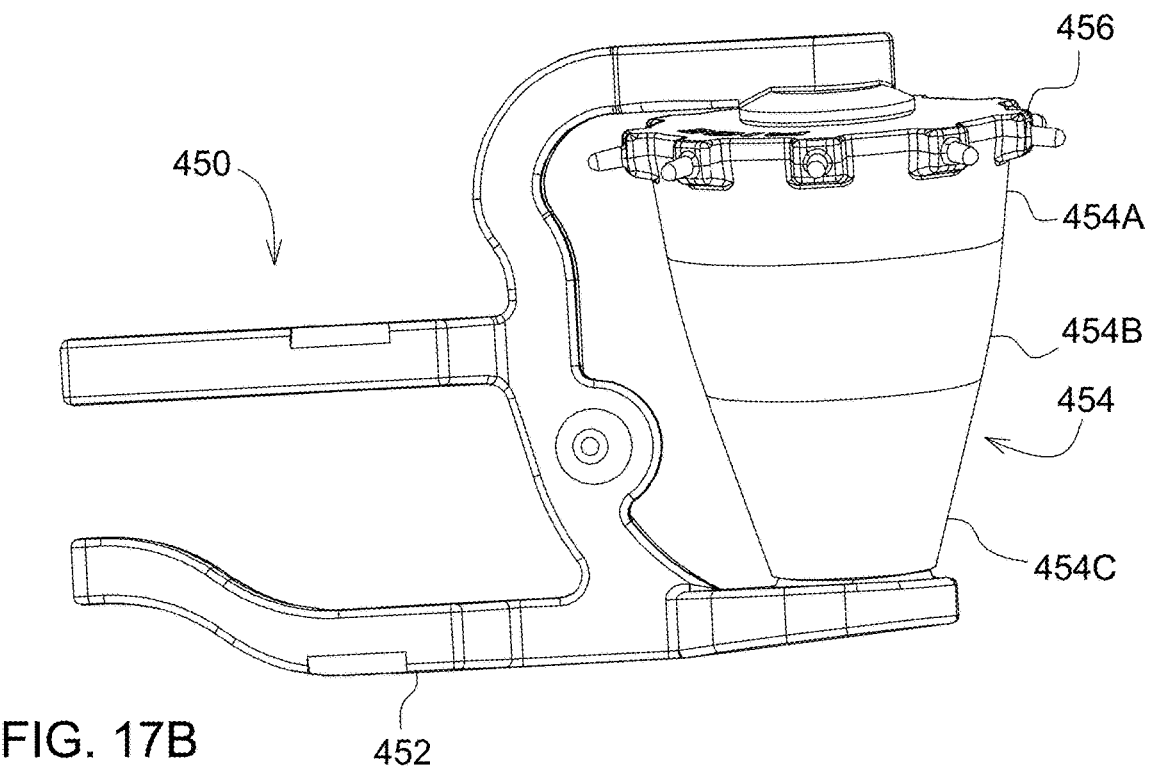

The rice disk kick-out wheel 454 includes a protrusion portion 454A, having a plurality of rice disk kick-out protrusions 456, and at least one body portion, e.g., first body portion 454B and second body portion 454C. The rice disk kick-out protrusions 456 may be arranged in a ring on the protrusion portion 454A. The rice disk kick-out wheel 454 shown in FIGS. 17A-17F includes a protrusion portion 454A having only a single ring of rice disk kick-out protrusions 456. However, the rice disk kick-out wheel 454 may have a protrusion portion 454A having two or more, e.g., 3, 4, 5, or 6, rings of rice disk kick-out protrusions 456. With reference to FIGS. 17E-17F, the protrusion portion 454A of the rice disk kick-out wheel 454 includes 9 rice disk kick-out protrusions 456, arranged in a ring. In some embodiments, as disclosed in connection with other kick-out wheels described herein, the protrusion portion 454A of the rice disk kick-out wheel 454 may include more or fewer rice disk kick-out protrusions 456 in each ring of the protrusion portion 454A, or portions.

Turning again to FIGS. 17A-17B, the rice disk kick-out wheel 454 may include a body portion adjacent the protrusion portion 454A. The body portion of the rice disk kick-out wheel 454 may be configured, constructed, arranged, and or used similarly to the other body portions disclosed herein, including the body portion(s) of the sorghum disk kick-out wheel 354. The body portion of the rice disk kick-out wheel 454 may include a first body portion 454B and a second body portion 454C.

Figure 18:
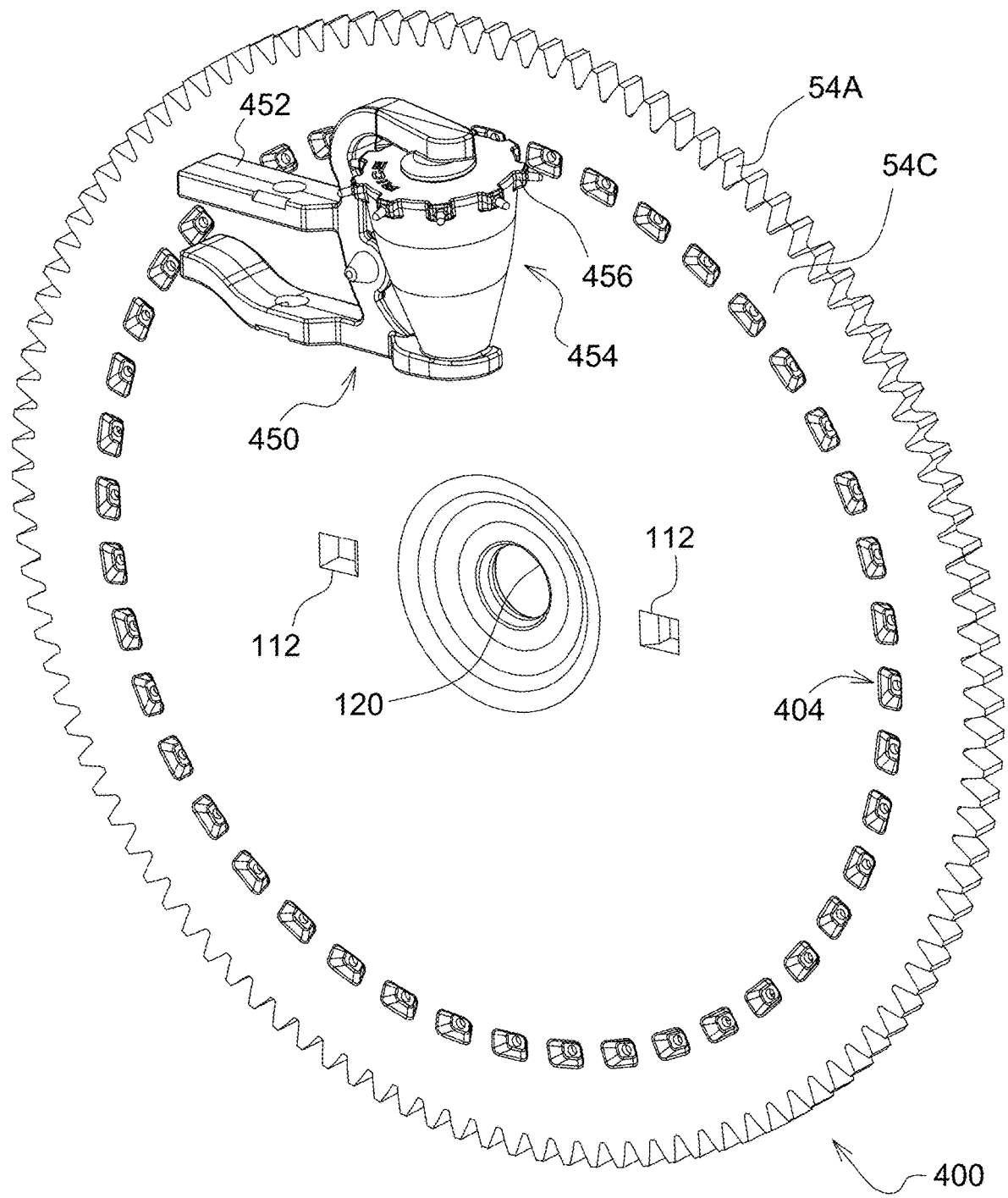
FIG. 18 shows the rice kick-out wheel assembly of FIGS. 17A-17F in mating engagement with the sorghum seed meter disk of FIGS. 14A-14C.

The various portions of the sorghum disk kick-out wheel 354, e.g., the protrusion portion 454A, the first body portion 454B, and the second body portion 454C, may be held, e.g., rotatably held, by the rice disk kick-out wheel arm 452. The rice disk kick-out wheel arm 452 may be attached to or held by an inner surface or portion of the seed disk housing 52 on the vacuum-side face 54C of the seed meter disk 54 as disclosed in connection with the various other kick-out wheel arms disclosed herein, including the sorghum disk kick-out wheel arm 352. The rice disk kick-out wheel arm 452 may be configured, constructed, arranged, and or used similarly to the other kick-out wheel arms disclosed herein, including the sorghum disk kick-out wheel arm 352. FIG. 18 illustrates the rice disk kick-out wheel assembly 450 engaged with a rice disk 400, with all other components of the system removed, for clarity's sake. The rice disk kick-out wheel arm 452, and thus the rest of the rice disk kick-out wheel assembly 450 may be biased by a spring or other biasing member away from the rear-side portion 52B of the seed disk housing 52, such that the rice disk kick-out wheel 454 is held in close contact or biased engagement with the vacuum-side face 54C of the rice disk 400.

Turning to FIG. 17F, each rice disk kick-out protrusion 456 of the rice disk kick-out wheel 454 includes a plurality of sections, arranged in radial sequence. The rice disk kick-out protrusions 456 of the rice disk kick-out wheel 454 may be configured, constructed, arranged, and or used similarly to the other kick-out protrusions disclosed herein, including the sorghum disk kick-out protrusion 356 of the sorghum disk kick-out wheel 354. In some embodiments, the rice disk kick-out protrusion 456 includes a rice protrusion shoulder section 470, a rice protrusion transition section 472, and a rice protrusion extension 474. As described elsewhere herein, each section of the rice disk kick-out protrusion 456 has a shape, profile, and/or dimension along a minor axis and along a major axis. For example, the shape and or profile of the rice disk kick-out protrusions 456 generally mate with the rice disk kick-out pockets 404. For example, the shape or profile of the rice protrusion shoulder section 470 of the rice disk kick-out protrusion 456 along the major axis mates with (e.g., is configured to mate with), e.g., is a mirror image to, or is an inverse to, or is an approximate opposite to, the shape or profile of the rice disk kick-out section 414 of the rice disk kick-out pockets 404 along its major axis. In much the same way, the shape or profile of the rice protrusion shoulder section 470 of the rice disk kick-out protrusion 456 along the minor axis mates with (e.g., is configured to mate with), e.g., is a mirror image to, or is an inverse to, or is an approximate opposite to, the shape or profile of the rice disk kick-out section 414 of the rice disk kick-out pockets 404 along the minor axis. The rice protrusion shoulder section 470 is generally frustopyramidal having a generally radially decreasing (e.g., from bottom to top) square or rectangular shape and is configured to mate with the generally frustopyramidal shape of the rice disk kick-out section 414. The frustopyramidal shape of the rice protrusion shoulder section 470 and the mating corresponding shape of the rice disk kick-out section 414 of the rice disk kick-out pockets 404, e.g., the flat to flat contact sections, may advantageously improve connection or contact between the rice disk kick-out protrusion 456 of the rice disk kick-out wheel 454 and the rice disk kick-out pockets 404 of the rice disk 400. Evenness of contact may advantageously distribute forces across the contact surfaces, e.g., across a larger contact surface that may be provided by a frustoconical protrusion (or any other protrusion having a circular cross-section), thereby advantageously improving fit, function, and wear of the components.

The shape or profile of the rice protrusion transition section 472 of the rice disk kick-out protrusion 456 along the major axis mates with (e.g., is configured to mate with), e.g., is a mirror image to, or is an inverse to, or is an approximate opposite to, the shape or profile of the rice disk transition section 412 of the rice disk kick-out pockets 404 along the major axis. In much the same way, the shape or profile of the rice protrusion transition section 472 along the minor axis mates with (e.g., is configured to mate with), e.g., is a mirror image to, or is an inverse to, or is an approximate opposite to, the shape or profile of the rice disk kick-out section 414 of the rice disk kick-out pockets 404 along the minor axis. In some embodiments, the rice disk transition section 412 is a generally cylindrical opening and the rice protrusion transition section 472 is a generally cylindrical solid. In much the same way, the rice protrusion transition section 472 may have a length dimension that is approximately equal to a depth dimension of the rice disk transition section 412. In some embodiments, the length dimension of the rice protrusion transition section 472 is between about 80-120% of the depth dimension of the rice disk transition section 412. In some embodiments, the relationship between those two dimensions is between about 82-118%, between about 84-116%, between about 86-114%, between about 88-112%, between about 90-110%, between about 92-108%, between about 94-106%, between about 96-104%, or between about 98-102%.

The rice protrusion extension 474 of the rice disk kick-out protrusion 456 extends radially out from the rice protrusion transition section 472. The base of the rice protrusion extension 474 may have a cross-sectional dimension that is approximately the same as the cross-sectional dimension of the outermost surface of portion of the rice protrusion transition section 472, e.g., the rice protrusion extension 474 may extend, e.g., extend substantially continuously from, the rice protrusion transition section 472. In some embodiments, the rice protrusion extension 474 has a length that allows the rice protrusion extension 474 to extend into, through, or past the rice disk seed opening section 410, as disclosed in connection with the various other kick-out wheels described herein. In some embodiments, the rice protrusion extension 474 is a hemispherical or rounded cap on the end of the rice protrusion transition section 472.

FIGS. 19A-19C illustrate a soybean disk 500 configured to meter soybeans. FIG. 19A shows the seed-side face 54B of the soybean disk 500. FIG. 19B shows the vacuum-side face 54C of the soybean disk 500. FIG. 19C shows the edge of the soybean disk 500. The soybean disk 500 may include any, all, many, some, or none of the features, dimension, locations, and/or functions of the various parts or portions of the other seed disks disclosed herein, including, for example, the sorghum disk 300 and rice disk 400. As shown in FIG. 19A, the seed-side face 54B of the soybean disk 500 includes, in a radially innermost to a radially outermost direction, a central mounting aperture 120, a plurality (e.g., two) of mating apertures 112, a plurality of soybean disk agitator pockets 506, a first circular array of soybean disk seed openings 502 and a first array of soybean protrusions 530, a second circular array of soybean disk seed openings 502 and a second array of soybean protrusions 530, and a plurality of teeth 54A. As shown in FIG. 19B, the vacuum-side face 54C of the soybean disk 500 includes, in a radially innermost to a radially outermost direction, a central mounting aperture 120, a plurality (e.g., two) of mating apertures 112, a first circumferential array of soybean disk kick-out pockets 504, a second circumferential array of soybean disk kick-out pockets 504, and a plurality of teeth 54A.

FIG. 19A shows a single circumferential array of soybean disk agitator pockets 506. In some embodiments, the soybean disk 500 includes more than one circumferential array of soybean disk agitator pockets 506. The soybean disk 500 shown in FIG. 19A has 23 soybean disk agitator pockets 506. As disclosed in connection with other disks, the soybean disk 500 may have more or fewer soybean disk agitator pockets 506. Each soybean disk agitator pocket 506 may have any, all, many, some, or none of the features, dimension, locations, and/or functions of the other various agitator pockets described herein. As shown in FIG. 19A, the soybean disk agitator pockets 506 may have a hatchet shape, with on outer edge lying on a circle, a generally straight, e.g., straight, inward pointing edge (the outermost point of which connects to the outer edge), and a curved blade portion connecting the outer edge to the innermost point of the generally straight inward pointing edge. In some embodiments, the blade portion of the soybean disk agitator pockets 506 begins at the surface of the soybean disk 500 and gently slopes down to the deepest part of the pocket, e.g., where the inward pointing edge meets the outer edge. In some embodiments, the inward pointing edge is a steeply sloped wall, e.g., nearly vertical or vertical. In some embodiments, the outer edge is a steeply sloped wall, e.g., nearly vertical or vertical.

The first circumferential array of soybean disk seed openings 502 shown in FIG. 19A includes 40 soybean disk seed openings 502 and 40 soybean protrusions 530. In much the same way, and despite having a larger diameter, the second circumferential array of soybean disk seed openings 502 includes 40 soybean disk seed openings 502 and 40 soybean protrusions 530. As shown, a soybean protrusion 530 is included between each set of adjacent soybean disk seed openings 502. Alternatively stated, a soybean protrusion 530 is located between each soybean disk seed opening 502 and the soybean disk seed opening 502 that is immediately adjacent. In some embodiments, a soybean protrusion 530 is not provided between all soybean disk seed openings 502. In some embodiments, more than one soybean protrusion 530 is provided between adjacent, e.g., immediately adjacent, soybean disk seed openings 502. In some embodiments, a soybean protrusion 530 is provided for each soybean disk seed opening 502 (as shown in FIG.

19A), e.g., between each set of adjacent soybean disk seed openings 502. In some embodiments, a soybean protrusion 530 is provided for each set of two soybean disk seed openings 502 (not shown), e.g., between adjacent sets of two soybean disk seed openings 502. In some embodiments, a soybean protrusion 530 is provided for each set of three soybean disk seed openings 502 (not shown), e.g., between adjacent sets of three soybean disk seed openings 502. In some embodiments, no soybean protrusions 530 are provided.

Figure 21A:
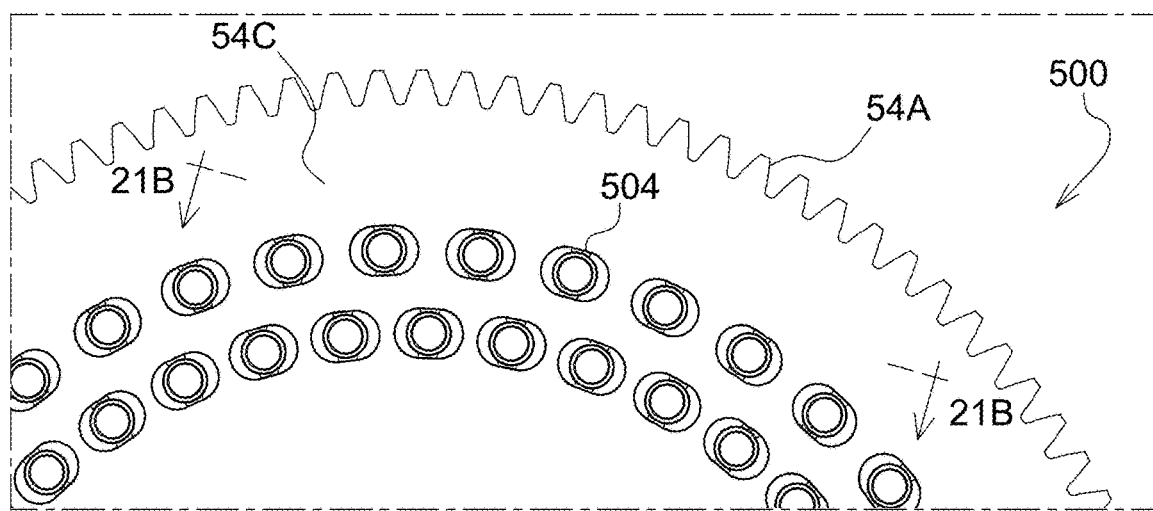
FIGS. 21A-21C show various enlarged and cross-sectional views of the soybean seed meter disk of FIGS. 19A-19C.
Figure 21B:
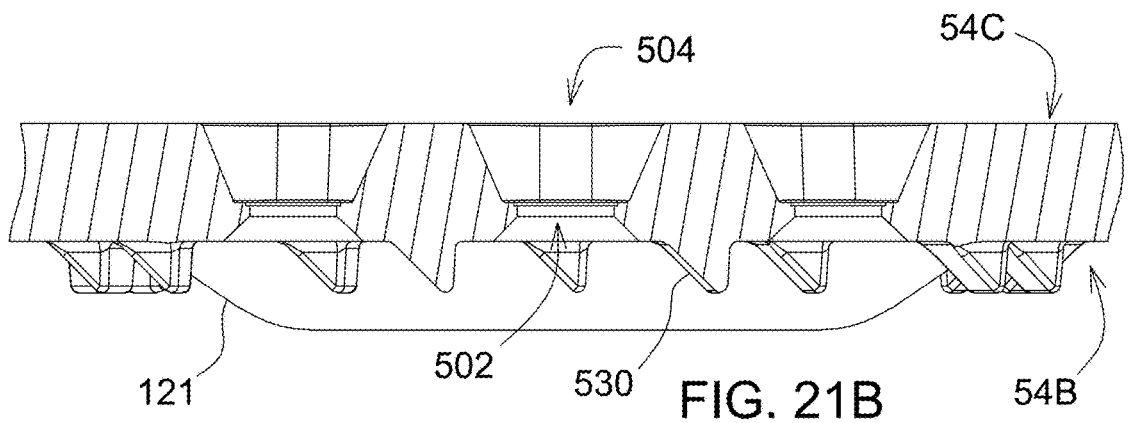

As shown in FIG. 21B, the soybean protrusions 530 may be wedges or triangles, e.g., wedges or triangles rising from the face of the seed disk. In some embodiments, the vertical face of such a wedge or triangle leads the sloped face of the wedge in the direction of rotation of the seed disk when in use, e.g., metering. In some embodiments, the sloped face of the wedge or triangle leads the vertical face of the wedge in the direction of rotation of the seed disk when in use, e.g., metering. In some embodiments, the soybean disk protrusions 530 may be paddles having a relatively flat or gently curved face, e.g., following the soybean disk seed opening 502. In some embodiments, the soybean disk protrusions 530 may follow, e.g., directly follow, the soybean disk seed openings 502 in a direction of rotation of the seed meter disk 54 when in use. In some embodiments, a plurality or all of the soybean disk protrusions 530 are located on the same circle defining the circumferential array of soybean disk seed openings 502, e.g., the soybean disk protrusions 530 may be radially located (or individually centered) on the circle defining the circumferential array of soybean disk seed openings 502. In some embodiments, at least a portion of the soybean disk protrusions 530 are radially offset from the circle defining the circumferential array of soybean disk seed openings 502. For example, a plurality or all of the soybean disk protrusions 530 may be radially offset inwardly from the circle defining the circumferential array of soybean disk seed openings 502. A plurality or all of the soybean disk protrusions 530 may be radially offset outwardly from the circle defining the circumferential array of soybean disk seed openings 502. In some embodiments, a plurality of the soybean disk protrusions 530 are radially offset inwardly from the circle defining the circumferential array of soybean disk seed openings 502, a plurality of the soybean disk protrusions 530 are radially offset outwardly from the circle defining the circumferential array of soybean disk seed openings 502 (additionally, optionally, a plurality of the soybean disk protrusions 530 may lie on the circle defining the circumferential array of soybean disk seed openings 502).

Each soybean disk protrusion 530 may have a largest width dimension, e.g., protrusion width. As shown in FIG. 19A, the largest width dimension of the soybean disk protrusions 530 may be generally radially oriented, e.g., radially oriented. The protrusion width may be approximately equal to the largest cross-sectional dimension, e.g., diameter, of each soybean disk seed opening 502. In some embodiments, the relationship between the protrusion width and the soybean disk seed opening 502 is between about 60-140%, between about 65-135%, between about 70-130%, between about 75-125%, between about 80-120%, between about 85-115%, between about 90-110%, between about 95-105%, or any other relationship that advantageously facilitates any of retention of soybeans on the soybean disk seed openings 502 and/or mixing or agitating of the soybeans within the seed meter 44. In some embodiments, the soybean disk protrusions 530 may have any, all, many, some, or none of the features, dimension, locations, and/or functions of the rice agitator pegs 430 described herein, in connection with the rice disk 400.

As further shown in FIG. 19A, the soybean disk 500 includes a plurality of soybean disk seed openings 502 arranged in an inner circumferential array and a plurality of soybean disk seed openings 502 arranged in an outer circumferential array. The soybean disk 500 shown in FIG. 19A includes 80 soybean disk seed openings 502, e.g., 40 openings in the inner array and 40 openings in the outer array. As with any of the other seed disks disclosed herein, the soybean disk 500 may include more or fewer soybean disk seed openings 502 arranged in one or more circumferential arrays. For example, the soybean disk 500 may have 1, 2, 3, 4, or more circumferential arrays of soybean disk seed openings 502, each of which may include a number of soybean disk seed openings 502 that is between about 10-70, between about 20-60, between about 25-55, between about 30-50, or between about 35-45.

Figure 20A:
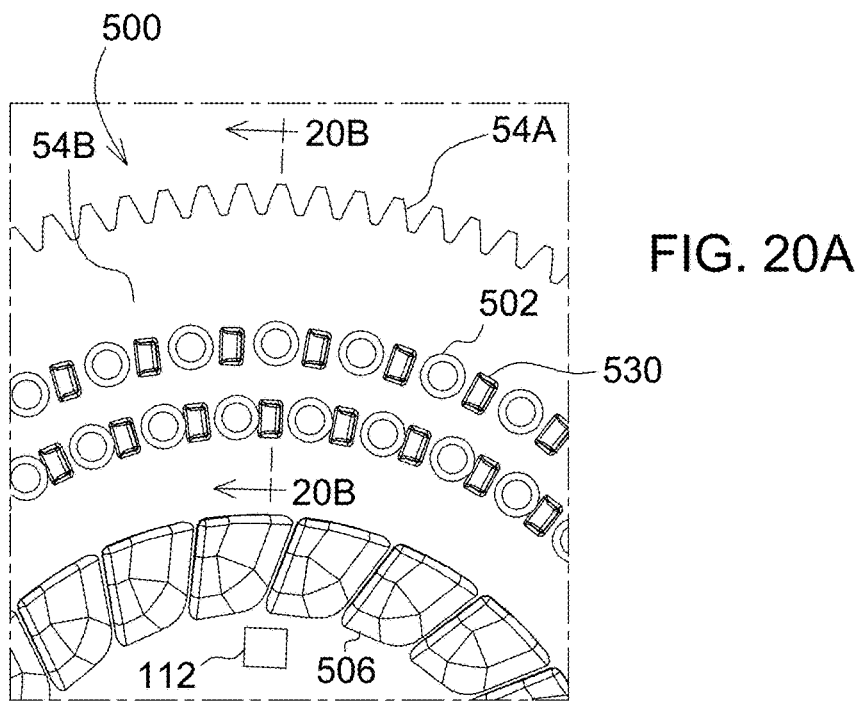
FIGS. 20A-20C show various enlarged and cross-sectional views of the soybean seed meter disk of FIGS. 19A-19C.
Figure 20B:
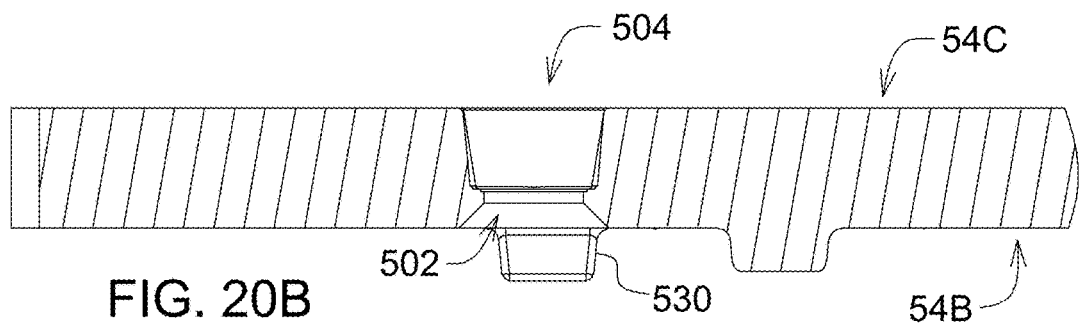
Figure 20C:
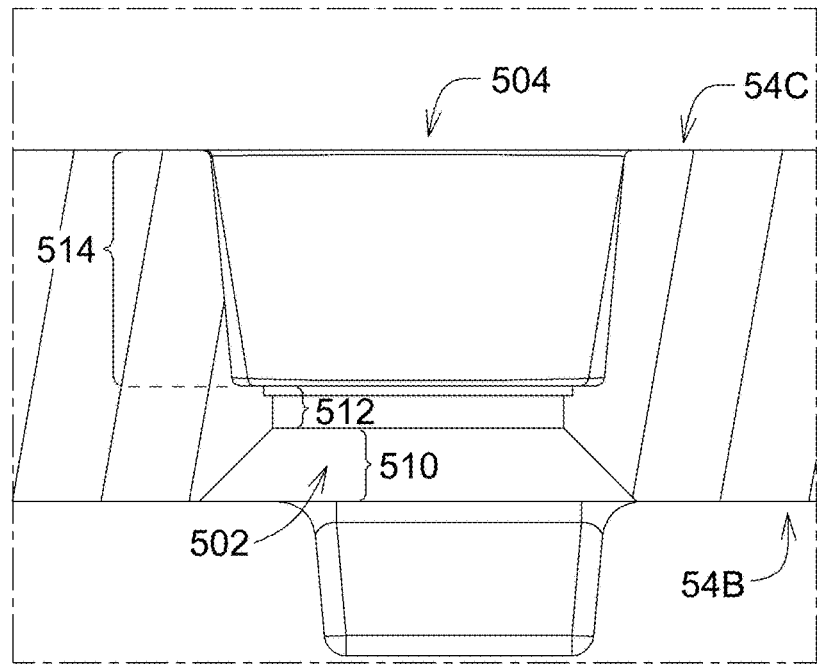

FIG. 20A shows an enlarged view of a portion of FIG. 19A, including at least a portion of the first and second circumferential arrays of soybean disk seed openings 502. FIG. 20B shows a cross-sectional view of the soybean disk seed openings 502 of FIG. 20A taken along line 20B 20B. FIG. 20C illustrates an enlarged view of the soybean disk seed openings 502 and soybean disk kick-out pockets 504 of FIG. 20B. Line 20B 120B passes radially, from the center of the soybean disk 500 through the center of the soybean disk seed opening 502 shown in FIGS. 20B and 20C. Therefore, the cross-section of FIG. 20C shows the minor axis cross-section of the soybean disk kick-out pockets 504.

With reference to FIG. 20C, each soybean disk seed opening 502 includes a soybean disk seed opening section 510, a soybean disk transition section 512, and a soybean disk kick-out section 514. Each of these sections may have any, all, many, some, or none of the features, dimension, locations, and/or functions of the various parts or portions of the other seed disk openings described herein.

The soybean disk seed opening section 510 may be relatively shallow with steeply angled or sloped walls. In some embodiments, the soybean disk seed opening section 510 extends into the disk less than about 30% of the disk thickness 55. In some embodiments, the soybean disk seed opening section 510 extends into the face of the disk by a percentage of the disk thickness 55 that is less than about 40%, less than about 35%, less than about 30%, less than about 25%, less than about 20%, less than about 15%, or less than about 10%. In some embodiments, the soybean disk seed opening section 510 is frustoconical, e.g., having the angled walls of a cone and a circular opening. Where the soybean disk seed opening section 510 meets the seed-side face 54B of the seed meter disk 54 and/or where the soybean disk seed opening section 510 meets the soybean disk transition section 512 may be circular. Generally, the soybean disk seed opening section 510 has an opening diameter that is larger than a soybean, such that the soybean may seat into the soybean disk seed opening section 510 due to a pressure differential applied across the seed disk.

The soybean disk transition section 512 connects the soybean disk seed opening section 510 to the soybean disk kick-out section 514. While other shapes are possible, the soybean disk transition section 512 may be cylindrical. The soybean disk transition section 512 may have a largest cross-sectional dimension, e.g., diameter, that is proportionally larger than other transition sections disclosed herein. Such larger relative dimension may advantageously permit the soybean disk to adhere larger and heavier soybeans (relative to the other types of seeds disclosed herein) using the same, similar, greater, or lesser pressure differentials. In some embodiments, the relationship between the diameter of the soybean disk transition section 512 and the diameter of the soybean disk seed opening section 510 is between about any of: 40-90%, 45-85%, 50-80%, 55-75%, 60-70%, greater than about 50%, greater than about 55%, greater than about 60%, greater than about 65%, greater than about 70%, greater than about 75%, greater than about 80%, greater than about 85%, or any other relationship that advantageously facilitates adherence and retention of soybeans to the disk.

Figure 21C:
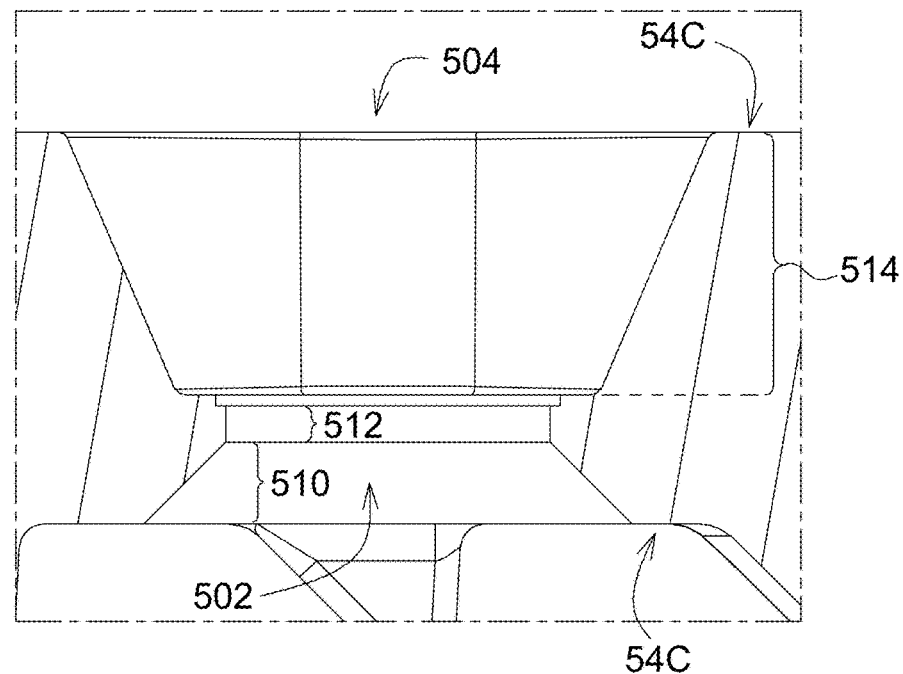

FIG. 21A shows an enlarged view of a portion of FIG. 19B, including at least a portion of the circumferential array of soybean disk kick-out pockets 504. FIG. 21B shows a cross-sectional view of the soybean disk kick-out pockets 504 of FIG. 21A taken along line 21B 21B. FIG. 21C illustrates an enlarged view of the soybean disk kick-out pockets 504 and associated soybean disk seed openings 502 of FIG. 21B. Line 21B 21B passes through the center of the soybean disk kick-out pocket 504 shown in FIGS. 21B and 21C perpendicular to a line extending radially, from the center of the soybean disk 500 through the center of the soybean disk kick-out pockets 504 shown in FIGS. 21B and 21C (i.e., it passes through the major axis of the soybean disk kick-out pockets 504).

With reference to FIG. 20C, in its minor axis the soybean disk kick-out section 514 has steeply, e.g., very steeply, sloped walls (e.g., less than about 90°, but greater than about 60°, greater than about 65°, greater than about 70°, greater than about 75°, greater than about 80°, or greater than about 85°). With reference to FIG. 21C, in its major axis, the soybean disk kick-out section 514 has steeply sloped walls, but less sloped than its walls in the minor axis (e.g., less than about 90°, but greater than about 45°, greater than about 50°, greater than about 55°, greater than about 60°, greater than about 65°, greater than about 70°, greater than about 75°, greater than about 80°, or greater than about 85°). With combined reference to FIGS. 21A, 20C, and 21C, it can be seen that the soybean disk kick-out section 514 has a generally frustopyramidal shape with flattened side walls and gently rounded corners. In some embodiments, any of the kick-out sections disclosed herein may have generally flat, e.g., flat, leading and/or trailing walls, where the leading wall is the wall that leads the kick-out section in the direction of rotation of the seed meter disk, and the trailing wall is the wall opposite the leading wall. In some embodiments, any of the kick-out sections disclosed herein may have generally flat, e.g., flat, side walls, where the side walls are the walls that are arranged generally perpendicularly to a radius of the seed meter disk. In some embodiments, a generally flat leading wall is connected to at least one generally flat side wall at a gently curved junction or radiused corner. In some embodiments, a generally flat leading wall is connected to at least one generally flat side wall at an angled junction, e.g., the flat leading wall merely meets the flat side wall. As shown in FIG. 21C, one or more additional shoulders or transition sections between the soybean disk kick-out section 514 and the soybean disk transition section 512 may be included.

Figure 22A:
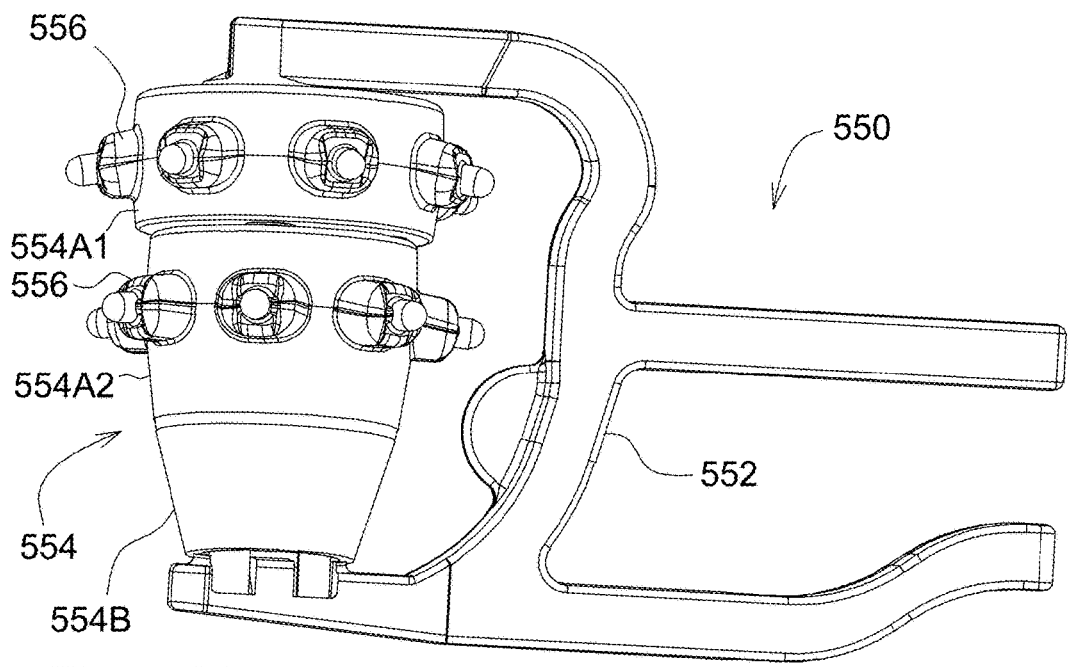
Figure 22B:
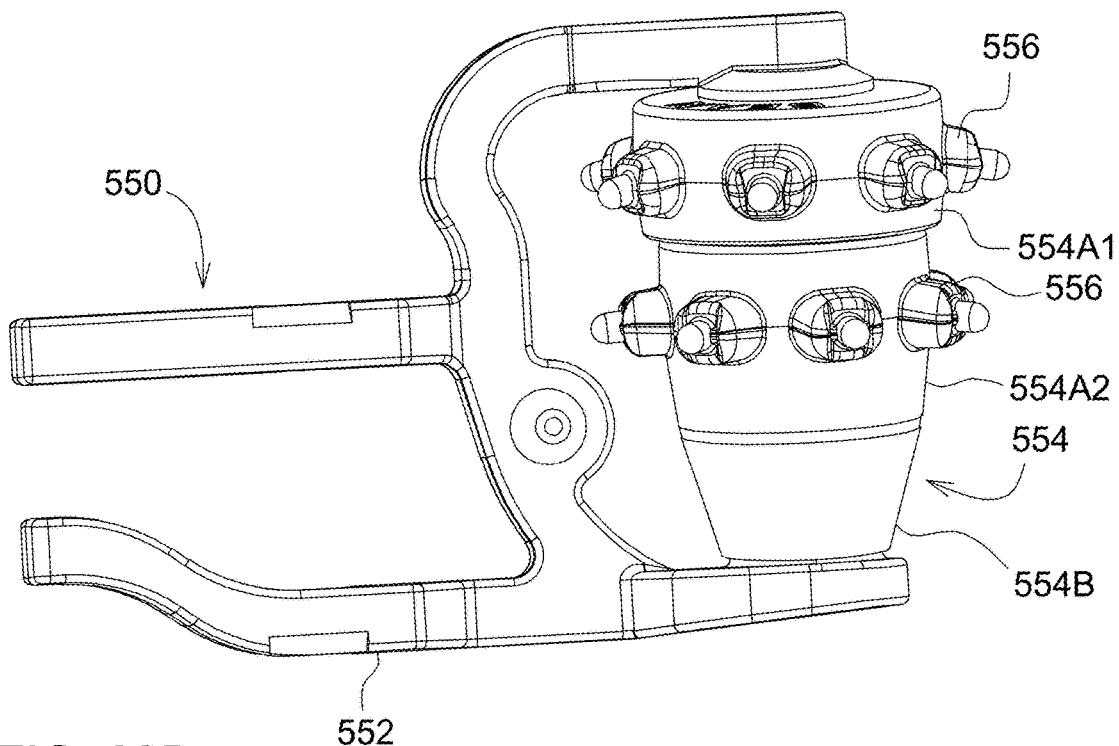

FIGS. 22A-22F illustrate a soybean disk kick-out wheel assembly 550. The soybean disk kick-out wheel assembly 550 may have any, all, many, some, or none of the features, dimension, locations, and/or functions of the various parts or portions of the other kick-out wheel assemblies described herein. The soybean disk kick-out wheel assembly 550 includes a soybean disk kick-out wheel 554 rotatably held by a soybean disk kick-out wheel arm 552. The soybean disk kick-out wheel 554 includes a first protrusion portion 554A1 having a plurality of soybean disk kick-out protrusions 556, a second protrusion portion 554A2 having a plurality of soybean disk kick-out protrusions 556, and a first body portion 554B. As disclosed elsewhere herein the soybean disk kick-out wheel 554 may have more or fewer protrusion portions, e.g., 1, 2, 3, 4, 5, 6, or more protrusion portions, and may have more or fewer body portions, e.g., 1, 2, 3, 4, or more body portions. Additionally, the various components of the soybean disk kick-out wheel 554 may be fused to each other so that they rotate together (e.g., at the same rate of rotation) or the various components of the soybean disk kick-out wheel 554 may be separate from each other so that they may rotate independently (e.g., the components may have individual rates of rotation which may be the same or may be different). As shown in FIG. 22A, the first protrusion portion 554A1 may have a diameter that is larger than the diameter of the second protrusion portion 554A2.

Figure 23:
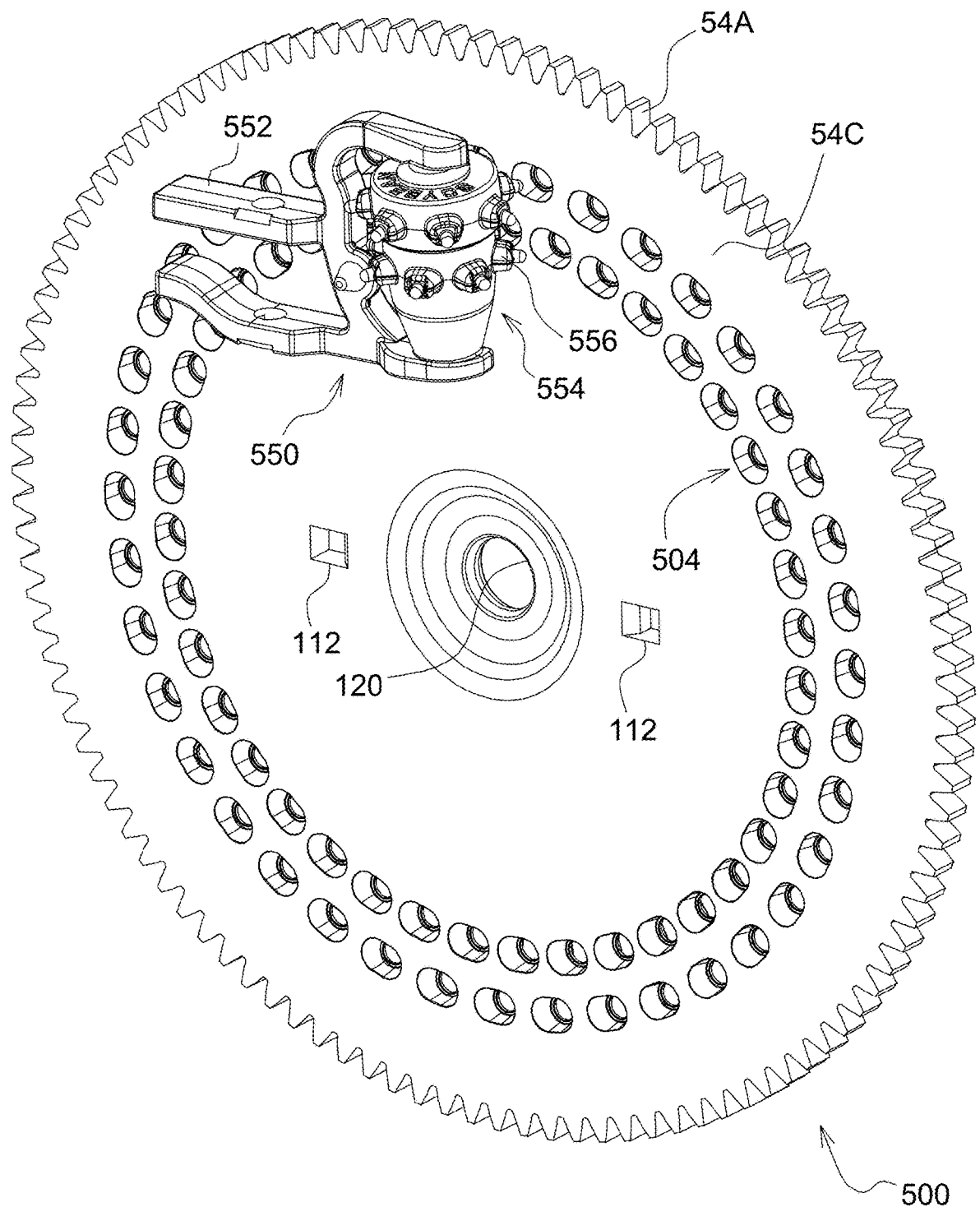
FIG. 23 shows the soybean kick-out wheel assembly of FIGS. 22A-22F in mating engagement with the soybean seed meter disk of FIGS. 19A-19C.

Turning to FIG. 22E, each soybean disk kick-out protrusion 556 of the soybean disk kick-out wheel 554 includes a soybean protrusion shoulder section 570, soybean protrusion transition section 572, and a soybean protrusion extension 574. As disclosed elsewhere herein, the soybean protrusion shoulder section 570 of the soybean disk kick-out protrusion 556 may be configured to mate with, e.g., generally fit within or congruently fit with, the soybean disk kick-out section 514 of the soybean disk kick-out pockets 504. In the same way, the soybean protrusion transition section 572 of the soybean disk kick-out protrusion 556 may be configured to mate with, e.g., generally fit within, or congruently fit within, the soybean disk transition section 512. Additionally, the soybean protrusion extension 574 of the soybean disk kick-out protrusion 556 may be configured to extend just into, into, or through the soybean disk seed opening section 510 of the soybean disk seed openings 502. FIG. 23 illustrates the soybean disk kick-out wheel assembly 550 engaged with a soybean disk 500, with all other components of the system removed, for clarity's sake. The soybean disk kick-out wheel arm 552, and thus the rest of the soybean disk kick-out wheel assembly 550 may be biased by a spring or other biasing member away from the rear-side portion 52B of the seed disk housing 52, such that the soybean disk kick-out wheel 554 is held in close contact or biased engagement with the vacuum-side face 54C of the soybean disk 500.

FIGS. 24A-24C illustrate a canola disk 600 configured to meter canola seeds. FIG. 24A shows the seed-side face 54B of the canola disk 600. FIG. 24B shows the vacuum-side face 54C of the canola disk 600. FIG. 24C shows the edge of the canola disk 600, including a plurality of teeth 54A. The canola disk 600 may include any, all, many, some, or none of the features, dimension, locations, and/or functions of the various parts or portions of the other seed disks disclosed herein, including, for example, the sorghum disk 300, rice disk 400, and soybean disk 500. As shown in FIG. 24A, the seed-side face 54B of the canola disk 600 includes, in a radially innermost to a radially outermost direction, a central mounting aperture 120, a plurality (e.g., two) of mating apertures 112, a plurality of canola disk agitator pockets 606, a first circular array of canola disk seed openings 602, a second circular array of canola disk seed openings 602, and a plurality of teeth 54A. As shown in FIG. 24B, the vacuum-side face 54C of the canola disk 600 includes, in a radially innermost to a radially outermost direction, a central mounting aperture 120, a plurality (e.g., two) of mating apertures 112, a first circumferential array of canola disk kick-out pockets 604, a second circumferential array of canola disk kick-out pockets 604, and a plurality of teeth 54A.

FIG. 24A shows a single circumferential array of canola disk agitator pockets 60. In some embodiments, the canola disk 600 includes more than one circumferential array of canola disk agitator pockets 606. The canola disk 600 shown in FIG. 24A has 37 canola disk agitator pockets 606. As disclosed in connection with other disks, the canola disk 600 may have more or fewer canola disk agitator pockets 606. Each canola disk agitator pocket 606 may have any, all, many, some, or none of the features, dimension, locations, and/or functions of the other various agitator pockets described herein.

The first circumferential array of canola disk seed openings 602 shown in FIG. 24A includes 55 canola disk seed openings 602. In much the same way, and despite having a larger diameter, the second circumferential array of canola disk seed openings 602 includes 55 canola disk seed openings 602. In total, the canola disk 600 shown in FIG. 24A includes 110 canola disk seed openings 602. As with any of the other seed disks disclosed herein, the canola disk 600 may include more or fewer canola disk seed openings 602 arranged in one or more circumferential arrays. For example, the canola disk 600 may have 1, 2, 3, 4, or more circumferential arrays of canola disk seed openings 602, each of which may have a number of canola disk seed openings 602 that is between about 25-85, between about 30-80, between about 35-75, between about 40-70, between about 45-65, or between about 50-60.

Figure 25A:
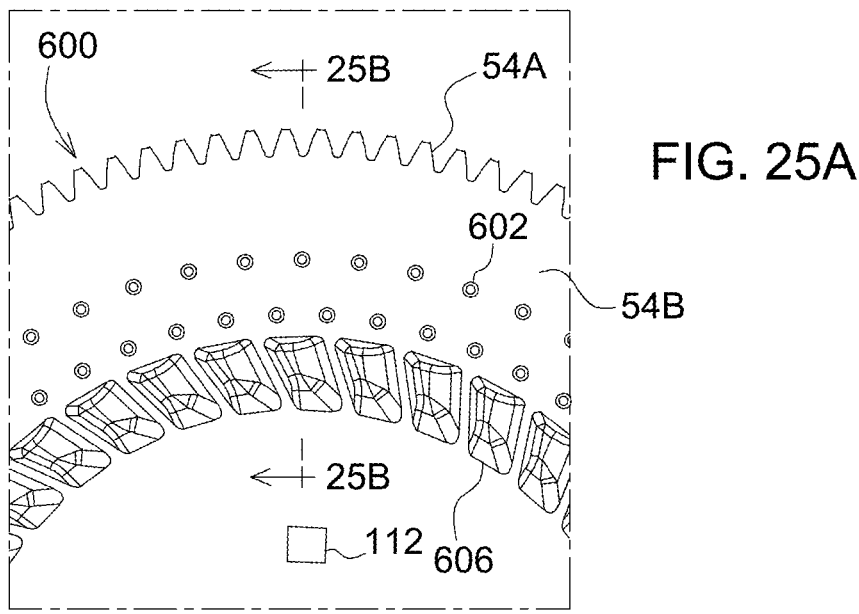
FIGS. 25A-25C show various enlarged and cross-sectional views of the canola seed meter disk of FIGS. 24A-24C.
Figure 25B:
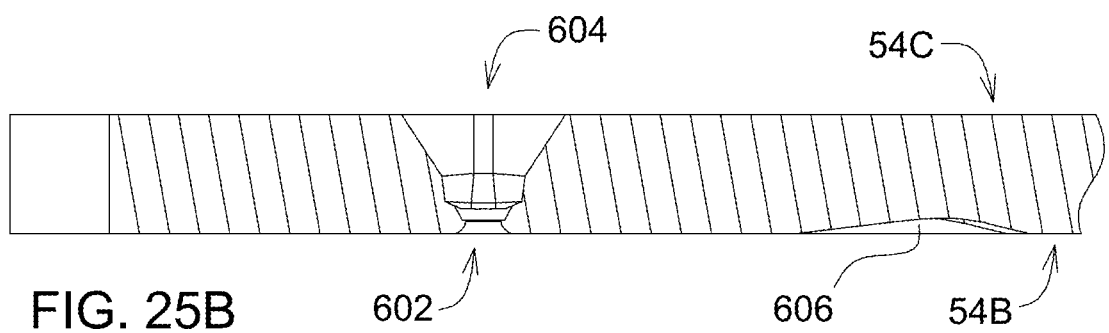
Figure 25C:
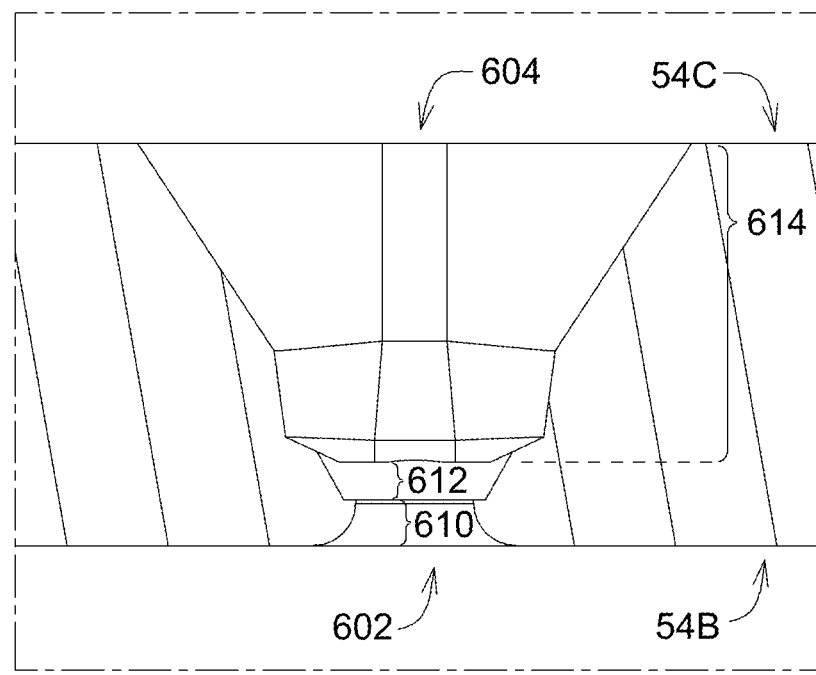

FIG. 25A shows an enlarged view of a portion of FIG. 24A, including at least a portion of the first and second circumferential array of canola disk seed openings 602. FIG. 25B shows a cross-sectional view of the canola disk seed openings 602 of FIG. 25A taken along line 25B 125B. FIG. 25C illustrates an enlarged view of the canola disk seed openings 602 and canola disk kick-out pockets 604 of FIG. 25B. Line 25B 125B passes radially, from the center of the canola disk 600 through the center of the canola disk seed openings 602 shown in FIGS. 25B and 25C. Therefore, the cross-section of FIG. 25C shows the minor axis cross-section of the canola disk kick-out pockets 604 (and the minor axis cross-section of the canola disk seed openings 602, though, because, as described herein, the canola disk seed openings 602 is generally circular, the minor axis and major axis cross-sections of the canola disk seed openings 602 appear generally the same, e.g., identical).

With reference to FIG. 25C, each canola disk seed opening 602 and canola disk kick-out pocket 604 pair includes a canola disk seed opening section 610, canola disk transition section 612, and canola disk kick-out section 614. Each of these sections may have any, all, many, some, or none of the features, dimension, locations, and/or functions of the various parts or portions of the other seed disk openings described herein, and in particular the sorghum disk seed opening section 310, sorghum disk transition section 312, and sorghum disk kick-out section 314, of the sorghum disk 300.

The canola disk seed opening section 610 is generally trumpet shaped, e.g., having circular cross-sections of decreasing diameter extending into the face of the disk. In some embodiments, the relationship of the smallest cross-sectional diameter of the canola disk seed opening section 610 (e.g., where the canola disk seed opening section 610 meets the canola disk transition section 612) to the largest cross-sectional diameter of the canola disk transition section 612 (e.g., where the canola disk seed opening section 610 meets the face of the disk) is greater than about 60%, 65%, 70%, 75%, 80%, 85%, 90%, or 95%, or any other relationship of dimensions that advantageously facilitates adherence and retention of canola seeds to the 600. The canola disk seed opening section 610 may extend into the face of the disk by only a distance, e.g., a short distance. In some embodiments, the canola disk seed opening section 610 extends into the face of the disk by less than about 20% of the thickness of the disk. In some embodiments, the canola disk seed opening section 610 extends into the face of the disk by less than about 30%, less than about 28%, less than about 26%, less than about 24%, less than about 22%, less than about 20%, less than about 18%, less than about 16%, less than about 14%, less than about 12%, less than about 10%, less than about 8%, or less than about 6% of the thickness of the disk. As disclosed herein, the outer circumferential edge of the canola disk seed opening section 610 (the transitional edge between the face of the seed-side face 54B and the canola disk seed opening section 610) may have a rounded aspect.

The canola disk transition section 612 may be frustoconical, e.g., a portion of a cone, or circular, e.g., generally circular or generally cylindrical, and extends between the canola disk seed opening section 610 and the canola disk kick-out section 614, placing the two in fluid communication, so that a pressure differential, e.g., a vacuum, may be applied across the disk. The canola disk transition section 612 has a smallest cross-sectional dimension, e.g., diameter, that is just larger than (e.g., less than about 10%, less than about 9%, less than about 8%, less than about 7%, less than about 6%, less than about 5%, less than about 4%, less than about or 3%) or approximately equal to the smallest cross-sectional dimension, e.g., diameter, of the canola disk seed opening section 610. The canola disk transition section 612 extends through the thickness of the disk by less than about 12%, less than about 11%, less than about 10%, less than about 9%, less than about 8%, less than about 7%, less than about 6%, less than about 5%, less than about 4%, less than about or less than about 3%.

In its minor axis, the canola disk kick-out section 614 has at least one or more generally frustopyramidal or frustoconical sections (the walls of which may be generally flat, or may be gently curved, rendering the walls more bell-shaped). As shown in FIG. 25C, the canola disk kick-out section 614 includes three separate frustopyramidal or frustoconical sections, though other number of frustopyramidal or frustoconical sections may be included. In some embodiments, the first frustopyramidal or frustoconical section of the canola disk kick-out section 614, e.g., the section closest to the canola disk transition section 612, has a slope of about 35°. In some embodiments, the first frustopyramidal or frustoconical section has a slope of less than about 45°, less than about 40°, less than about 35°, less than about 30°, less than about 25°, less than about 20°, less than about 15°, or less than about 10°. In some embodiments, the third frustopyramidal or frustoconical section of the canola disk kick-out section 614, e.g., the section closest to the vacuum-side face 54C of the seed meter disk 54, has a slope of about 80°. In some embodiments, the third frustopyramidal or frustoconical section has a slope of less than 90°, but greater than about 45°, greater than about 50°, greater than about 55°, greater than about 60°, greater than about 65°, greater than about 70°, greater than about 75°, greater than about 80°, or greater than about 85°. In some embodiments, the second frustopyramidal or frustoconical section of the canola disk kick-out section 614, e.g., the section between the first frustopyramidal or frustoconical section of the canola disk kick-out section 614 and the third frustopyramidal or frustoconical section of the canola disk kick-out section 614, as a slope of about 85°. In some embodiments, the second frustopyramidal or frustoconical section has a slope of greater than about 70°, greater than about 75°, greater than about 80°, greater than about 82°, greater than about 84°, greater than about 86°, or greater than about 88°.

Figure 26A:
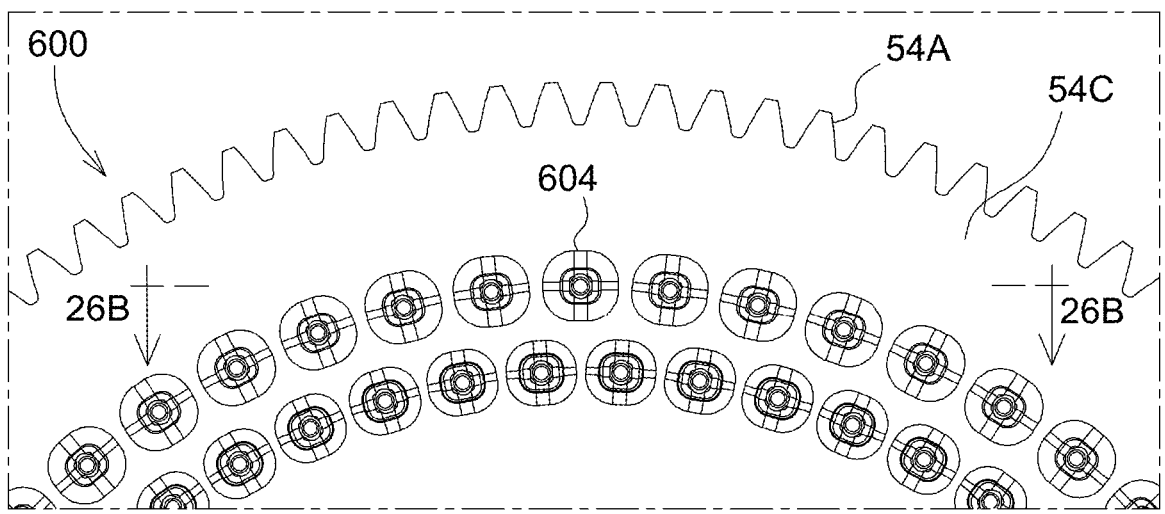
FIGS. 26A-26C show various enlarged and cross-sectional views of the canola seed meter disk of FIGS. 24A-24C.
Figure 26B:
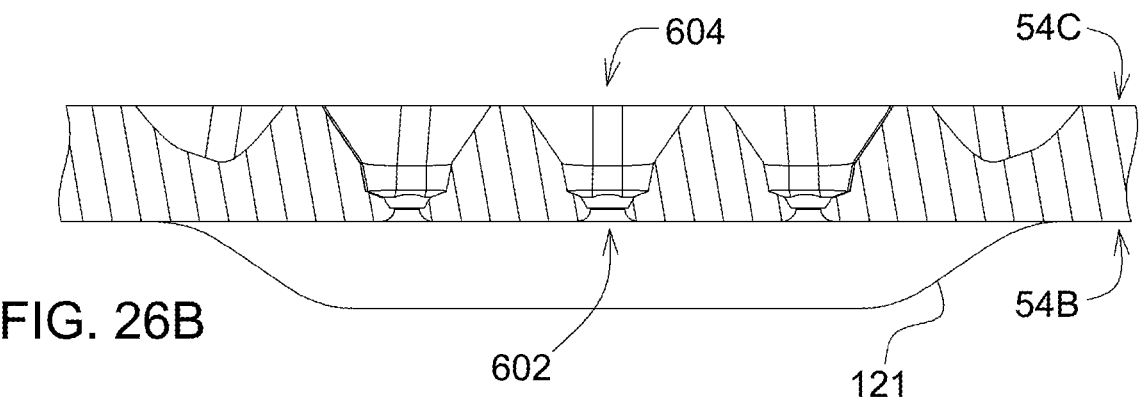
Figure 26C:
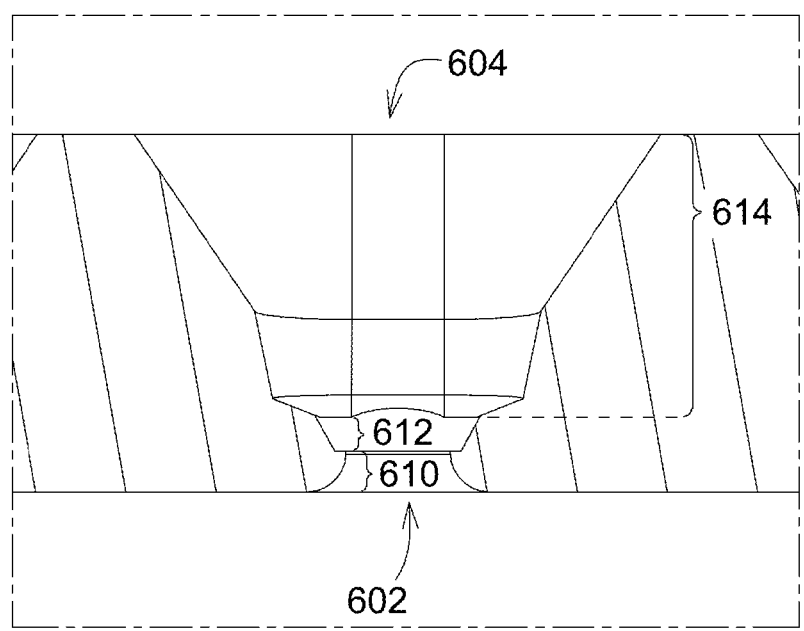

FIG. 26A shows an enlarged view of a portion of FIG. 24B, including at least a portion of the circumferential array of canola disk kick-out pockets 604. FIG. 26B shows a cross-sectional view of the canola disk kick-out pockets 604 of FIG. 26A taken along line 26B 126B. FIG. 26C illustrates an enlarged view of the canola disk kick-out pockets 604 and associated canola disk seed openings 602 of FIG. 26B. Line 26B 126B passes through the center of the canola disk kick-out pocket 604 shown in FIGS. 26B and 26C perpendicular to a line extending radially, from the center of the canola disk 600 through the center of the canola disk kick-out pockets 604 shown in FIGS. 26B and 26C (i.e., it passes through the major axis of the canola disk kick-out pockets 604).

The canola disk seed opening section 610 and the canola disk transition section 612 may both have generally circular cross-sections (e.g., the canola disk seed opening section 610 being trumpet-shaped and the canola disk transition section 612 being frustoconical). Therefore, the canola disk seed opening section 610 and the canola disk transition section 612 may each be bilaterally symmetrical along both the major axis and the minor axis. Furthermore, the major axis profile and the minor axis profile for each of the canola disk seed opening section 610 and the canola disk transition section 612 may be similar or the same. Considering FIG. 26A, then comparing FIG. 26C to FIG. 25C, it may be seen that the canola disk kick-out section 614 may be slightly longer along is major axis than along its minor axis, e.g., the canola disk kick-out section 614 may be a slightly, e.g., very slightly, elongated rounded rectangular shape. Thus, the dimensions of the canola disk kick-out section 614 in the major axis are similar to the dimensions of the canola disk kick-out section 614 in the minor axis. In some embodiments, one or more dimensions of the canola disk kick-out section 614 along the major axis are larger than the dimensions of the canola disk kick-out section 614 along the minor axis by less than about 26%, less than about 24%, less than about 22%, less than about 20%, less than about 18%, less than about 16%, less than about 14%, less than about 12%, less than about 10%, less than about 8%, less than about 6%, or less than about 4%. In some embodiments, one or more dimensions of the canola disk kick-out pockets 604 along the major axis are the same as the dimensions of the canola disk kick-out pockets 604 along the minor axis.

Figure 27A:
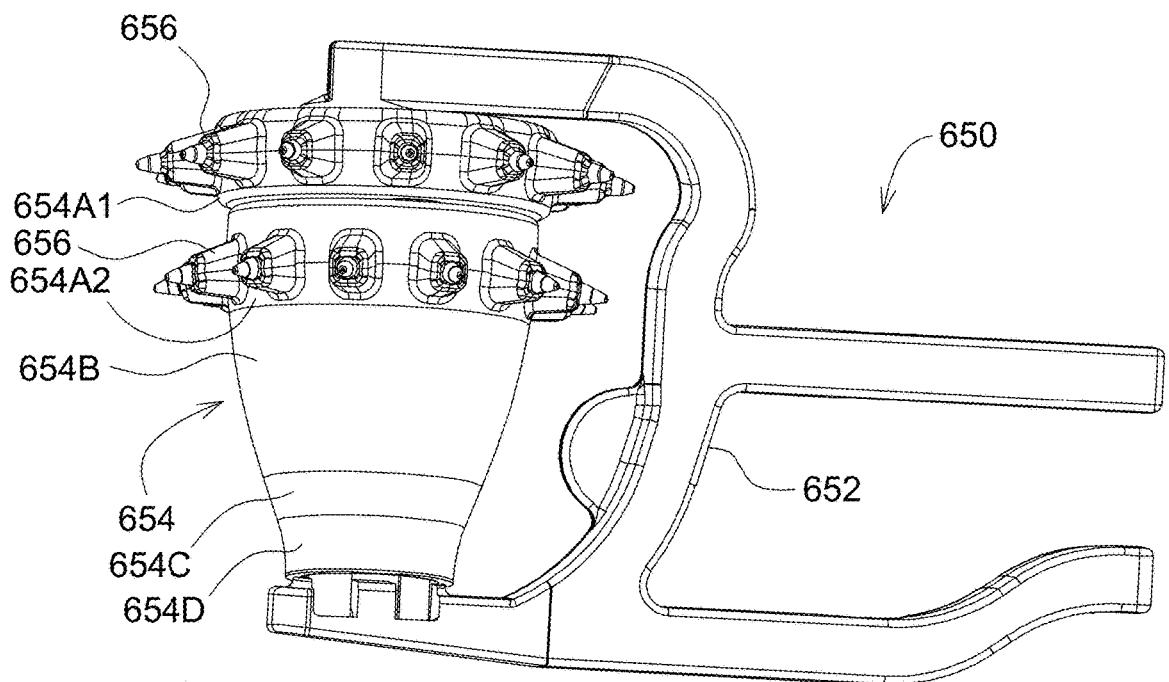
Figure 27B:
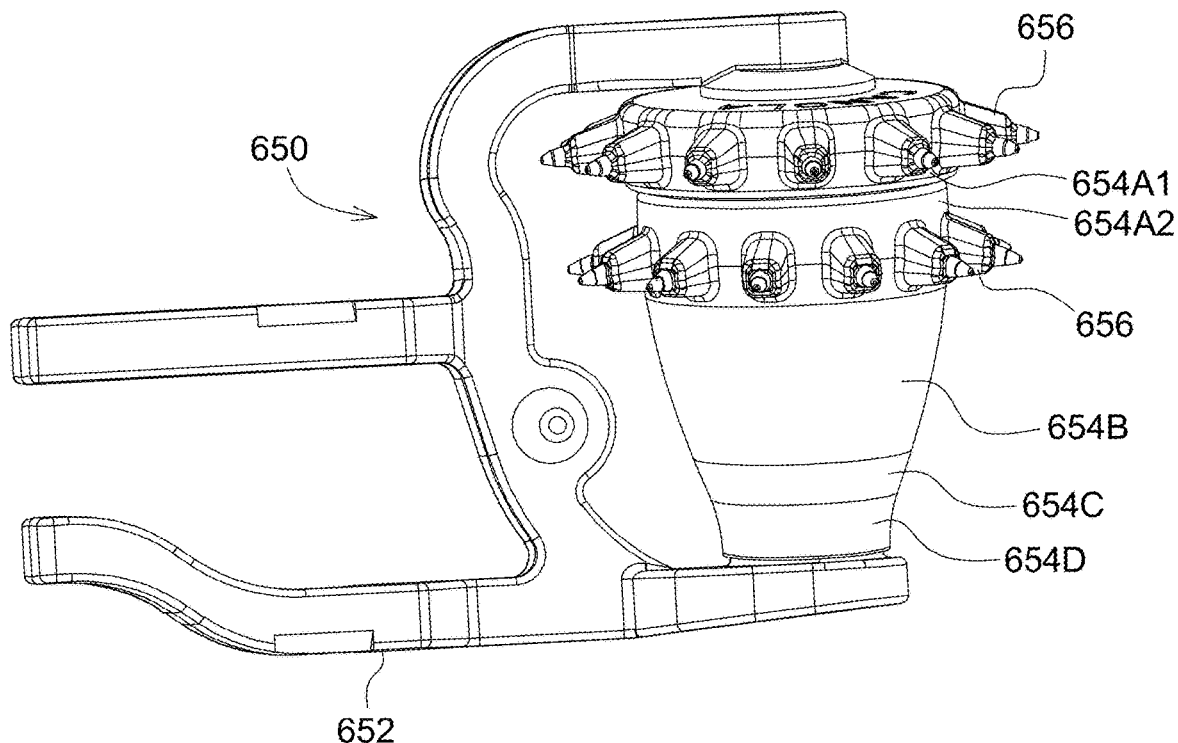

FIGS. 27A-27F illustrate a canola disk kick-out wheel assembly 650. The canola disk kick-out wheel assembly 650 may have any, all, many, some, or none of the features, dimension, locations, and/or functions of the various parts or portions of the other kick-out wheel assemblies described herein. The canola disk kick-out wheel assembly 650 includes a canola disk kick-out wheel 654 rotatably held by a canola disk kick-out wheel arm 652. The canola disk kick-out wheel 654 includes a first protrusion portion 654A1 having a plurality of canola disk kick-out protrusions 656, a second protrusion portion 654A2 having a plurality of canola disk kick-out protrusions 656, a first body portion 654B, a second body portion 654C, and a third body portion 654D. As disclosed elsewhere herein the canola disk kick-out wheel 654 may have more or fewer protrusion portions and may have more or fewer body portions. Additionally, the various components of the canola disk kick-out wheel 654 may be fused to each other so that they rotate together (e.g., at the same rate of rotation) or the various components of the canola disk kick-out wheel 654 may be separate from each other so that they may rotate independently (e.g., the components may have individual rates of rotation which may be the same or may be different). As shown in FIG. 27A, the first protrusion portion 654A1 may have a diameter that is larger than the diameter of the second protrusion portion 654A2.

Figure 28:
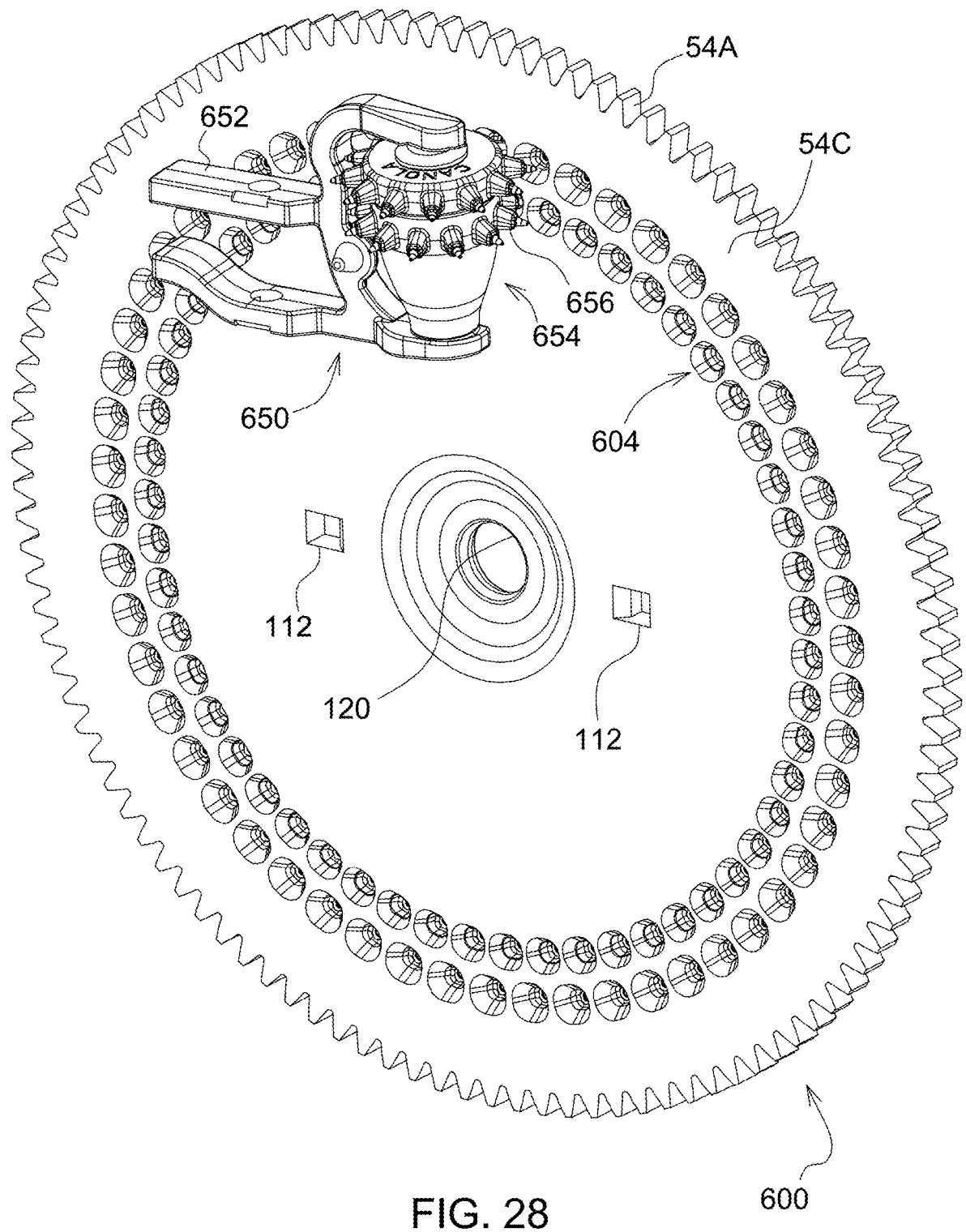
FIG. 28 shows the canola kick-out wheel assembly of FIGS. 27A-27F in mating engagement with the canola seed meter disk of FIGS. 24A-24C.

Turning to FIG. 27E, each canola disk kick-out protrusion 656 of the canola disk kick-out wheel 654 includes a canola protrusion shoulder section 670, canola protrusion transition section 672, and a canola protrusion extension 674. As disclosed elsewhere herein, the canola protrusion shoulder section 670 of the canola disk kick-out protrusion 656 may be configured to mate with, e.g., generally fit within or congruently fit with, the canola disk kick-out section 614 of the canola disk kick-out pockets 604. In the same way, the canola protrusion transition section 672 of the canola disk kick-out protrusion 656 may be configured to mate with, e.g., generally fit within, or congruently fit within, the canola disk transition section 612. Additionally, the canola protrusion extension 674 of the canola disk kick-out protrusion 656 may be configured to extend just into, into, or through the canola disk seed opening section 610 of the canola disk seed openings 602. FIG. 28 illustrates the canola disk kick-out wheel assembly 650 engaged with a canola disk 600, with all other components of the system removed, for clarity's sake. The canola disk kick-out wheel arm 652, and thus the rest of the canola disk kick-out wheel assembly 650 may be biased by a spring or other biasing member away from the rear-side portion 52B of the seed disk housing 52, such that the canola disk kick-out wheel 654 is held in close contact or biased engagement with the vacuum-side face 54C of the canola disk 600.

FIGS. 29A-2C illustrate a wheat disk 700 configured to meter wheat seeds. FIG. 29A shows the seed-side face 54B of the wheat disk 700. FIG. 29B shows the vacuum-side face 54C of the wheat disk 700. FIG. 29C shows the edge of the wheat disk 700, including a plurality of teeth 54A. The wheat disk 700 may include any, all, many, some, or none of the features, dimension, locations, and/or functions of the various parts or portions of the other seed disks disclosed herein, including, for example, the sorghum disk 300, rice disk 400, soybean disk 500, and canola disk 600. As shown in FIG. 29A, the seed-side face 54B of the wheat disk 700 includes, in a radially innermost to a radially outermost direction, a central mounting aperture 120, a plurality (e.g., two) of mating apertures 112, a first circumferential array of wheat disk seed openings 702, a second circumferential array of wheat disk seed openings 702, a third circumferential array of wheat disk seed openings 702, a fourth circumferential array of wheat disk seed openings 702, and a plurality of teeth 54A. As shown in FIG. 29B, the vacuum-side face 54C of the wheat disk 700 includes, in a radially innermost to a radially outermost direction, a central mounting aperture 120, a plurality (e.g., two) of mating apertures 112, a first circumferential array of wheat disk kick-out pockets 704, a second circumferential array of wheat disk kick-out pockets 704, a third circumferential array of wheat disk kick-out pockets 704, a fourth circumferential array of wheat disk kick-out pockets 704, and a plurality of teeth 54A.

The first circumferential array of wheat disk seed openings 702 shown in FIG. 29A includes 40 wheat disk seed openings 702. The second circumferential array of wheat disk seed openings 702 includes 45 wheat disk seed openings 702. The third circumferential array of wheat disk seed openings 702 includes 50 wheat disk seed openings 702. The fourth circumferential array of wheat disk seed openings 702 includes 55 wheat disk seed openings 702. In total, the wheat disk 700 shown in FIG. 29A includes 190 wheat disk seed openings 702. As with any of the other seed disks disclosed herein, the wheat disk 700 may include more or fewer wheat disk seed openings 702 arranged in one or more circumferential arrays. For example, the wheat disk 700 may have 1, 2, 3, 4, 5, or 6, or more circumferential arrays of wheat disk seed openings 702, each of which may have a number of wheat disk seed openings 702 that is between about 20-80, between about 25-75, between about 30-70, between about 35-65, between about 40-60, or between about 45-55.

Figure 30A:
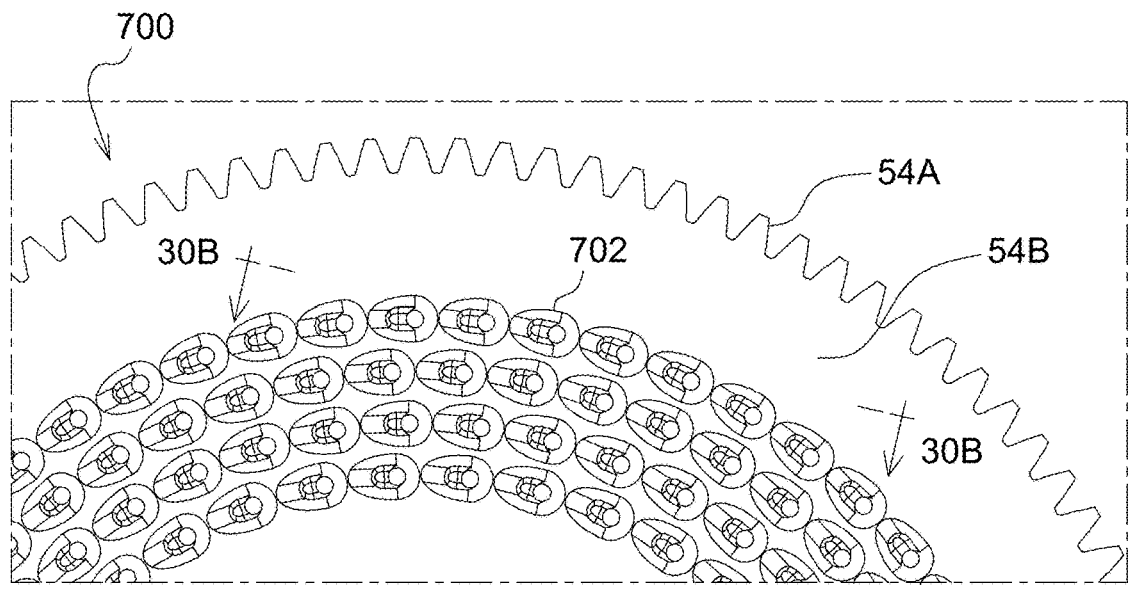
FIGS. 30A-30C show various enlarged and cross-sectional views of the wheat seed meter disk of FIGS. 29A-29C.
Figure 30B:
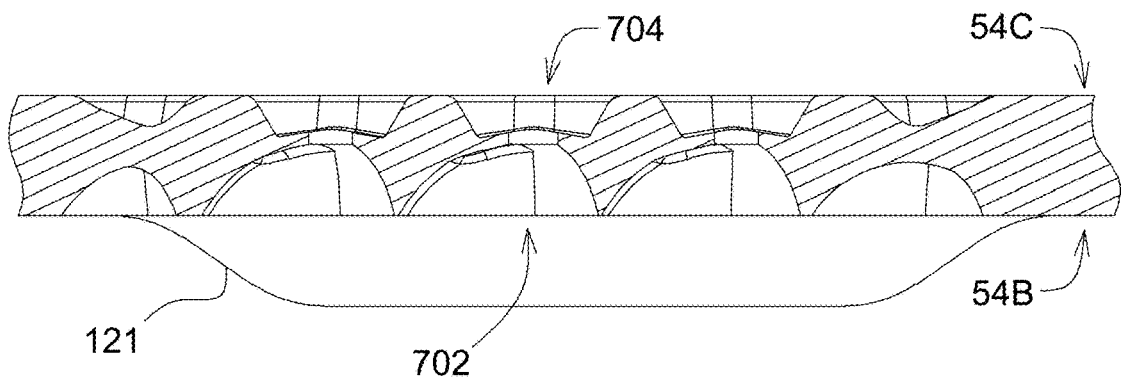
Figure 30C:
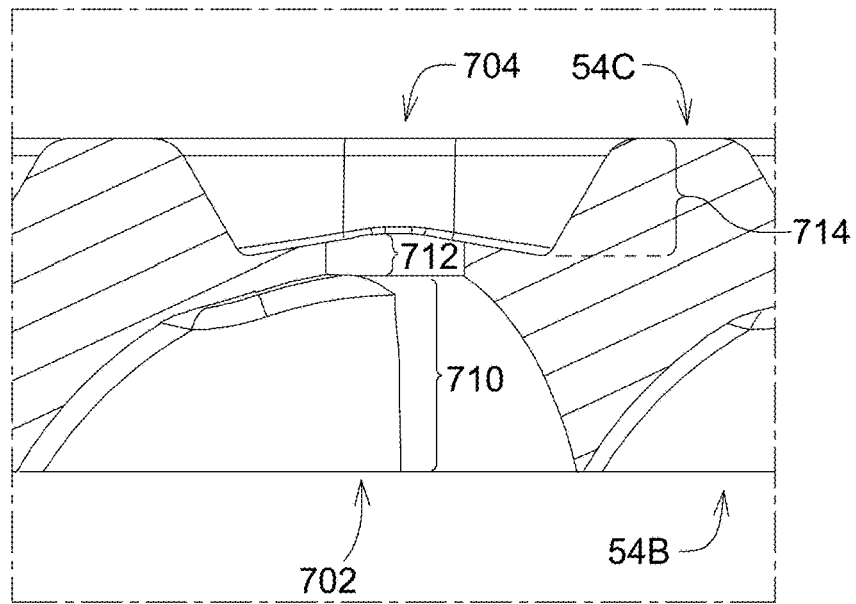

FIG. 30A shows an enlarged view of a portion of FIG. 29A, including at least a portion of the first, second, third, and fourth circumferential arrays of wheat disk seed openings 702. FIG. 30B shows a cross-sectional view of the wheat disk seed openings 702 of FIG. 30A taken along line 30B 130B. FIG. 30C illustrates an enlarged view of the wheat disk seed openings 702 and wheat disk kick-out pockets 704 of FIG. 30B. Line 30B 130B passes through the center of the wheat disk seed opening 702 shown in FIGS. 30B and 30C and perpendicular to a line extending radially, from the center of the wheat disk 700 through the center of the wheat disk seed opening 702 shown in FIG. 30C. Therefore, the cross-section of FIG. 30C shows the major axis cross-section of the wheat disk seed opening 702 (and, as shown in more detail herein, of the wheat disk kick-out pockets 704).

With reference to FIG. 30C, each wheat disk seed opening 702 and wheat disk kick-out pocket 704 pair includes a wheat disk seed opening section 710, wheat disk transition section 712, and wheat disk kick-out section 714. Each of these sections may have any, all, many, some, or none of the features, dimension, locations, and/or functions of the various parts or portions of the other seed disk openings described herein.

Turning to FIG. 30A, each wheat disk seed openings 702 may have a generally ovoid, or egg-shaped, profile. Such an egg-shape may have a pointed end, a rounded end, and a larges cross-sectional dimension. In some embodiments, the rounded end of an egg-shaped wheat disk seed opening 702 may lead the rest of the wheat disk seed opening 702, including the pointed end of the egg-shaped wheat disk seed opening 702, in the direction of rotation of the seed meter disk 54 when in use, e.g., when metering seed. In some embodiments, the pointed end of an egg-shaped wheat disk seed opening 702 may lead the rest of the wheat disk seed opening 702, including the rounded end of the egg-shaped wheat disk seed opening 702, in the direction of rotation of the seed meter disk 54 when in use. In some embodiments, egg-shaped wheat disk seed openings 702 are arranged in each circumferential array such that the pointed end of each wheat disk seed opening 702 is proximate, e.g., close to or touching, the rounded end of an adjacent wheat disk seed opening 702.

With reference to FIG. 30C, the wheat disk transition section 712 joins the wheat disk seed opening section 710 and the wheat disk kick-out section 714. In some embodiments, the wheat disk transition section 712 joins to or opens into the wheat disk seed opening section 710 close to or at the largest cross-sectional dimension of the egg-shaped (e.g., half an egg) wheat disk seed opening 702, e.g., the deepest portion of the seed cell. As can be seen, the rounded portion of each egg-shaped cell enters the face of the disk rapidly, e.g., at a steep angle (e.g., beginning close to or nearly perpendicular to the face of the seed disk). The angle of entrance of the wall of the wheat disk seed opening 702 reduces rapidly until it becomes essentially zero, e.g., zero, at or near the point where the wheat disk transition section 712 connects the wheat disk seed opening section 710 to the wheat disk kick-out section 714. Then, in a gentler fashion, e.g., with a gentler slope, the wall of the wheat disk seed opening 702 returns to the face of the seed disk where it forms the pointed end of the egg-shaped wheat disk seed opening 702. In some embodiments, the wheat disk transition section 712 connects to the wheat disk seed opening section 710 at or near the deepest point of the wheat disk seed opening section 710. In some embodiments, the wheat disk transition section 712 connects to the wheat disk seed opening section 710 at or near the midpoint of the wheat disk seed opening section 710, e.g., equidistant between the rounded portion of the egg-shaped wheat disk seed opening 702 and the pointed portion of the egg-shaped wheat disk seed opening 702.

In some embodiments, the deepest portion of the egg-shaped wheat disk seed opening 702 extends into the face of the seed meter disk 54 by about 60% of the disk thickness 55. In some embodiments, the relationship between the deepest portion of the egg-shaped wheat disk seed opening 702 and the disk thickness 55 is less than about 75%, less than about 70%, less than about 65%, less than about 60%, less than about 55%, less than about 50%, less than about 45%, less than about 40%, or less than about 35%. In some embodiments, the relationship between the deepest portion of the egg-shaped wheat disk seed opening 702 and the disk thickness 55 is greater than about 30%, greater than about 35%, greater than about 40%, greater than about 45%, greater than about 50%, greater than about 55%, greater than about 60%, greater than about 65%, greater than about 70%, or greater than about 75%, or another other depth relationship that facilitates adherence and retention of a wheat seed to the seed disk.

The egg-shaped wheat disk seed opening 702 may have a width (e.g., largest cross-sectional dimension perpendicular to the major axis of the cell and in the plane of the seed disk face) to length (e.g., distance from rounded end to pointed end in the plane of the seed disk face) relationship of about 60%. In some embodiments, the relationship between the width of the egg-shaped wheat disk seed opening 702 to the length of the egg-shaped wheat disk seed opening 702 is greater than about 45%, greater than about 50%, greater than about 55%, greater than about 60%, greater than about 65%, greater than about 70%, greater than about 75%, greater than about 80%, greater than about 85%, or greater than about 90%.

The wheat disk transition section 712 connects the wheat disk seed opening section 710 to the wheat disk kick-out section 714. While other shapes are possible, the wheat disk transition section 712 may be cylindrical (e.g., having a right cross-section of a circle). The wheat disk transition section 712 may be about 15% of the disk thickness 55. In some embodiments, the wheat disk transition section 712, or any of the other transition sections disclosed herein, is less than about 30%, less than about 25% of the disk thickness, less than about 20%, less than about 15%, or less than about 10%, or any other thickness that promotes adherence and/or retention of a seed to or within a seed opening.

Along its major axis, as shown in FIG. 30C, the wheat disk kick-out section 714 has steeply angled side walls (e.g., appearing frustopyramidal, e.g., nearly frustopyramidal). The side walls of the wheat disk kick-out section 714 along the major axis may be angled by about 80°. In some embodiments, the side walls of the wheat disk kick-out section 714 along the major axis are angled by greater than about 50°, greater than about 55°, greater than about 60°, greater than about 65°, greater than about 70°, greater than about 75°, greater than about 80°, or greater than about 85°. The outer corners of the wheat disk kick-out section 714, e.g., where the wheat disk kick-out section 714 meets the face of the seed disk, may be rounded or radiused. In some embodiments, the side walls (the walls generally perpendicular to a radius of the seed disk) of the wheat disk kick-out section 714 are generally flattened, e.g., flat. In some embodiments, the leading and trailing walls (the walls connecting the side walls) are generally flattened, e.g. flat. In some embodiments, the leading and trailing walls are generally curved, connecting a first, generally flat, side wall to the second, generally flat, side wall.

The wheat disk kick-out section 714, e.g., the deepest point(s) of the wheat disk kick-out section 714, may extend into the vacuum-side face 54C by a percentage of the disk thickness 55 that is less than about 50%, less than about 45%, less than about 40%, less than about 35%, less than about 30%, less than about 25%, less than about 20%, or less than about 15%. The inner surface of the wheat disk kick-out section 714, e.g., the surface of the wheat disk kick-out section 714 closest to the egg-shaped wheat disk seed opening section 710, may be angled, dipped, or bowed, e.g., gently bowed, with a high point in the center (along the major axis of the wheat disk kick-out section 714). As can be seen comparing FIG. 30C to FIG. 31C, the bowed portion of the inner surface of the wheat disk kick-out section 714 may exist along only the major axis of the wheat disk kick-out section 714. Stated in another way, the inner surface of the wheat disk kick-out section 714 in each plane perpendicular to the major axis of the wheat disk kick-out section 714 may be flat or linear. In some embodiments, the bowed or angled portion of the wheat disk kick-out section 714, along the major axis, extends back into the wheat disk kick-out section 714 by a percentage of the depth of the wheat disk kick-out section 714 that is about 20%, about 18%, about 16%, about 14%, about 12%, about 10%, about 8%, about 6%, or about 4%. In some embodiments, the inner surface of the wheat disk kick-out section 714 is generally flat.

Figure 31A:
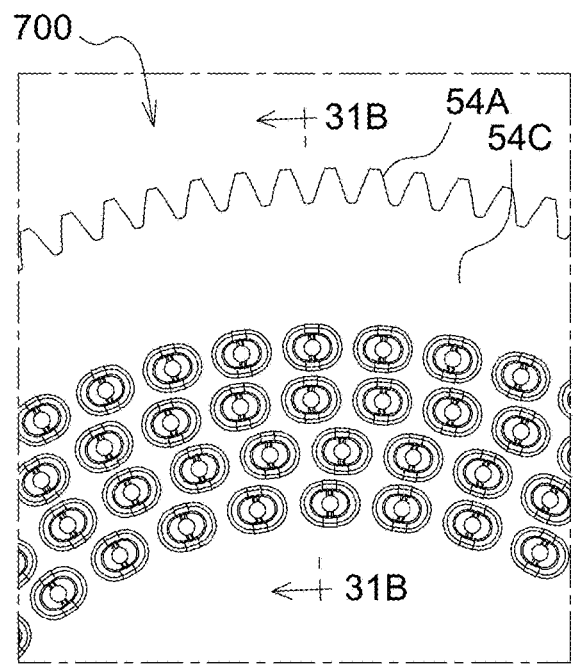
FIGS. 31A-31C show various enlarged and cross-sectional views of the wheat seed meter disk of FIGS. 29A-29C.
Figure 31B:
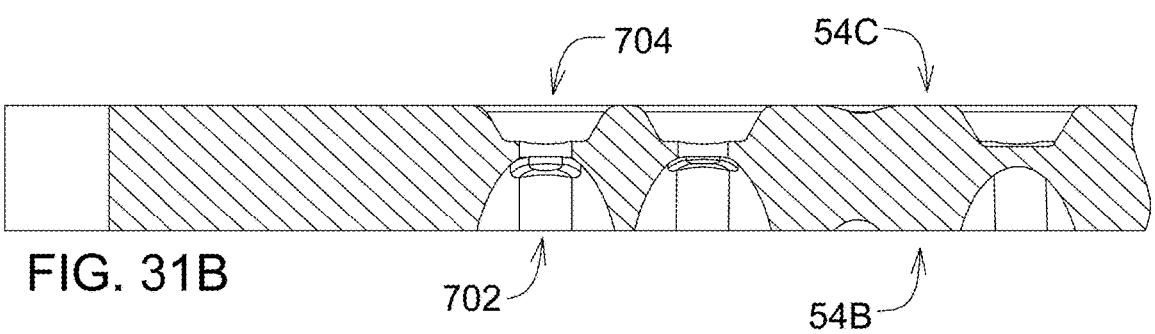
Figure 31C:
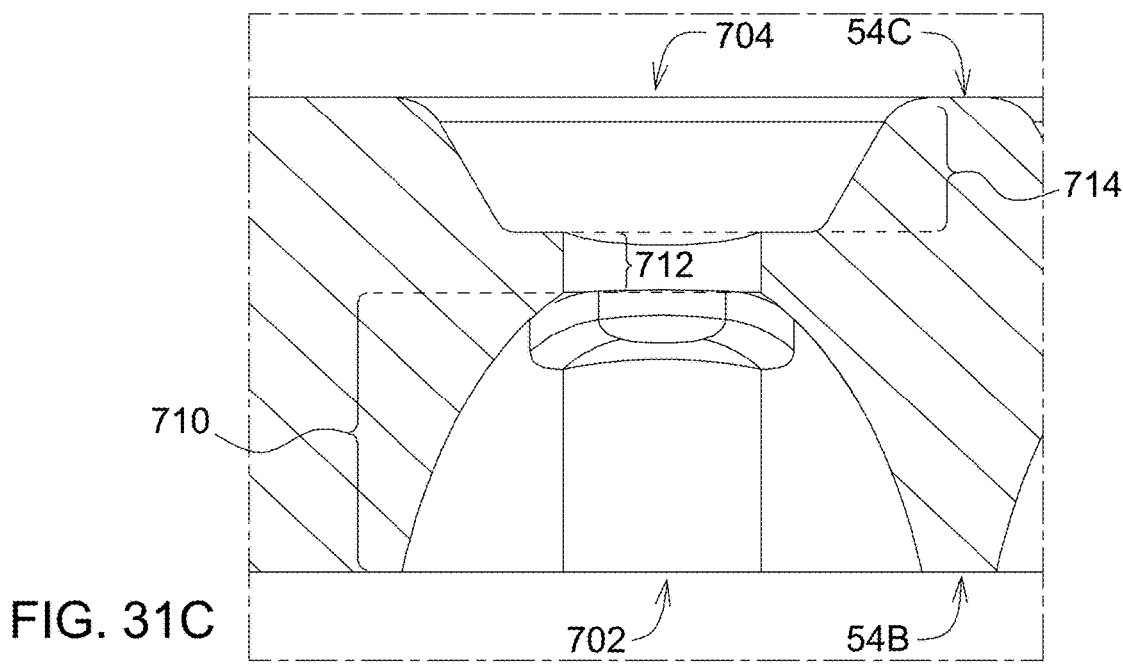

FIG. 31A shows an enlarged view of a portion of FIG. 29B, including at least a portion of the circumferential array of wheat disk kick-out pockets 704. FIG. 31B shows a cross-sectional view of the wheat disk kick-out pockets 704 of FIG. 31A taken along line 31B 131B. FIG. 31C illustrates an enlarged view of the wheat disk kick-out pockets 704 and associated 7002 shown in FIGS. 31B and 31C. Line 31B 131B passes through the center of the wheat disk kick-out pocket 704 shown in FIGS. 31B and 31C perpendicular to a line extending radially, from the center of the 700 through the center of the wheat disk kick-out pockets 704 shown in FIGS. 31B and 31C (i.e., it passes through the major axis of the wheat disk kick-out pockets 704).

Turning to FIG. 31C, the generally half-ovoid or half-egg shape of the wheat disk seed opening section 710 may be seen. Viewed head-on, e.g., a plane through the center of the wheat disk seed opening 702 along the minor axis, the wheat disk seed openings 702 appear parabolic, e.g., generally parabolic. The wheat disk transition section 712 may have a generally circular cross-section, e.g., it may be generally cylindrical, connecting the wheat disk transition section 712 to the wheat disk kick-out section 714. Therefore, the wheat disk transition section 712 may be bilaterally symmetrical along both the major axis and the minor axis. Furthermore, the major axis profile and the minor axis profile for the wheat disk transition section 712 may be similar or the same.

Considering FIG. 31A, then comparing FIG. 31C to FIG. 30C, it may be seen that the wheat disk kick-out section 714 may be slightly longer along its major axis than along its minor axis, e.g., the wheat disk kick-out section 714 may be an elongated rectangle or oval (e.g., having generally flattened side walls and curved or rounded ends). Along its minor axis, as shown in FIG. 31C, the wheat disk kick-out section 714 has steeply angled side walls (e.g., appearing frustopyramidal, e.g., nearly frustopyramidal). In some embodiments, the angle of the side walls of the wheat disk kick-out section 714 along the minor axis is greater than the angle of the side walls of the wheat disk kick-out section 714 along the major axis. In some embodiments, the angle of the side walls along the minor axis is greater than the angle of the side walls along the major axis by about 20°, by about 18°, by about 16°, by about 14°, by about 12°, by about 10°, by about 8°, by about 6°, by about 4°, or by about 2°. The side walls of the wheat disk kick-out section 714 along the minor axis may be angled by about 85°. In some embodiments, the side walls of the wheat disk kick-out section 714 along the major axis are angled by greater than about 50°, greater than about 55°, greater than about 60°, greater than about 65°, greater than about 70°, greater than about 75°, greater than about 80°, or greater than about 85°.

Figure 32A:
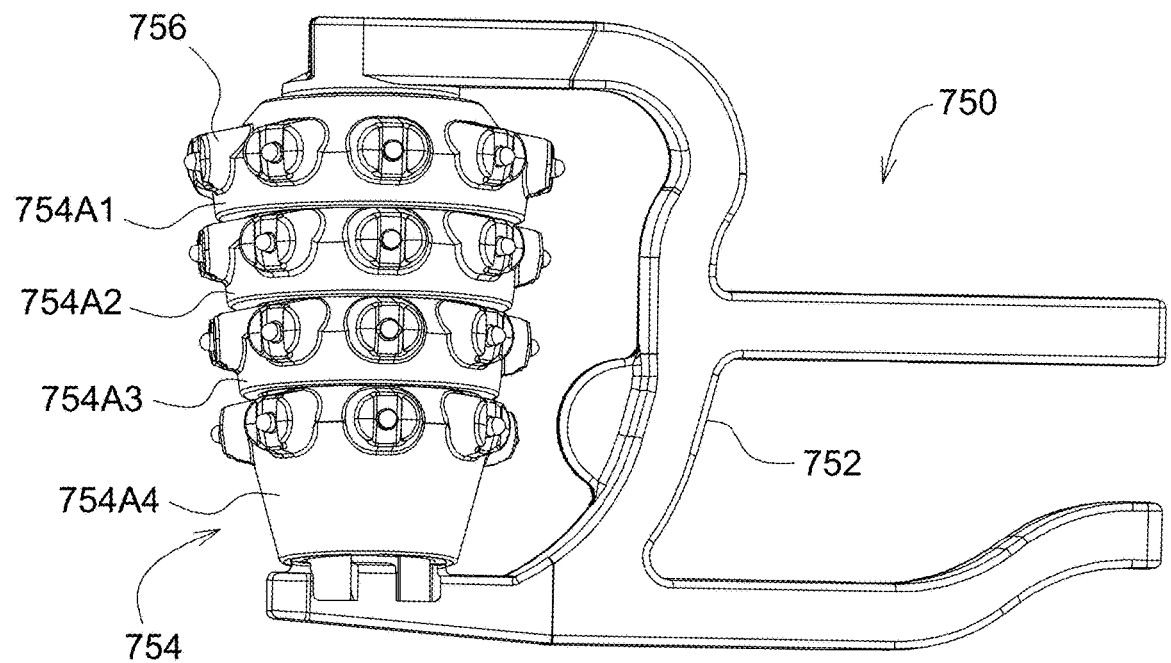
Figure 32B:
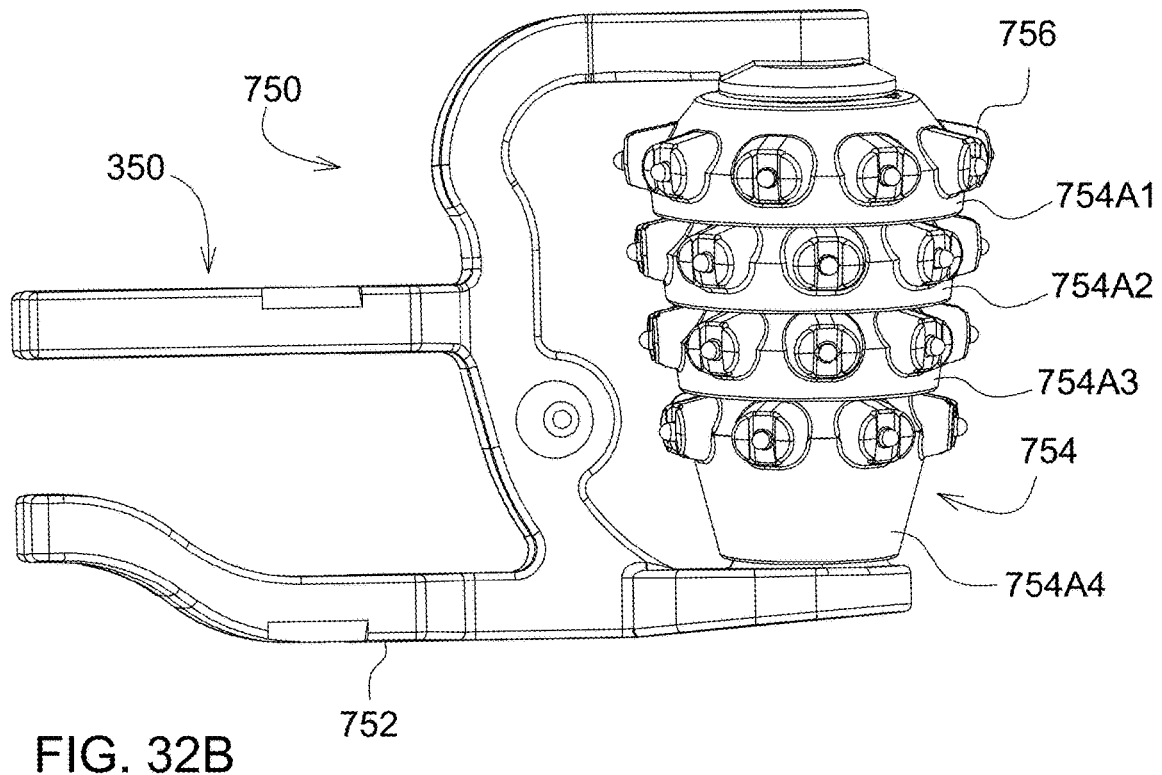

FIGS. 32A-32F illustrate a wheat disk kick-out wheel assembly 750. The wheat disk kick-out wheel assembly 750 may have any, all, many, some, or none of the features, dimension, locations, and/or functions of the various parts or portions of the other kick-out wheel assemblies described herein. The wheat disk kick-out wheel assembly 750 includes a wheat disk kick-out wheel 754 rotatably held by a wheat disk kick-out wheel arm 752. The wheat disk kick-out wheel 754 includes a first protrusion portion 754A1 having a plurality of wheat disk kick-out protrusions 756, a second protrusion portion 754A2 having a plurality of wheat disk kick-out protrusions 756, a third protrusion portion 754A3 having a plurality of wheat disk kick-out protrusions 756, and a fourth protrusion portion 754A4 having a plurality of wheat disk kick-out protrusion 756. As shown, the wheat disk kick-out wheel 754 does not include and separate body portions. As disclosed elsewhere herein the wheat disk kick-out wheel 754 may have more or fewer protrusion portions and may have more or fewer body portions. Additionally, the various components of the wheat disk kick-out wheel 754 may be fused to each other so that they rotate together (e.g., at the same rate of rotation) or the various components of the wheat disk kick-out wheel 754 may be separate from each other so that they may rotate independently (e.g., the components may have individual rates of rotation which may be the same or may be different). As shown in FIG. 32A, the first protrusion portion 754A1 may have a diameter that is larger than the diameter of the second protrusion portion 754A2, and the second protrusion portion 754A2 may have a diameter that is larger than the diameter of the third protrusion portion 754A3, and the third protrusion portion 754A3 may have a diameter that is larger than the diameter of the fourth protrusion portion 754A4.

Figure 33:
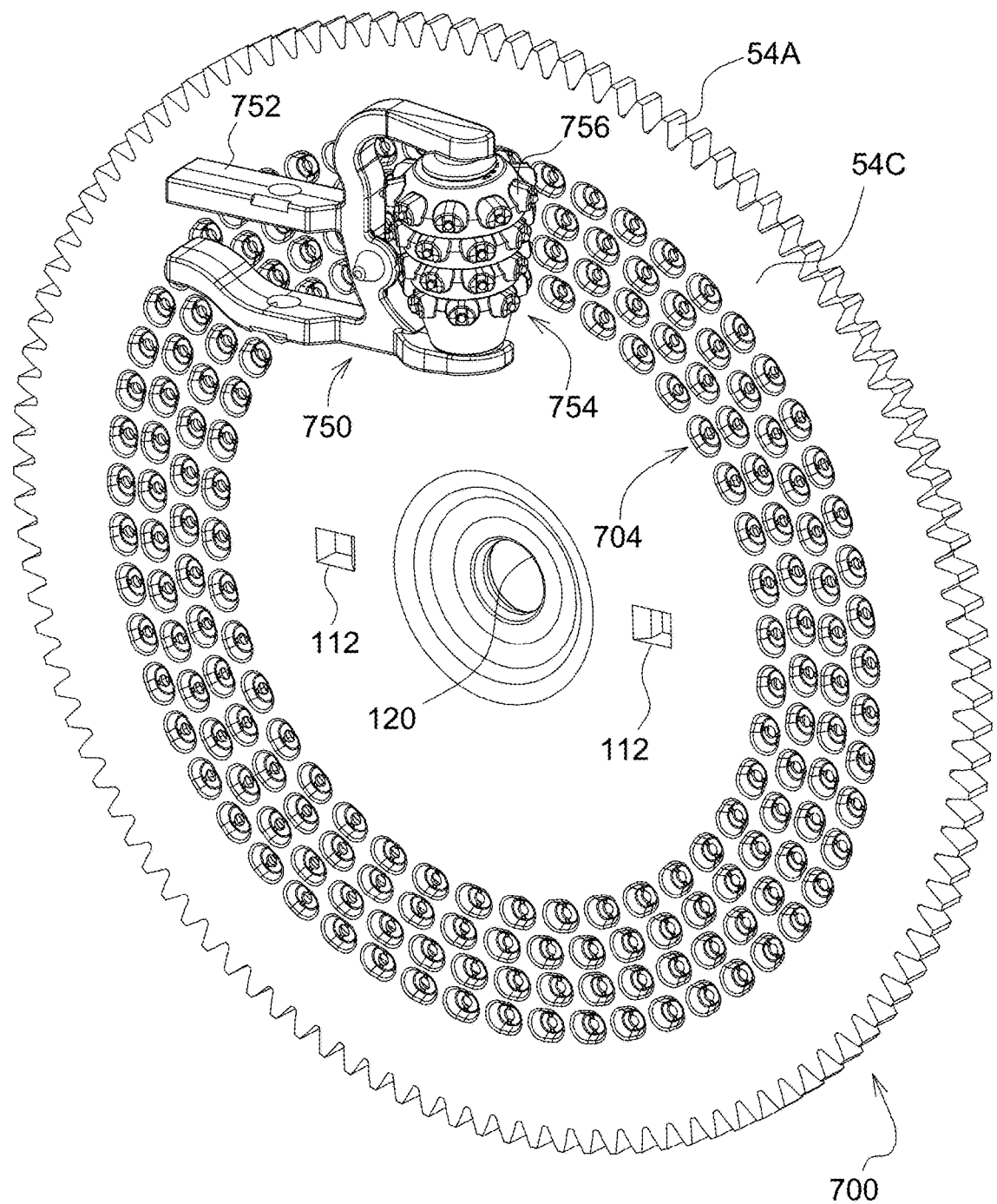
FIG. 33 shows the canola kick-out wheel assembly of FIGS. 32A-32F in mating engagement with the canola seed meter disk of FIGS. 29A-29C.

Turning to FIG. 32E, each wheat disk kick-out protrusion 756 of the wheat disk kick-out wheel 754 includes a wheat protrusion shoulder section 770, a wheat protrusion transition section 772, and a wheat protrusion extension 774. As disclosed elsewhere herein, the wheat protrusion shoulder section 770 of the wheat disk kick-out protrusion 756 may be configured to mate with, e.g., generally fit within or congruently fit with, the wheat disk kick-out section 714 of the wheat disk kick-out pockets 704. In some embodiments, the wheat protrusion shoulder section 770 includes a generally frustopyramidal portion with a flattened top. The flattened top of the generally frustopyramidal portion of the wheat protrusion shoulder section 770, along the major axis of the wheat protrusion shoulder section 770, may include a central relief portion. The central relief portion may be configured to accept the high point of the bowed inner surface of the wheat disk kick-out section 714, along the major axis of the wheat disk kick-out section 714. In the same way, the wheat protrusion transition section 772 of the wheat disk kick-out protrusion 756 may be configured to mate with, e.g., generally fit within, or congruently fit within, the wheat disk transition section 712. Additionally, the wheat protrusion extension 774 of the wheat disk kick-out protrusion 756 may be configured to extend just into, into, or through the wheat disk seed opening section 710 of the wheat disk seed openings 702. FIG. 33 illustrates the wheat disk kick-out wheel assembly 750 engaged with a wheat disk 700, with all other components of the system removed, for clarity's sake. The wheat disk kick-out wheel arm 752, and thus the rest of the wheat disk kick-out wheel assembly 750 may be biased by a spring or other biasing member away from the rear-side portion 52B of the seed disk housing 52, such that the wheat disk kick-out wheel 754 is held in close contact or biased engagement with the vacuum-side face 54C of the wheat disk 700.

The various seed meter disks 54 disclosed herein, including the sorghum disk 300, rice disk 400, soybean disk 500, canola disk 600, and wheat disk 700, among others may be constructed out of a single material. In some embodiments, the seed meter disk 54 is molded, e.g., injection or any other type of molding, as a single piece or component. Formation out of a single material, e.g., a monolithic seed meter disk 54, may advantageously promote ease of manufacturing, particularly when durable plastics or polymers are used to make or form the seed meter disk 54. However, some plastics or polymers may be prone to wear, particularly when metering abrasive seeds such as rice, or abrasive commodities.

Wear of one or more seed meter disks 54 disclosed here, such as the rice disk 400, may be caused by repetitive contact, e.g., rubbing, of commodity or seed against the seed meter disk 54. Certain parts of the seed meter disk 54 are more likely to encounter commodity or seed during use. These parts of the seed meter disk 54 are more prone to wear. For example, a full seed pool may only extend up the seed disk by 40-50% of the seed meter disk 54 radius. That 40-50% of the seed meter disk 54 radius, e.g., the radially outermost 40-50% of the seed meter disk 54, is more likely to wear due to seed-disk contact than the innermost 50-60% (which will only infrequently come into contact with commodity or seed). In much the same way, the seed opening sections are particularly prone to wear.

The seed opening sections pick up seeds (or other commodity) during metering due to a pressure differential applied across the disk (e.g., across the seed opening section, the transition section, and any kick-out pocket). The force applied on the seed, against the seed opening section, due to the pressure differential, promotes wear of the seed opening section. In addition, seeds, or other commodity, move or vibrate after they are picked up from the seed pool, carried along the seed path, and delivered to the release or removal location, e.g., the seeds are not immovably held. Such vibration also promotes or induces wear of the seed opening section. Increased vibration may increase the speed of disk wear and increases in wear may permit increased vibration. As the seed opening section wears away, it may enlarge both in cross-sectional dimensions and depth dimensions. As the seed opening section becomes deeper, the transition section, e.g., the frequently cylindrical transition section, may also experience wear, reducing in axial length and ultimately widening. Wear of the seed opening section and/or wear of the transition section may eventually reduce performance of the seed meter disk 54 and ultimately the seed meter 44. As these sections increase in size and are worn away, the singulation efficiency (e.g., the ability of each cell of the seed meter disk 54 to pick up a single seed from the seed pool and hold that seed as the cell passes along the seed path and delivery that seed to the release or removal location) may degrade. To combat wear, e.g., to maintain the integrity of the transition section, some embodiments of the seed meter disk 54 disclosed herein include composite structures or constructions.

In some embodiments, the seed meter disk 54 has multiple layers having different wear resistances, e.g., hardness, toughness, durability, and/or other resistance to wear. For example, any of the seed meter disks 54 disclosed herein may have a first layer constructed out of a first material having a first wear resistance, a second layer constructed out of a second material having a second wear resistance, and a third layer constructed out of a third material having a third wear resistance. The first layer may face or form the seed-side face 54B and the third layer may face or form the vacuum-side face 54C, e.g., the second or inner layer may be an inner or core layer. In some embodiments, the second wear resistance is greater than each of the first wear resistance and the third wear resistance. In some embodiments, the third wear resistance and the first wear resistance are approximately equal, e.g., equal. In some embodiments, the first and third materials are the same material. In some embodiments, the first and third materials are a durable plastic or polymer. In some embodiments, the second material is metallic, such as stainless steel.

In some embodiments, the axial center of the second layer is positioned at the axial center of the disk thickness 55, e.g., 50% through the disk thickness 55 or equidistant between the seed-side face 54B and vacuum-side face 54C of the seed meter disk 54. In some embodiments, the axial center of the second layer is positioned closer to the seed-side face 54B than the vacuum-side face 54C. For example, the axial center of the second layer may be offset from the center of the disk thickness 55 toward the seed-side face 54B by a percentage of the total disk thickness that is less than about 40%, less than about 35%, less than about 30%, less than about 25%, less than about 20%, less than about 15%, less than about 10% or less than about 5%. In some embodiments, the axial center of the second layer is positioned closer to the vacuum-side face 54C than the seed-side face 54B. For example, the axial center of the second layer may be offset from the center of the disk thickness 55 toward the vacuum-side face 54C by a percentage of the total disk thickness that is less than about 40%, less than about 35%, less than about 30%, less than about 25%, less than about 20%, less than about 15%, less than about 10% or less than about 5%.

The wear resistant second layer may extend across the entire face of the seed meter disk 54, e.g., substantially from the radially innermost portion (such as the central mounting aperture 120) to substantially the radially outermost portion (such as the teeth 54A). However, as most wear occurs in the outer portion of the seed meter disk 54, the wear resistant second layer may be included only in the outer portion of the seed meter disk 54. For example, a circumferential ring of the second wear resistant material may be centered at each circumferential array of seed openings. In some embodiments, the circumferential ring of the second wear resistant material centered at each circumferential array of seed openings has a radial dimension that is a percentage of the radius of the entire seed meter disk 54, the relationship of which is about 5%, about 10%, about 15%, about 20%, about 25%, about 30%, about 35%, or about 40%. In some embodiments, the circumferential ring of the second wear resistant material centered at each circumferential array of seed openings has a radial dimension that extends only from the radially innermost edge to the radially outermost edge of the circumferential array of seed openings, e.g., the ring of wear resistant material may be only as wide as the seed openings largest radial dimension. In seed disks having more than one circumferential array of seed openings, such as the wheat disk 700 disclosed herein, the wear resistant layer may extend, e.g., extend continuously, from radially inside the innermost circumferential array of seed openings to radially outside the outermost circumferential array of seed openings. As certain embodiments center seed openings and wear resistant materials, the second layer of wear resistant material may include portions of one or more of the seed opening section, transition section, and kick-out section. In some embodiments, the seed opening section is formed entirely out of the first material. In some embodiments, the seed opening section is formed from the first material and the second material. In some embodiments, the transition section is formed from the second material and one or more of the first material and the third material. In some embodiments, the transition section is formed entirely out of the second material. In some embodiments, the kick-out section is formed entirely out of the third material. In some embodiments, the kick-out section is formed from the second material and the third material.

The second layer, or wear resistant layer, may be a relatively thin layer within the seed meter disk 54. In some embodiments, the wear resistant layer to total disk thickness 55 relationship is about 32%, about 30%, about 28%, about 26%, about 24%, about 22%, about 20%, about 18%, about 16%, about 14%, about 12%, about 10%, about 8%, about 6%, or about 2%. In some embodiments, the wear resistant later is approximately the same thickness as the seed disk's transition section. In embodiments having a comparatively thicker wear resistant later, e.g., a wear resistant layer that is thicker than the seed disk's transition section, features of one or more of the seed opening section and the kick-out section may be included or formed in the wear resistant layer.

The foregoing description and examples has been set forth merely to illustrate the disclosure and are not intended as being limiting. Each of the disclosed aspects and embodiments of the present disclosure may be considered individually or in combination with other aspects, embodiments, and variations of the disclosure. In addition, unless otherwise specified, none of the steps of the methods of the present disclosure are confined to any particular order of performance. Modifications of the disclosed embodiments incorporating the spirit and substance of the disclosure may occur to persons skilled in the art and such modifications are within the scope of the present disclosure. Furthermore, all references cited herein are incorporated by reference in their entirety.

Terms of orientation used herein, such as "top," "bottom," "horizontal," "vertical," "longitudinal," "lateral," and "end" are used in the context of the illustrated embodiment. However, the present disclosure should not be limited to the illustrated orientation. Indeed, other orientations are possible and are within the scope of this disclosure. Terms relating to circular shapes as used herein, such as diameter or radius, should be understood not to require perfect circular structures, but rather should be applied to any suitable structure with a cross-sectional region that can be measured from side-to-side. Terms relating to shapes generally, such as "circular" or "cylindrical" or "semi-circular" or "semi-cylindrical" or any related or similar terms, are not required to conform strictly to the mathematical definitions of circles or cylinders or other structures, but can encompass structures that are reasonably close approximations.

Conditional language used herein, such as, among others, "can," "might," "may," "e.g.," and the like, unless specifically stated otherwise, or otherwise understood within the context as used, is generally intended to convey that some embodiments include, while other embodiments do not include, certain features, elements, and/or states. Thus, such conditional language is not generally intended to imply that features, elements, blocks, and/or states are in any way required for one or more embodiments or that one or more embodiments necessarily include logic for deciding, with or without author input or prompting, whether these features, elements and/or states are included or are to be performed in any particular embodiment.

Conjunctive language, such as the phrase "at least one of X, Y, and Z," unless specifically stated otherwise, is otherwise understood with the context as used in general to convey that an item, term, etc. may be either X, Y, or Z. Thus, such conjunctive language is not generally intended to imply that certain embodiments require the presence of at least one of X, at least one of Y, and at least one of Z.

The terms "approximately," "about," and "substantially" as used herein represent an amount close to the stated amount that still performs a desired function or achieves a desired result. For example, in some embodiments, as the context may dictate, the terms "approximately", "about", and "substantially" may refer to an amount that is within less than or equal to 10% of the stated amount. The term "generally" as used herein represents a value, amount, or characteristic that predominantly includes or tends toward a particular value, amount, or characteristic. As an example, in certain embodiments, as the context may dictate, the term "generally parallel" can refer to something that departs from exactly parallel by less than or equal to 20 degrees.

Unless otherwise explicitly stated, articles such as "a" or "an" should generally be interpreted to include one or more described items. Accordingly, phrases such as "a device configured to" are intended to include one or more recited devices. Such one or more recited devices can be collectively configured to carry out the stated recitations. For example, "a processor configured to carry out recitations A, B, and C" can include a first processor configured to carry out recitation A working in conjunction with a second processor configured to carry out recitations B and C.

The terms "comprising," "including," "having," and the like are synonymous and are used inclusively, in an open-ended fashion, and do not exclude additional elements, features, acts, operations, and so forth. Likewise, the terms "some," "certain," and the like are synonymous and are used in an open-ended fashion. Also, the term "or" is used in its inclusive sense (and not in its exclusive sense) so that when used, for example, to connect a list of elements, the term "or" means one, some, or all of the elements in the list.

Overall, the language of the claims is to be interpreted broadly based on the language employed in the claims. The language of the claims is not to be limited to the nonexclusive embodiments and examples that are illustrated and described in this disclosure, or that are discussed during the prosecution of the application.

Although systems and methods for metering commodity, including seed commodities, have been disclosed in the context of certain embodiments and examples, this disclosure extends beyond the specifically disclosed embodiments to other alternative embodiments and/or uses of the embodiments and certain modifications and equivalents thereof. Various features and aspects of the disclosed embodiments can be combined with or substituted for one another in order to form varying modes of systems and methods for metering commodity, including seed commodities. The scope of this disclosure should not be limited by the particular disclosed embodiments described herein.

Certain features that are described in this disclosure in the context of separate implementations can be implemented in combination in a single implementation. Conversely, various features that are described in the context of a single implementation can be implemented in multiple implementations separately or in any suitable subcombination. Although features may be described herein as acting in certain combinations, one or more features from a claimed combination can, in some cases, be excised from the combination, and the combination may be claimed as any subcombination or variation of any subcombination.

While the methods and devices described herein may be susceptible to various modifications and alternative forms, specific examples thereof have been shown in the drawings and are herein described in detail. It should be understood, however, that the invention is not to be limited to the particular forms or methods disclosed, but, to the contrary, the invention is to cover all modifications, equivalents, and alternatives falling within the spirit and scope of the various embodiments described and the appended claims. Further, the disclosure herein of any particular feature, aspect, method, property, characteristic, quality, attribute, element, or the like in connection with an embodiment can be used in all other embodiments set forth herein. Any methods disclosed herein need not be performed in the order recited. Depending on the embodiment, one or more acts, events, or functions of any of the algorithms, methods, or processes described herein can be performed in a different sequence, can be added, merged, or left out altogether (e.g., not all described acts or events are necessary for the practice of the algorithm). In some embodiments, acts or events can be performed concurrently, e.g., through multi-threaded processing, interrupt processing, or multiple processors or processor cores or on other parallel architectures, rather than sequentially. Further, no element, feature, block, or step, or group of elements, features, blocks, or steps, are necessary or indispensable to each embodiment. Additionally, all possible combinations, subcombinations, and rearrangements of systems, methods, features, elements, modules, blocks, and so forth are within the scope of this disclosure. The use of sequential, or time-ordered language, such as "then," "next," "after," "subsequently," and the like, unless specifically stated otherwise, or otherwise understood within the context as used, is generally intended to facilitate the flow of the text and is not intended to limit the sequence of operations performed. Thus, some embodiments may be performed using the sequence of operations described herein, while other embodiments may be performed following a different sequence of operations.

Moreover, while operations may be depicted in the drawings or described in the specification in a particular order, such operations need not be performed in the particular order shown or in sequential order, and all operations need not be performed, to achieve the desirable results. Other operations that are not depicted or described can be incorporated in the example methods and processes. For example, one or more additional operations can be performed before, after, simultaneously, or between any of the described operations. Further, the operations may be rearranged or reordered in other implementations. Also, the separation of various system components in the implementations described herein should not be understood as requiring such separation in all implementations, and it should be understood that the described components and systems can generally be integrated together in a single product or packaged into multiple products. Additionally, other implementations are within the scope of this disclosure.

Some embodiments have been described in connection with the accompanying figures. Certain figures are drawn and/or shown to scale, but such scale should not be limiting, since dimensions and proportions other than what are shown are contemplated and are within the scope of the embodiments disclosed herein. Distances, angles, etc. are merely illustrative and do not necessarily bear an exact relationship to actual dimensions and layout of the devices illustrated. Components can be added, removed, and/or rearranged. Further, the disclosure herein of any particular feature, aspect, method, property, characteristic, quality, attribute, element, or the like in connection with various embodiments can be used in all other embodiments set forth herein. Additionally, any methods described herein may be practiced using any device suitable for performing the recited steps.

The methods disclosed herein may include certain actions taken by a practitioner; however, the methods can also include any third-party instruction of those actions, either expressly or by implication. For example, actions such as "positioning an electrode" include "instructing positioning of an electrode."

The ranges disclosed herein also encompass any and all overlap, subranges, and combinations thereof. Language such as "up to," "at least," "greater than," "less than," "between," and the like includes the number recited. Numbers preceded by a term such as "about" or "approximately" include the recited numbers and should be interpreted based on the circumstances (e.g., as accurate as reasonably possible under the circumstances, for example ±5%, ±10%, ±15%, etc.). For example, "about 1 V" includes "1 V." Phrases preceded by a term such as "substantially" include the recited phrase and should be interpreted based on the circumstances (e.g., as much as reasonably possible under the circumstances). For example, "substantially perpendicular" includes "perpendicular." Unless stated otherwise, all measurements are at standard conditions including temperature and pressure.

In summary, various embodiments and examples of systems and methods for metering commodity, including seed commodities, have been disclosed. Although the systems and methods for metering commodity, including seed commodities, have been disclosed in the context of those embodiments and examples, this disclosure extends beyond the specifically disclosed embodiments to other alternative embodiments and/or other uses of the embodiments, as well as to certain modifications and equivalents thereof. This disclosure expressly contemplates that various features and aspects of the disclosed embodiments can be combined with, or substituted for, one another. Thus, the scope of this disclosure should not be limited by the particular disclosed embodiments described herein, but should be determined only by a fair reading of the claims that follow.

What is claimed is:

1. A seed metering system configured for use in a seed meter of a planting implement to meter a seed, the seed metering system comprising:
   a seed metering disk comprising a first face, a second face, and a circumferential outer edge, wherein the first face of the seed metering disk comprises a plurality of seed openings extending into the first face of the seed metering disk and arranged in a circumferential array and the second face of the seed metering disk comprises a plurality of kick-out pockets extending into the second face of the seed metering disk and arranged in a circumferential array,
   wherein the circumferential array of seed openings is spaced radially inward from the circumferential outer edge of the seed metering disk by a distance, wherein the circumferential array of kick-out pockets is spaced radially inward from the circumferential outer edge of the seed metering disk by the distance, and wherein a seed opening of the plurality of seed openings is fluidly connected to a kick-out pocket of the plurality of kick-out pockets by a transition section aperture,
   wherein each seed opening of the plurality of seed openings is configured to retain the seed on the first face of the seed metering disk using a pressure differential across the seed metering disk, and wherein the seed metering disk is configured to move the seed along a seed path defined by the circumferential array of seed openings;
   wherein each kick-out pocket of the plurality of kick-out pockets comprises a first pocket side wall extending into the second face of the seed metering disk, a second pocket side wall extending into the second face of the seed metering disk, a leading pocket wall extending into the second face of the seed metering disk, and a trailing pocket wall extending into the second face of the seed metering disk, wherein the leading pocket wall connects a first end of the first pocket side wall to a first end of the second pocket side wall and the trailing pocket wall connects a second end of the first pocket side wall to a second end of the second pocket side wall; and
   a kick-out wheel assembly comprising a kick-out wheel having a protrusion portion and being rotatably held by a kick-out wheel arm, wherein the protrusion portion of the kick-out wheel comprises a plurality of protrusions, wherein each protrusion of the plurality of protrusions comprises a shoulder section, a transition section, and an extension,
   wherein the shoulder section of the protrusion comprises a first protrusion side wall, a second protrusion side wall, a leading protrusion wall and a trailing protrusion wall, wherein the leading protrusion wall connects a first end of the first protrusion side wall to a first end of the second protrusion side wall and the trailing protrusion wall connects a second end of the first protrusion side wall to a second end of the second protrusion side wall,
   wherein the kick-out wheel assembly is configured to be held in biased engagement with the second face of the seed metering disk such that a protrusion of the plurality of protrusions on the protrusion portion of the kick-out wheel extends into a kick-out pocket of the plurality of kick-out pockets on the second face of the seed metering disk.

2. The seed metering system of claim 1, wherein a junction of the first pocket side wall of each kick-out pocket of the plurality of kick-out pockets and the second face of the seed metering disk comprises a generally linear portion, and wherein a junction of the second pocket side wall of each kick-out pocket of the plurality of kick-out pockets and the second face of the seed metering disk comprises a generally linear portion.

3. The seed metering system of claim 1, wherein a junction of the leading pocket wall of each kick-out pocket of the plurality of kick-out pockets and the second face of the seed metering disk comprises a generally linear portion, and wherein a junction of the trailing pocket wall of each kick-out pocket of the plurality of kick-out pockets and the second face of the seed metering disk comprises a generally linear portion.

4. The seed metering system of claim 1, wherein a junction of the leading pocket wall of each kick-out pocket of the plurality of kick-out pockets and the second face of the seed metering disk comprises a generally curved portion, and wherein a junction of the trailing pocket wall of each kick-out pocket of the plurality of kick-out pockets and the second face of the seed metering disk comprises a generally curved portion.

5. The seed metering system of claim 1, wherein at least a portion of at least one of the first pocket side wall of each kick-out pocket of the plurality of kick-out pockets and the second pocket side wall of each kick-out pocket of the plurality of kick-out pockets is generally planar.

6. The seed metering system of claim 1, wherein at least a portion of at least one of the leading pocket wall of each kick-out pocket of the plurality of kick-out pockets and the trailing pocket wall of each kick-out pocket of the plurality of kick-out pockets is generally planar.

7. The seed metering system of claim 1, wherein at least a portion of at least one of the first protrusion side wall of the shoulder section of each protrusion of the plurality of protrusions and the second protrusion side wall of the shoulder section of each protrusion of the plurality of protrusions is generally planar.

8. The seed metering system of claim 1, wherein at least a portion of at least one of the leading protrusion wall of the shoulder section of each protrusion of the plurality of protrusions and the trailing protrusion wall of the shoulder section of each protrusion of the plurality of protrusions is generally planar.

9. The seed metering system of claim 1, wherein the shoulder section of a protrusion of the plurality of protrusions is configured to matingly engage a kick-out pocket of the plurality of kick-out pockets, wherein the transition section of the protrusion of the plurality of protrusions extends from the shoulder section and is configured to matingly engage the aperture connecting the seed opening of the plurality of seed openings to a kick-out pocket of the plurality of kick-out pockets, and wherein the extension of the protrusion of the plurality of protrusions extends from the transition section and is configured to extend at least partially into the seed opening of the plurality of seed openings.

10. The seed metering system of claim 9, wherein the leading protrusion wall of the shoulder section of each protrusion of the plurality of protrusions is generally planar, and wherein the leading pocket wall of each kick-out pocket of the plurality of kick-out pockets is generally planar, and wherein the kick-out wheel of the kick-out wheel assembly rotates as the seed metering disk rotates such that the generally planar leading protrusion wall of a shoulder section of a protrusion of the plurality of protrusions rotates into engagement with the generally planar leading pocket wall of a kick-out pocket of the plurality of kick-out pockets.

11. The seed metering system of claim 1, wherein the protrusion of the plurality of protrusions is configured to dislodge the seed retained on the first face of the seed metering disk.

12. The seed metering system of claim 1, wherein each seed opening of the plurality of seed openings comprises a trumpet shape having a plurality of generally circular cross-sections, wherein a largest circular cross-section of the plurality of generally circular cross sections lies in the first face of the seed metering disk.

13. The seed metering system of claim 1, wherein each seed opening of the plurality of seed openings comprises a crescent-shaped wedge having a generally linear leading edge and a curved trailing edge, wherein the generally linear leading edge is generally coplanar with the first face of the seed metering disk, wherein a first end of the curved trailing edge connects to a first end of the generally straight edge and a second end of the curved trailing edge connects to a second end of the generally straight edge, and wherein the transition section aperture connects each seed opening to a kick-out pocket at a deepest portion of the crescent-shaped wedge seed opening.

14. The seed metering system of claim 1, wherein each seed opening of the plurality of seed openings is frustoconical, wherein a portion of the frustoconical seed opening having a largest cross-sectional dimension is coplanar with the first face of the seed metering disk and a portion of the frustoconical seed opening having a smallest cross-sectional dimension connects to the transition section aperture.

15. The seed metering system of claim 1, wherein each seed opening of the plurality of seed openings comprises a half-egg shape having a rounded end and a pointed end, wherein the transition section aperture connects each seed opening to a kick-out pocket at a deepest portion of the half-egg-shaped seed opening.

16. The seed metering system of claim 1, further comprising a metallic core circumferential ring, wherein the metallic core circumferential ring extends from a first radial location inside the circumferential array of seed openings to a second radial location outside the circumferential array of seed openings.

* * * * *